(12) United States Patent
Hashimoto et al.

(10) Patent No.: US 8,247,041 B2
(45) Date of Patent: Aug. 21, 2012

(54) CELLULOSE ACYLATE FILM

(75) Inventors: Kiyokazu Hashimoto, Minami-ashigara (JP); Yasutomo Goto, Fujinomiya (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1178 days.

(21) Appl. No.: 11/793,603

(22) PCT Filed: Dec. 22, 2005

(86) PCT No.: PCT/JP2005/023588
§ 371 (c)(1),
(2), (4) Date: Jun. 20, 2007

(87) PCT Pub. No.: WO2006/068219
PCT Pub. Date: Jun. 29, 2006

(65) Prior Publication Data
US 2008/0113118 A1    May 15, 2008

(30) Foreign Application Priority Data
Dec. 22, 2004  (JP) ................. 2004-372110
May 2, 2005    (JP) ................. 2005-134243

(51) Int. Cl.
*B29D 11/00* (2006.01)
(52) U.S. Cl. ............ 428/1.54; 264/2.7; 264/177.19
(58) Field of Classification Search .............. 428/1.54; 264/2.7, 177.19
See application file for complete search history.

(56) References Cited

U.S. PATENT DOCUMENTS

| | | | | |
|---|---|---|---|---|
| 5,219,510 A * | 6/1993 | Machell et al. | ............ | 264/210.6 |
| 7,569,259 B2 * | 8/2009 | Okubo et al. | ................ | 428/1.33 |
| 2002/0192397 A1 * | 12/2002 | Tsujimoto | .................... | 428/1.31 |
| 2003/0156235 A1 * | 8/2003 | Kuzuhara et al. | ............... | 349/96 |
| 2003/0215608 A1 * | 11/2003 | Bermel | ......................... | 428/141 |
| 2005/0150426 A1 * | 7/2005 | Hashimoto et al. | ...... | 106/170.21 |

FOREIGN PATENT DOCUMENTS

| | | |
|---|---|---|
| JP | 2002-146043 A | 5/2002 |
| JP | 2006/2025 A | 1/2006 |
| JP | 2006-2026 A | 1/2006 |

OTHER PUBLICATIONS

JPO Website Machine English Translation of JP 2005-173072, Okajima, Jun. 30, 2005.*
JPO Website Machine English Translation of JP 2005-055619, Sakaguchi, Mar. 3, 2005.*
JPO Website Machine English Translation of JP 2005-128360, Okajima, May 19, 2005.*
PCT/ISA/210, Jan. 2004.
PCT/ISA/237, Apr. 2005.

* cited by examiner

*Primary Examiner* — Sophie Hon
(74) *Attorney, Agent, or Firm* — Buchanan Ingersoll & Rooney PC

(57) ABSTRACT

A cellulose acylate film produced by a melt-casting film formation, wherein the total of the number of projections having a height of from 0.1 μm to 100 μm and a length of at least 1 mm and the number of depressions having a depth of from 0.1 μm to 100 μm and a length of at least 1 mm is at most 10 per 10 cm of the width of the film. When built in a liquid-crystal display device, the cellulose acylate film significantly reduces the display blur in the device.

17 Claims, 2 Drawing Sheets

CELLULOSE ACYLATE FILM

This application is a national stage entry of PCT/JP0523588, filed Dec. 22, 2005.

TECHNICAL FIELD

The present invention relates to a cellulose acylate film formed according to a melt casting process. The cellulose acylate film of the invention is useful as an optical film to be built in liquid-crystal display devices.

BACKGROUND ART

Heretofore, in producing cellulose acylate films for use in liquid-crystal image display devices, a solution-casting method has been principally carried out, which comprises dissolving cellulose acylate in a chlorine-containing organic solvent such as dichloromethane, casting it on a substrate, and drying it to form a film. Dichloromethane has heretofore been used as a good solvent for cellulose acylate, and since its boiling point is low (about 40° C.), it is favorably used owing to its advantage that it may be readily vaporized in the film-forming and drying step in its production process.

Recently, from the viewpoint of environmental protection, it has become required to significantly retard release of a chlorine-containing organic solvent having a low boiling point in a step of handling it in closed facilities. Accordingly, for example, employed is a method of preventing solvent leakage through a thorough closed system, and even if an organic solvent leaks out by any chance, employed is a method of installing a gas absorption tower to adsorb and treat it before it is released in outdoor air. Further, before discharged, a chlorine-containing organic solvent is burnt with flames or is decomposed with electron beams, whereby the organic solvent is not almost discharged out. However, it is still impossible to completely prevent the release of organic solvent, and further studies are required.

A melt-casting method of producing a film of a specific cellulose acylate has been proposed as a film formation method not using an organic method (Patent Document 1). According to the method, the carbon chain of the ester group in cellulose acylate is prolonged so as to lower the melting point of the polymer for easy melt-casting film formation of the polymer. Concretely, cellulose acetate is changed into cellulose propionate or cellulose butyrate, thereby enabling melt-casting film formation of the polymer. We, the present inventors tried forming a polarizer, using a film produced according to the melt-casting film formation method described in this patent document, and tried building the polarizer in a liquid-crystal display device, but we knew formation of blurry images. Accordingly, the improvement was desired.

Patent Document 1: JP-A-2000-352620

DISCLOSURE OF THE INVENTION

The present invention is to provide a cellulose acylate film produced by a melt-casting film formation, which is capable of significantly solving blurry displays that may occur when it is built in a liquid-crystal display device.

The above object of the invention may be attained by the following constitution:

[1] A cellulose acylate film produced by a melt-casting film formation, in which the total of the number of projections having a height of from 0.1 µm to 100 µm and a length of at least 1 mm and the number of depressions having a depth of from 0.1 µm to 100 µm and a length of at least 1 mm is at most 10 per 10 cm of the width of the film.

[2] A cellulose acylate film, wherein the total of the number of projections having a height of from 0.1 µm to 100 µm and a length of at least 1 mm and the number of depressions having a depth of from 0.1 µm to 100 µm and a length of at least 1 mm is at most 10 per 10 cm of the width of the film, and the amount of a remaining solvent is at most 0.01% by mass.

[3] A cellulose acylate film, wherein the total of the number of projections having a height of from 0.1 µm to 100 µm and a length of at least 1 mm and the number of depressions having a depth of from 0.1 µm to 100 µm and a length of at least 1 mm is at most 10 per 10 cm of the width of the film, and the amount of a remaining solvent is 0.

[4] The cellulose acylate film of any one of [1] to [3], which is produced by a melt-casting film formation with use of a melt having a storage elastic modulus G' at 180° C. to 240° C. of from 100 Pa to 30000 Pa and a loss elastic modulus G" at 180° C. to 240° C. of from 1000 Pa to 30000 Pa and having a tan δ at 180° C. to 240° C. of from 1 to 6 where tan δ is computed as G"/G'.

[5] The cellulose acylate film of any one of [1] to [4], which is produced by a melt-casting film formation with use of a melt having an elongation strength at break in the normal line direction at 180° C. to 240° C. of from 20 µm to 400 µm and an elongation stress at break in the normal line direction at 180° C. to 240° C. of from 0.01 N/cm$^2$ to 0.5 N/cm$^2$.

[6] The cellulose acylate film of any one of [1] to [5], wherein the cellulose acylate constituting the film satisfies Formulae (1) to (3):

$$2.6 \leq X+Y \leq 3.0, \tag{1}$$

$$0 \leq X \leq 2.8, \tag{2}$$

$$0.3 \leq Y \leq 3; \tag{3}$$

wherein X represents a substitution degree for an acetyl group; Y represents a total substitution degree for a propionyl group, a butyryl group, a pentanoyl group and a hexanoyl group.

[7] The cellulose acylate film of any one of [1] to [6], which is produced by a melt-casting film formation with a touch roll.

[8] A cellulose acylate film, which is produced by stretching the cellulose acylate film of any one of [1] to [7], by from 1% to 300% at least in one direction.

[9] The cellulose acylate film of any one of [1] to [8], wherein the polymerization degree of the cellulose acylate is from 100 to 270.

[10] The cellulose acylate film of any one of [1] to [9], which is produced by a melt-casting film formation with use of a melt that contains a compound having at least two aromatic rings and having a molecular weight of from 100 to 3000 in an amount of from 1% to 20% by mass.

[11] The cellulose acylate film of any one of [1] to [10], which is produced by a melt-casting film formation with use of a melt that contains a fatty acid having from 2 to 6 carbon atoms in an amount of from 1 ppm to 1000 ppm.

[12] The cellulose acylate film of any one of [1] to [11], which is produced by a melt-casting film formation with use of a melt having a sulfuric acid amount of from 0 ppm to 200 ppm.

[13] The cellulose acylate film of any one of [1] to [12], which is produced by a melt-casting film formation through a die lip having a tip angle of from 1° to 60°.

[14] The cellulose acylate film of any one of [1] to [13], which is produced by a melt-casting film formation through a die lip set shifted from the center of a casting drum within a range of from 0.7 times to 1.3 times of the radius of the casting drum.

[15] The cellulose acylate film of any one of [1] to [14], which satisfies Formulae (4) to (6):

$$Rth \geq Re, \quad (4)$$

$$200 \geq Re \geq 0, \quad (5)$$

$$500 \geq Rth \geq 0. \quad (6)$$

[16] A polarizer having at least one layer of the cellulose acylate film of any one of [1] to [15] laminated on a polarizing layer.

[17] An optically-compensatory film for liquid-crystal display plates, wherein the cellulose acylate film of any one of [1] to [15] is used as the substrate thereof.

[18] An antireflection film, wherein the cellulose acylate film of any one of [1] to [15] is used as the substrate thereof.

[19] A liquid-crystal display device comprising the cellulose acylate film of any one of [1] to [15].

The cellulose acylate film of the invention can significantly dissolve a problem of display failure (blur) that may occur when it is built in a liquid-crystal display device.

BEST MODE FOR CARRYING OUT THE INVENTION

The cellulose acylate film of the invention is described in detail hereinunder. The description of the constitutive elements of the invention given hereinunder may be for some typical embodiments of the invention, to which, however, the invention should not be limited. It should be noted that, in this description, any notation using a word "to" indicates a range defined by values placed before and after such word, where both ends of such range are included as minimum and maximum values.

(Projections and Depressions of Film)

We, the present inventors analyzed the reason for blurry displays that may occur in ordinary liquid-crystal display devices with a cellulose acylate film built therein. As a result, we found that even projections and depressions having a size of 0.1 µm that is shorter than the wavelength of visible light scatter the light from a display plate, therefore causing blurry displays. Such fine projections and depressions could not be measured even with a haze meter, and they could be recognized only on image displays. We, the present inventors assiduously studied the reason for the occurrence of such fine projections and depressions and, as a result, have found that, when a melt (resin melt) 2 is extruded out through a die, it sticks to the die lip (the tip of the die) 1 as in FIG. 1, and when it is peeled off, the melt is pulled up to form a projection 2b. Further, we have found that the projection 2c is pressed by a chill roll, and the periphery around the projection 2c is pushed in to form a depression 2d.

In an ordinary die line, when a melt is pressed to a die, projections and depressions may be transferred to it owing to the scratches and the dirt of the die; and therefore the size of the projections and the depressions is at least a few hundreds µm and is large, and their frequency is low. As opposed to these, the projections and the depressions to which the present invention is directed are formed when the stuck melt is pulled up and they are small, and, in addition, since they are formed owing to the melt-to-die sticking, or that is, they are not accidentally-formed ones like those in a die line, and they are formed on the entire surface of a film. Specifically, the projections and the depressions to which the invention is directed are contrary to those formed in an ordinary die line in point of their expression mechanism (they are formed by pulling up and not by pushing in), and in point of their expression condition (in the invention, strong projections and depressions are not accidentally formed, but weak projections and depressions are formed on the entire surface of a film). Such fine projections and depressions (the fine projections and depressions having a height of from 0.1 µm to 100 µm and a length of at least 1 mm to which the invention is directed as in the above, are hereinafter referred to as "fine projections and depressions") are remarkably formed especially in cellulose acylate. In the cellulose acylate film of the invention, the number of such fine projections and depressions is preferably from 0 to 10 per 10 cm of the width of the film, more preferably from 0 to 8, even more preferably from 0 to 6.

The width of 10 cm that is to be the standard in confirming the number of the projections and the depressions in this description is in the transverse direction (TD) in melt-casting film formation. On an industrial scale, melt-casting film formation is generally carried out continuously, and in general, the cast film is wound up in a roll and stored. Accordingly, in confirming the number of the projections and the depressions in the film roll, a length of 10 cm is taken in the width direction of the roll. On the other hand, when the melt-casting direction is not clear in such a situation that the cast film is cut, then the width of 10 cm is taken in the direction in which the total of the number of the projections and the number of the depressions is the largest. As in the above, since the projections and the depressions are formed along the melt-casting direction, it may be presumed that the direction in which the number of the projections and the number of the depressions is the largest would be the melt-casting direction. Regarding a concrete method of counting the number of the projections and the depressions, the measurement method described hereinafter may be referred to.

The cellulose acylate film of the invention, which is characterized in that the number of such fine projections and depressions therein is small, may be produced by specifically controlling the characteristics of the melt and the film-forming process, for example, as follows:

[1] Control of Melt Characteristics at Die Lip:

Preferably, the storage elastic modulus G', the loss elastic modulus G" and tan δ (tan δ as referred to herein means G"/G') of the melt at a die lip are specifically controlled. G' is an index of the elastic strength of the melt; and G" is an index of the viscous strength of the melt. Those factors are at 180° C. to 240° C., and this is because the preferred temperature of the die lip in melt-casting film formation of cellulose acylate falls within that temperature range, and the key point of the invention is that the film satisfies the following physical properties within the range.

(1) G' of the melt at 180° C. to 240° C. is from 100 Pa to 30,000 Pa, more preferably from 300 Pa to 20,000 Pa, even more preferably from 500 Pa to 10,000 Pa. G' of a general melt is about 50 Pa; but when having such a high G' as above, the melt sticking to a die lip may be readily peeled off. In other words, when the melt is weak, not falling within the range as above, then the melt sticking to a die lip as in FIG. 1 could not peeled off even though it is pulled, and rather the melt may be elongated and could not be peeled.

(2) G" at 180° C. to 240° C. is from 1000 Pa to 30,000 Pa, more preferably from 2000 Pa to 20,000 Pa, even more preferably from 3000 Pa to 13,000 Pa. When the index of the viscosity factor, G" is more than the range, then the melt may readily stick to a die lip and could be hardly peeled off. G" of a general melt is about 50,000 or so.

(3) Tan δ at 180° C. to 240° C. is from 1 to 6, more preferably from 1.4 to 5, even more preferably from 1.7 to 4.5. Tan δ is a value obtained by dividing the viscosity factor by the elasticity factor; and therefore the smaller value of tan δ means that the elasticity factor of the film is larger. In other words, the value indicates a ratio of the force of the melt to stick to a die lip to the force to peel off the melt from the die lip. Accordingly, when the value is smaller, then this means that the film could be more readily peeled off. As in the above, the invention is characterized in that the value, tan δ is small. In this connection, tan δ of a general melt is about 8 or so.

(4) The elongation length at break in the normal direction at 180° C. to 240° C. is from 20 μm to 400 μm, more preferably from 40 μm to 300 μm, even more preferably from 60 μm to 200 μm. This indicates whether the film sticking to a dip lip could be elongated to what distance. Falling within the range as above, the melt sticking to a die lip is hardly broken as in FIG. 1 even though it is pulled up. In this connection, the elongation length at break of an ordinary melt is about 10 μm or so.

(5) The elongation length at break in the normal direction at 180° C. to 240° C. is from 0.01 N/cm$^2$ to 0.5 N/cm$^2$, more preferably from 0.08 N/cm$^2$ to 0.4 N/cm$^2$, even more preferably from 0.1 N/cm$^2$ to 0.3 N/cm$^2$. With that, the melt is hardly elongated or broken even though it is peeled off. In this connection, the elongation stress of an ordinary melt is about 0.005 N/cm$^2$ or so.

From the viewpoint of the melt castability (stability in melt extrusion, coloration and decomposition in melt formation) and the optical properties (retardation expressibility, transparency) thereof, the cellulose acylate of the invention preferably has a composition mentioned hereinunder, but when the material itself is directly used as it is, then it could not come to have the above-mentioned physical properties; and for example, when the following materials are incorporated thereinto, then the resulting cellulose acylate may attain them.

(a) A fatty acid having from 2 to 6 carbon atoms is incorporated into a melt, in an amount of from 1 ppm to 1000 ppm, more preferably from 2 ppm to 500 ppm, even more preferably from 3 ppm to 100 ppm. The fatty acid may have a linear structure. Even though its amount is small, the fatty acid may attain the above-mentioned physical properties (1) to (3). One or more different types of such fatty acids may be used herein either singly or as combined. Regarding the timing for its addition, the fatty acid may be added before or after formation of cellulose acylate pellets.

(b) A compound having at least two aromatic rings and having a molecular weight of from 100 to 3000 is incorporated into a melt, in an amount of from 1% to 20% by mass, more preferably from 2% to 10% by mass, even more preferably from 3% to 8% by mass. The compound may deposit on the surface of the melt, therefore having an effect of preventing the melt from sticking to a die lip, and is effective for the above (4) and (5). More preferred examples of the compound are described in JP-A-2001-166144 and 2002-296421. In addition, a compound where two aromatic rings are linked by —COO— between them, such as those mentioned below, is also preferably used herein.

[Formula 1]

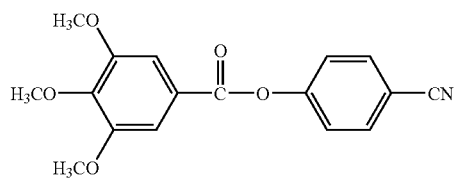

A-1

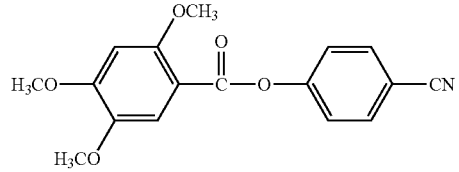

A-2

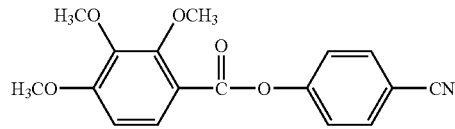

A-3

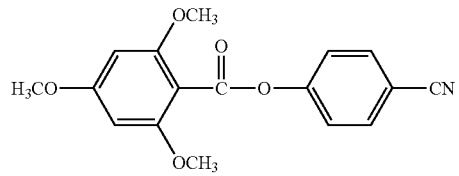

A-4

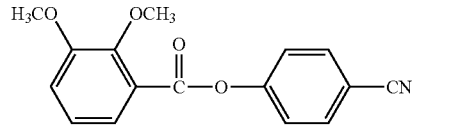

A-5

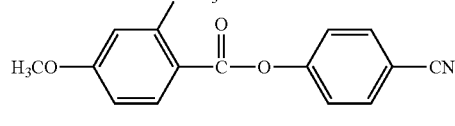

A-6

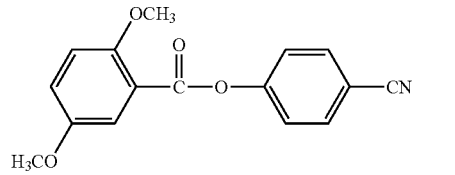

A-7

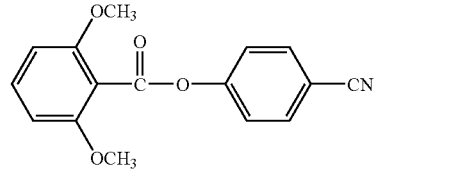

A-8

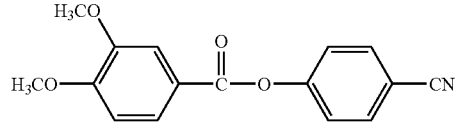

A-9

[Formula 2]

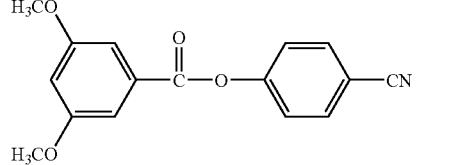

A-10

A-11 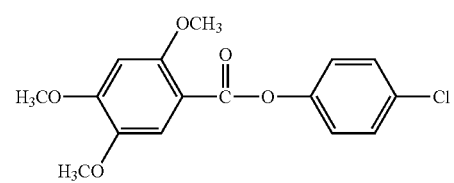
A-12 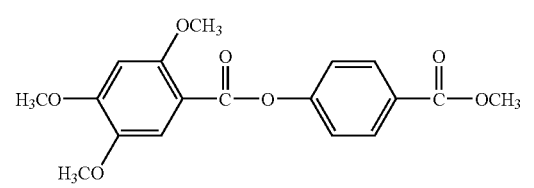
A-13 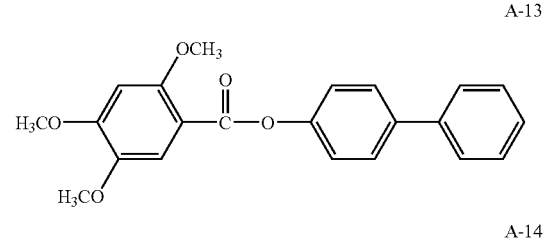
A-14 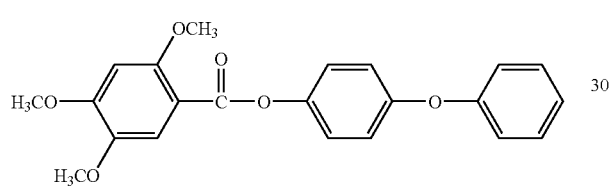
A-15 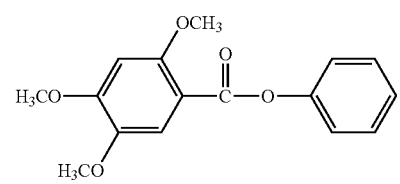
A-16 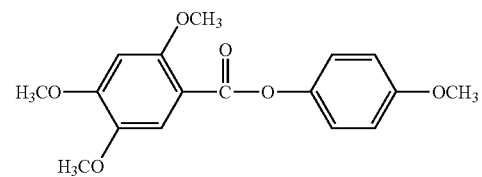
A-17 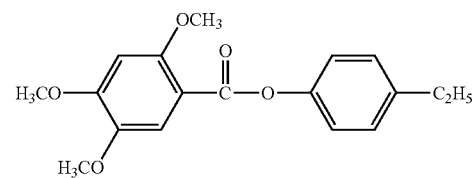
[Formula 3]
A-18 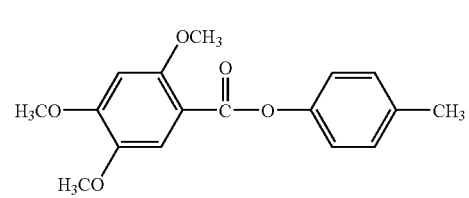
A-19 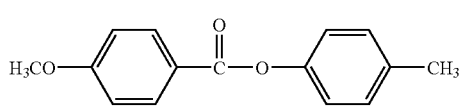
A-20 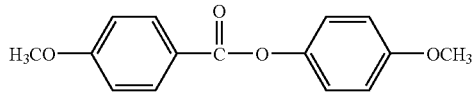
A-21 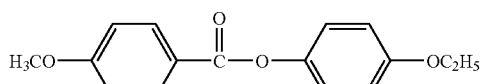
A-22 
A-23 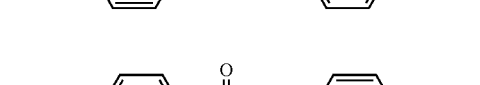
A-24 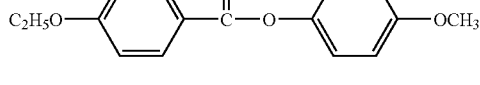
A-25 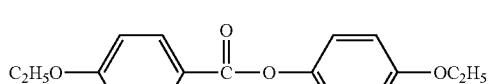
A-26 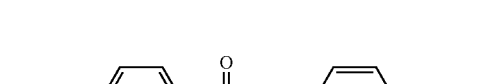
A-27 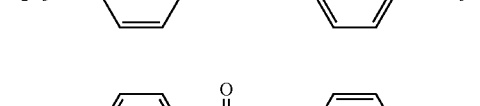
A-28 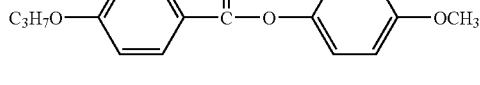
[Formula 4]
A-29 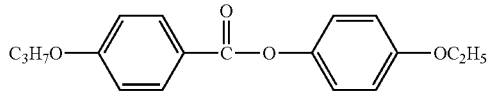
A-30 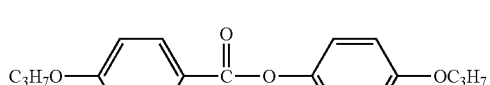

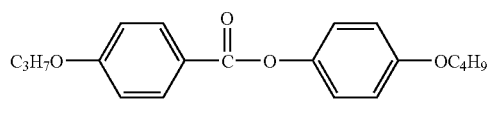 A-31
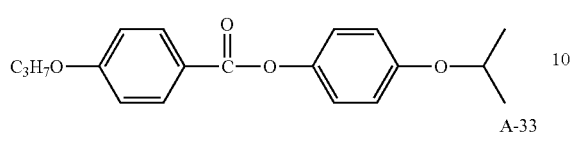 A-32
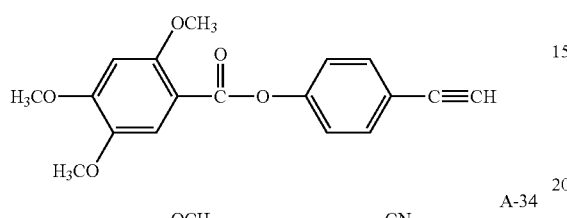 A-33
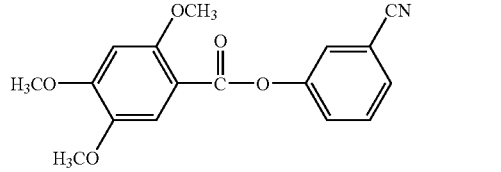 A-34
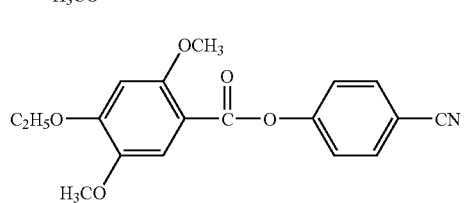 A-35
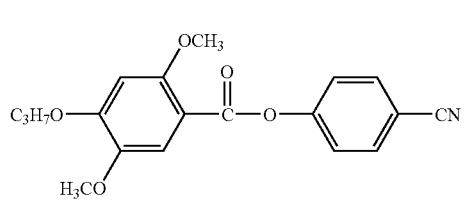 A-36
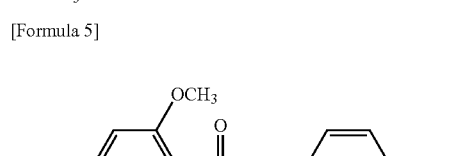 A-37
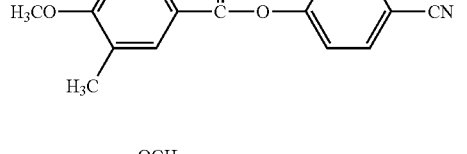 A-38
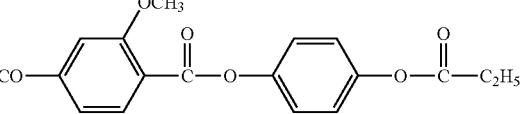 A-39
[Formula 5]
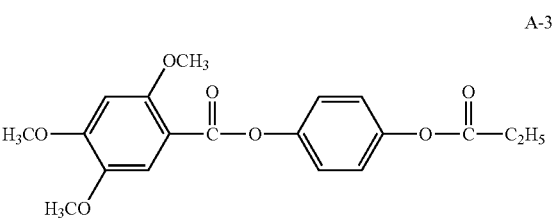 A-40, A-41, A-42, A-43, A-45
[Formula 6]
A-46, A-47, A-48, A-49, A-50
Further, a compound where three aromatic rings are linked by —COO— or —CONR'—, such as those mentioned below, is also preferably used herein.

[Formula 7]
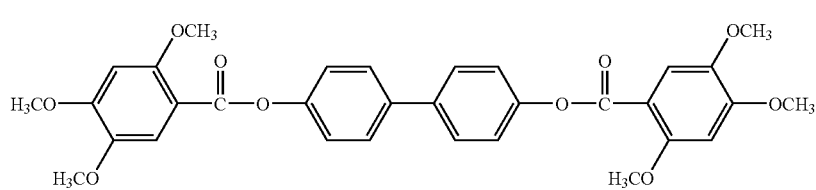 A'-1
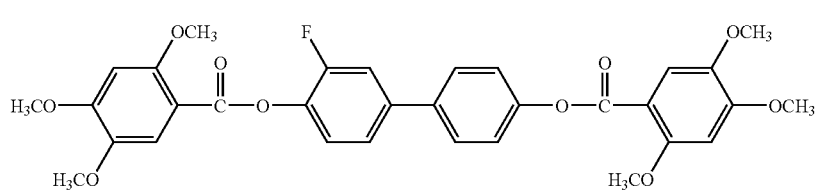 A'-2
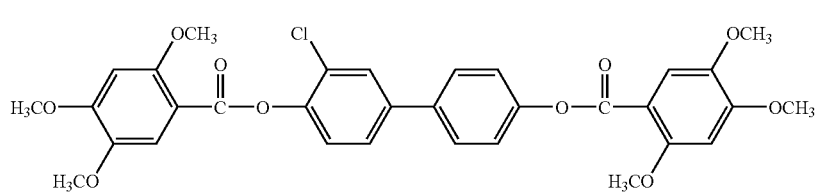 A'-3
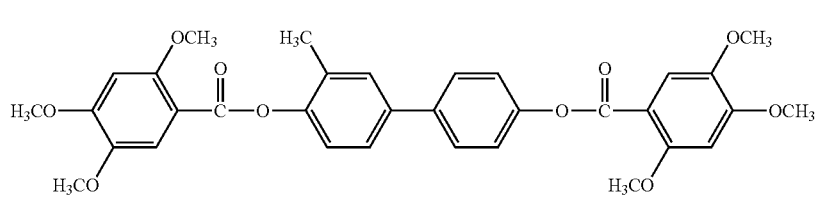 A'-4
[Formula 8]
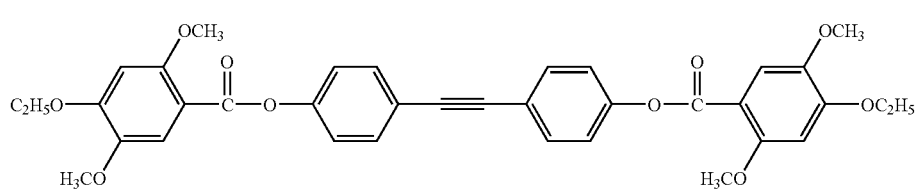 A'-5
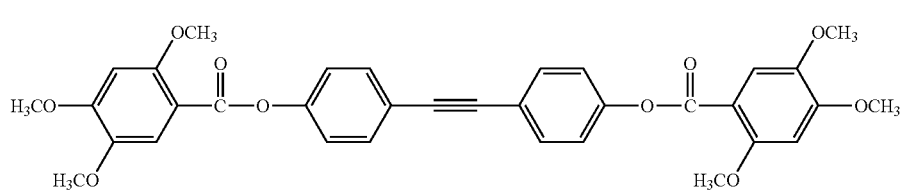 A'-6
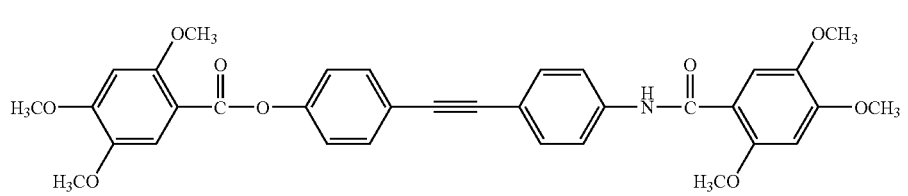 A'-7
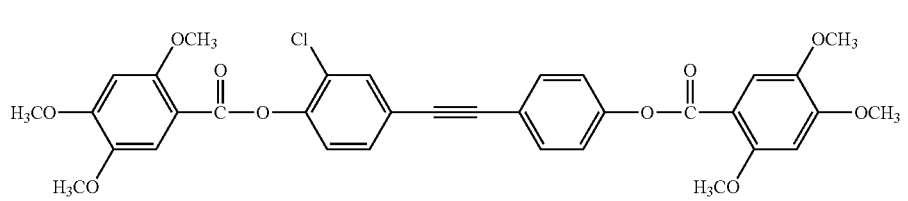 A'-8

[Formula 9]
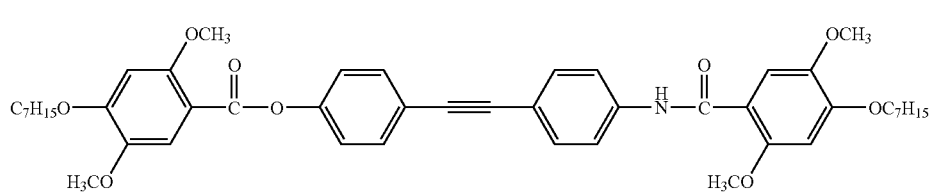
A'-9
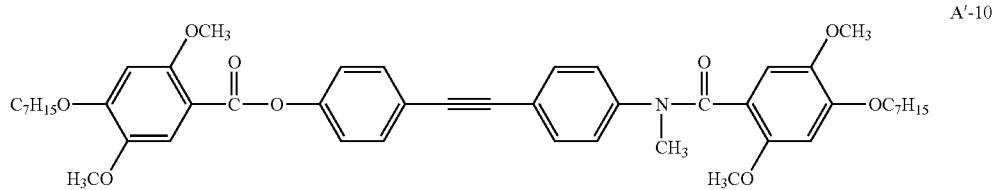
A'-10
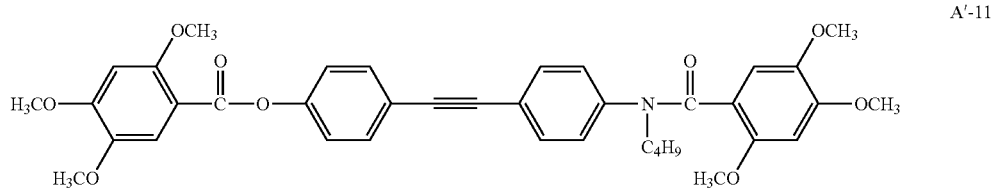
A'-11
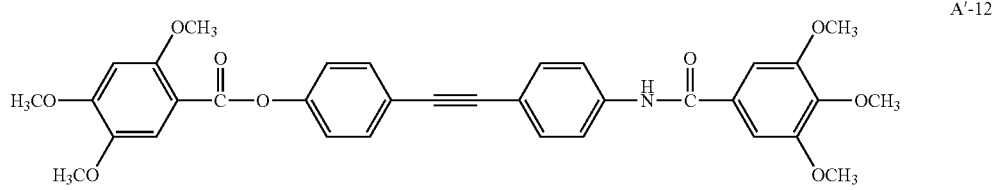
A'-12
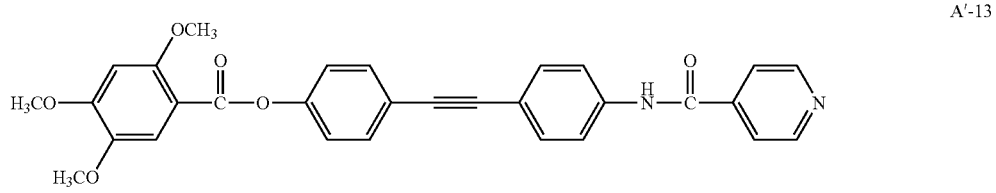
A'-13
[Formula 10]
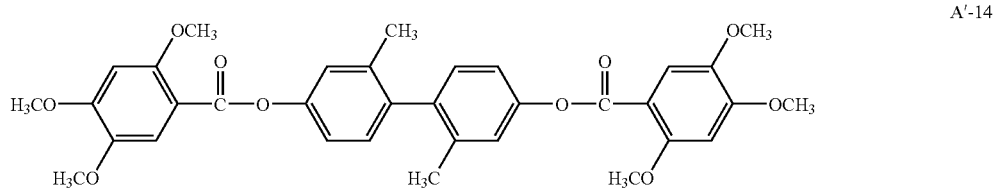
A'-14
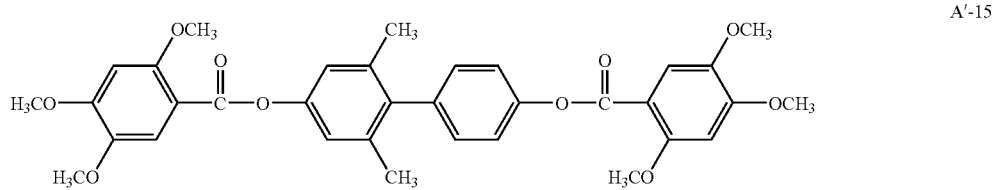
A'-15
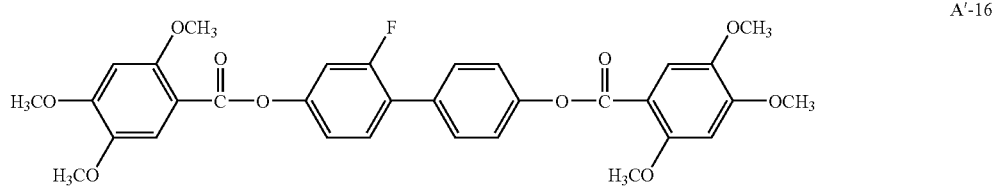
A'-16

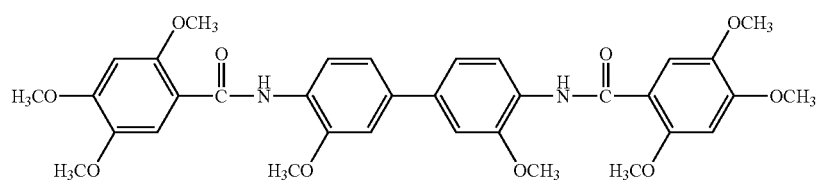
A'-17
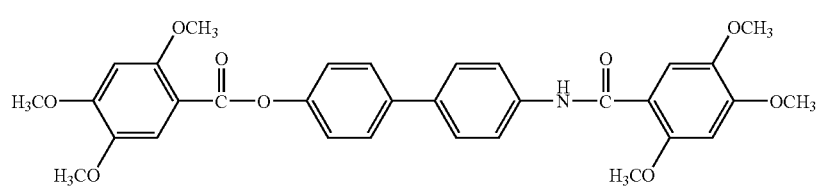
A'-18
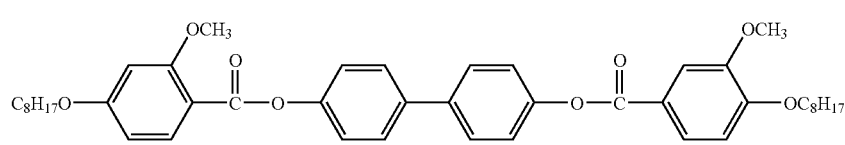
A'-19
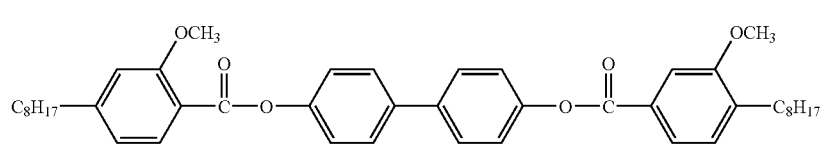
A'-20
[Formula 11]
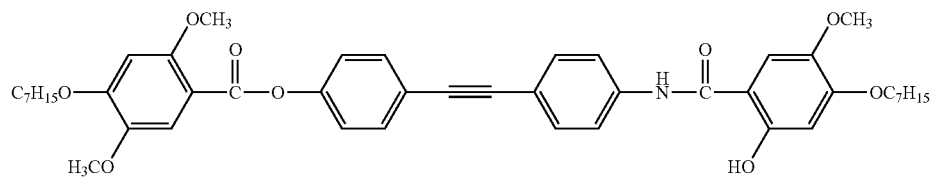
A'-21
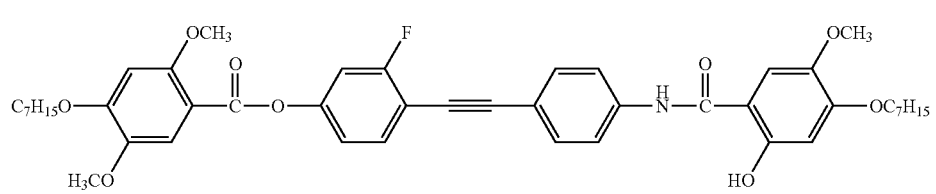
A'-22
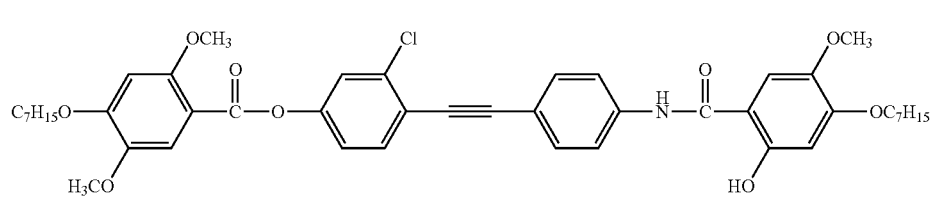
A'-23

A compound where a triazine derivative is substituted with three arylamino groups, such as that mentioned below, is also preferably used.
[Formula 12]
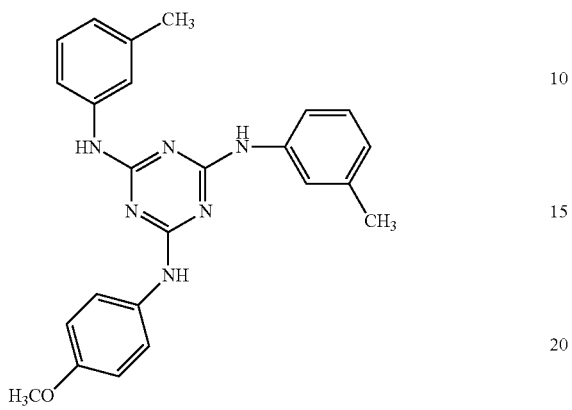
A compound where many aromatic rings are linked linearly, such as those mentioned below, is also preferably used.
[Formula 13]
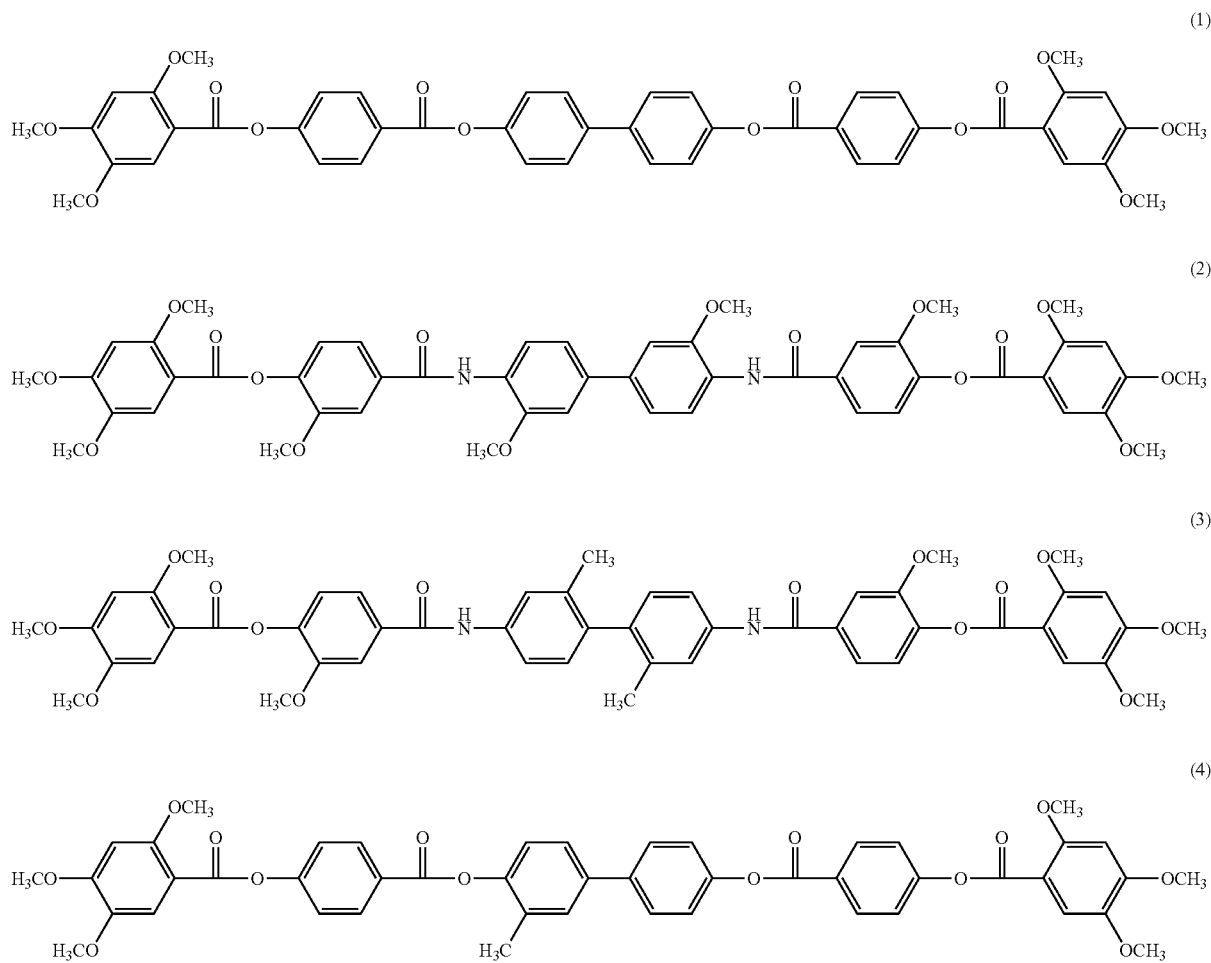

-continued
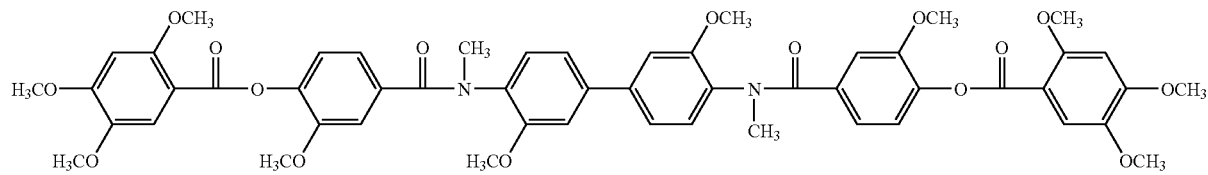
(5)
[Formula 14]
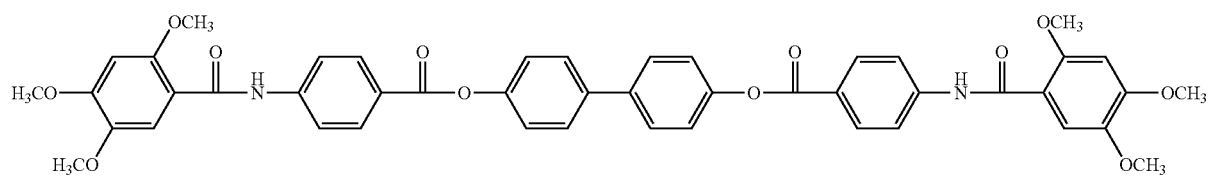
(6)
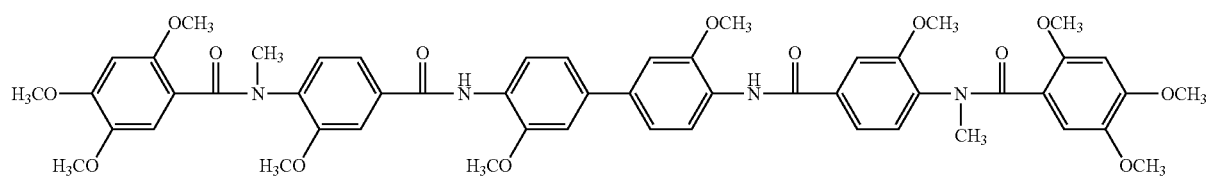
(7)
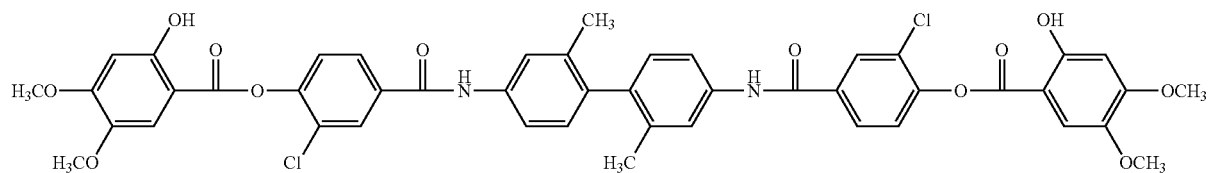
(8)
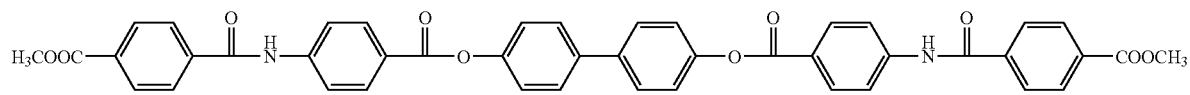
(9)
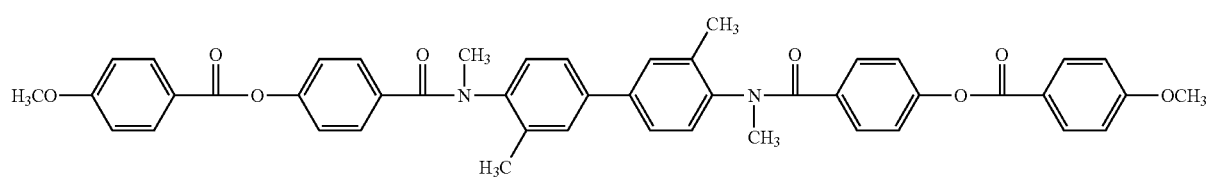
(10)
[Formula 15]
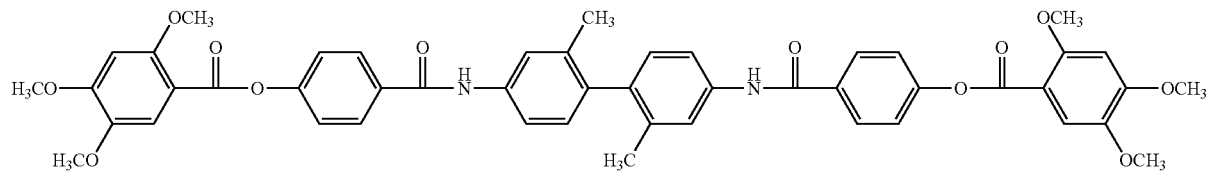
(11)
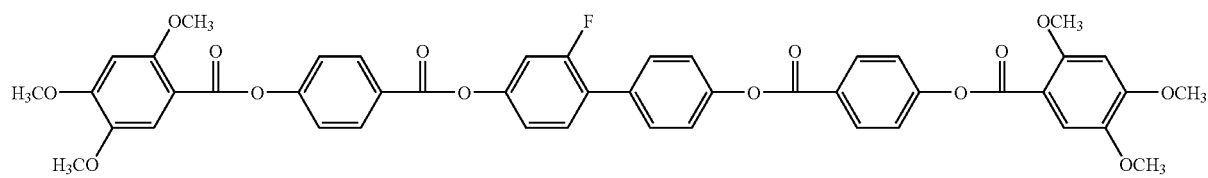
(12)

-continued
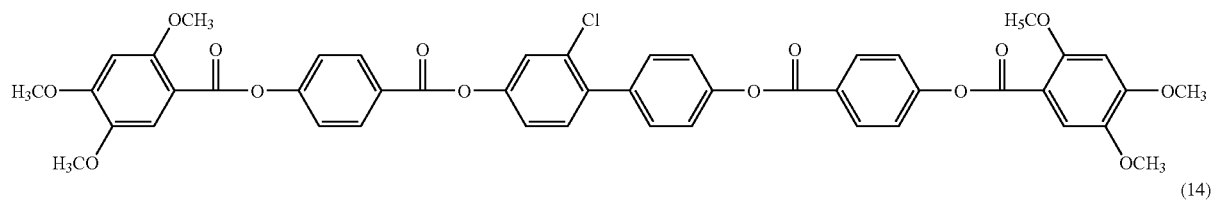
(13)
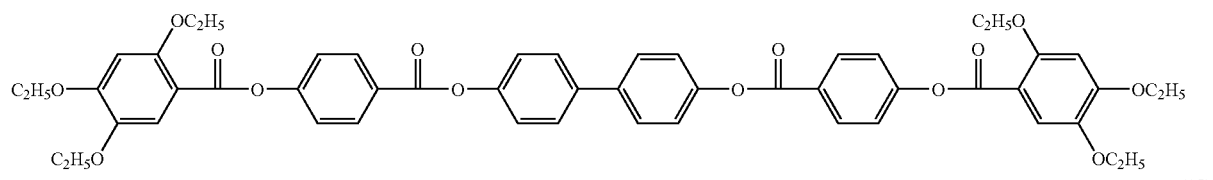
(14)
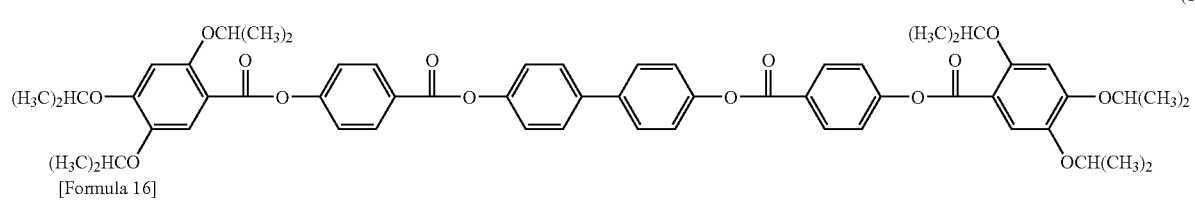
(15)
[Formula 16]
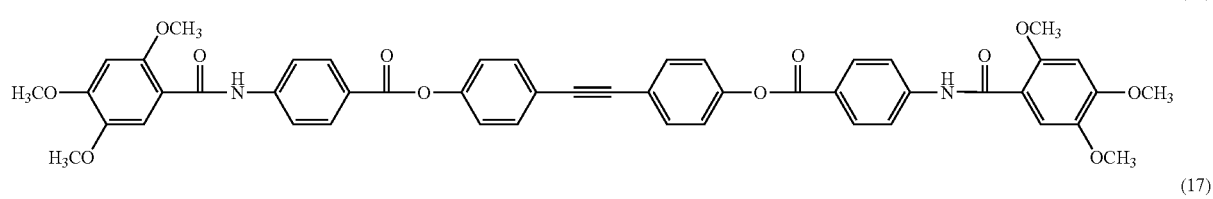
(16)
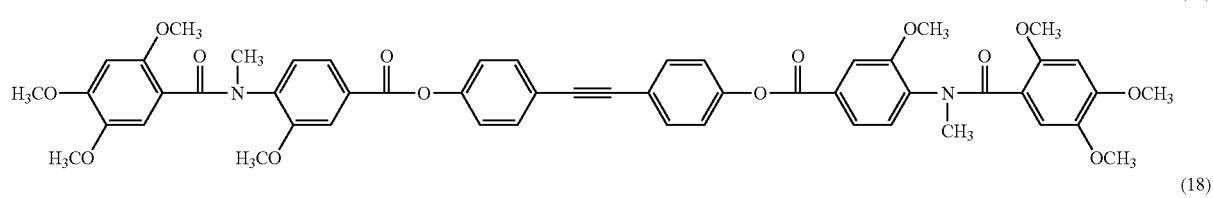
(17)
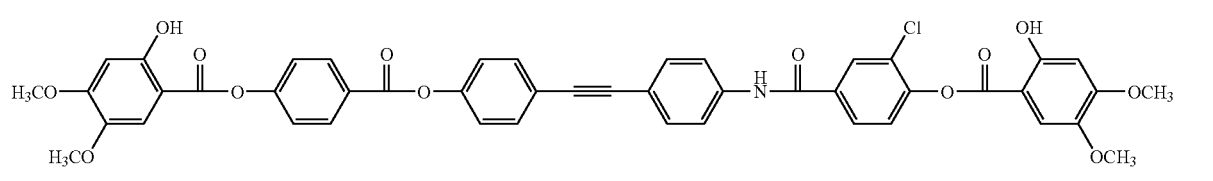
(18)
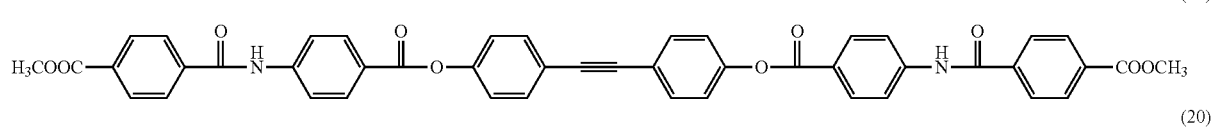
(19)
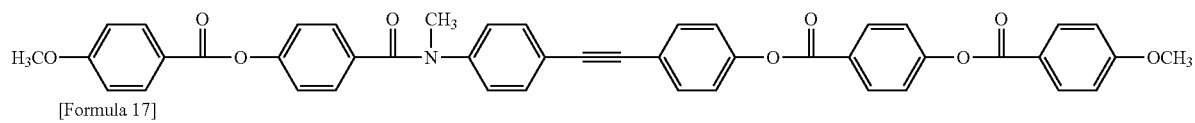
(20)
[Formula 17]
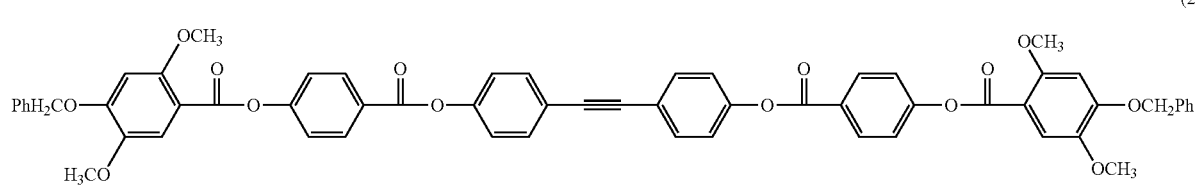
(21)

(22)
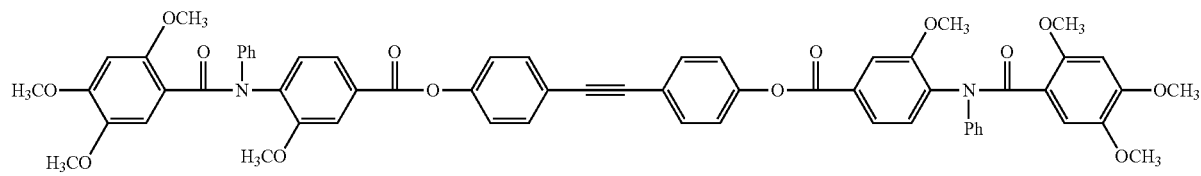
(23)
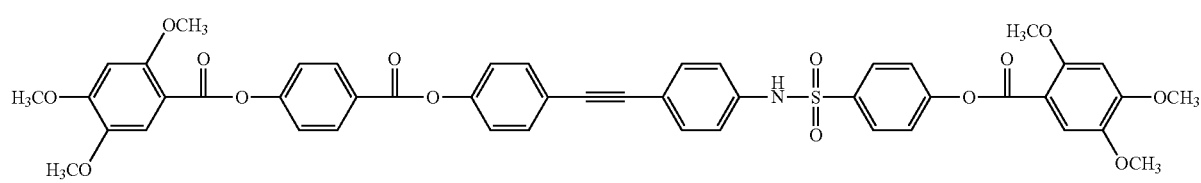
(24)
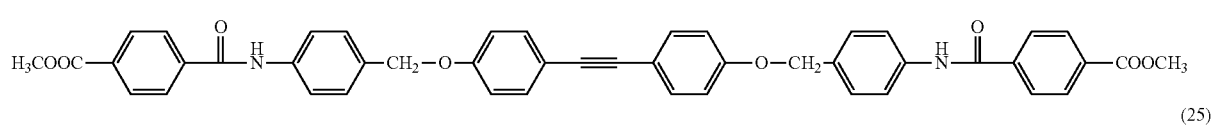
(25)
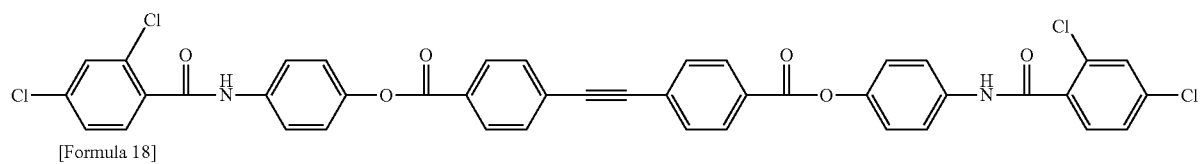
[Formula 18]
(26)
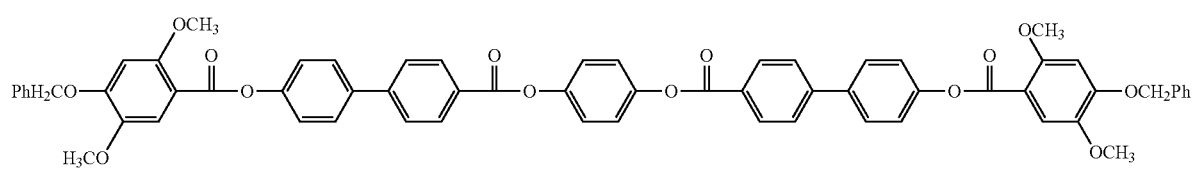
(27)
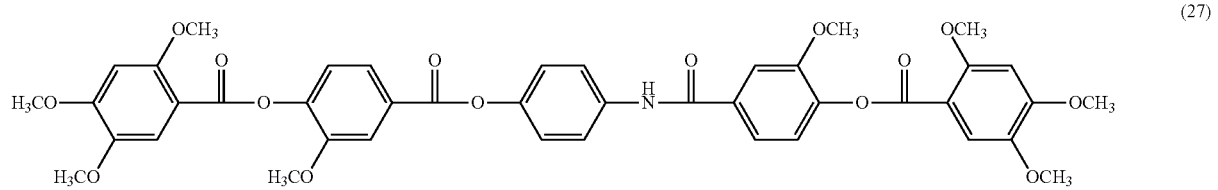
(28)
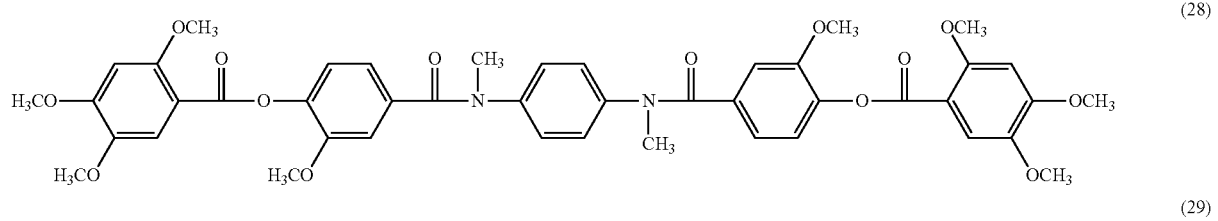
(29)
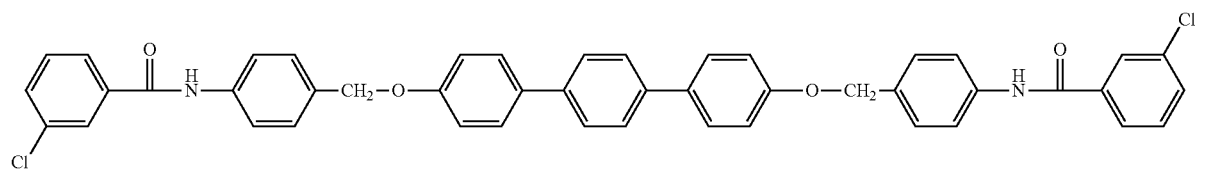
(30)
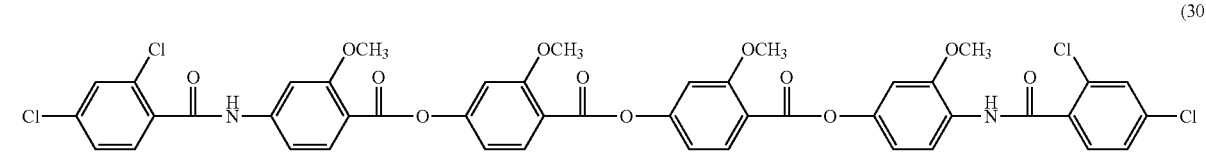

[Formula 19]
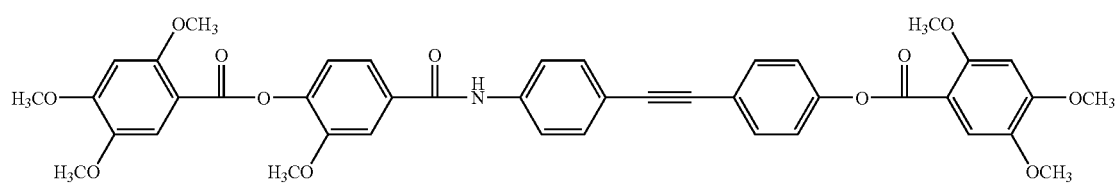
(31)
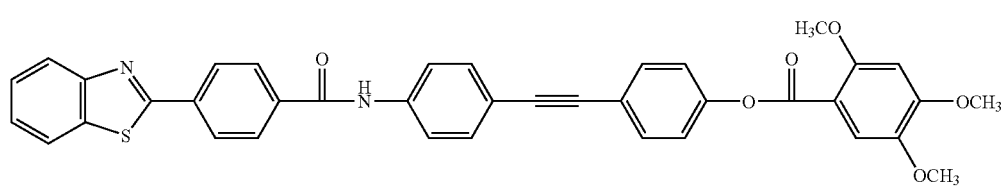
(32)
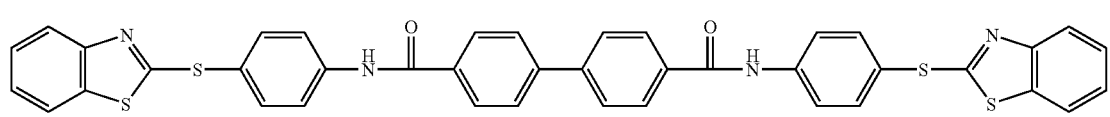
(33)
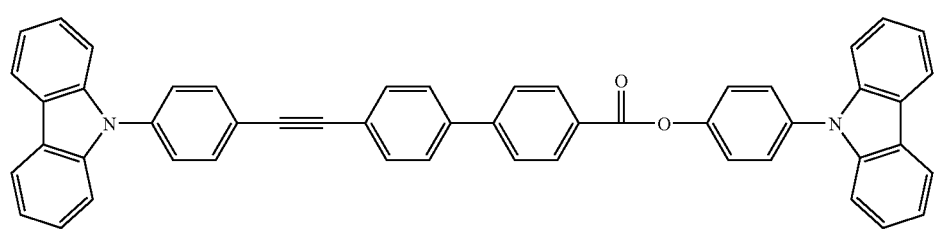
(34)
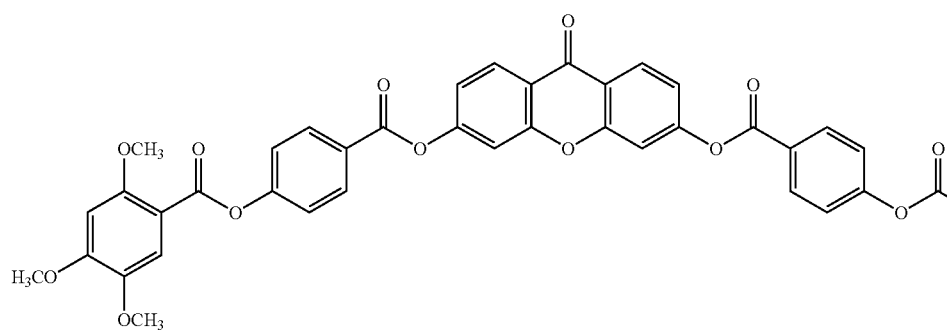
(35)
[Formula 20]
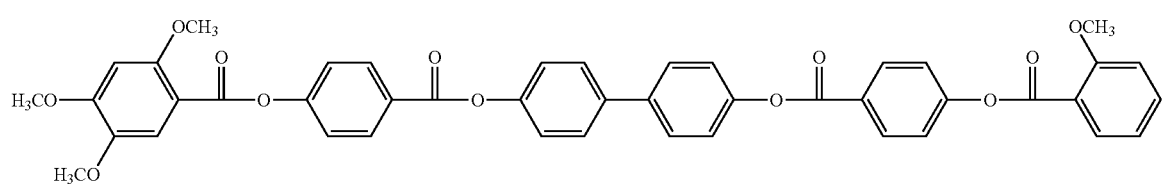
(36)
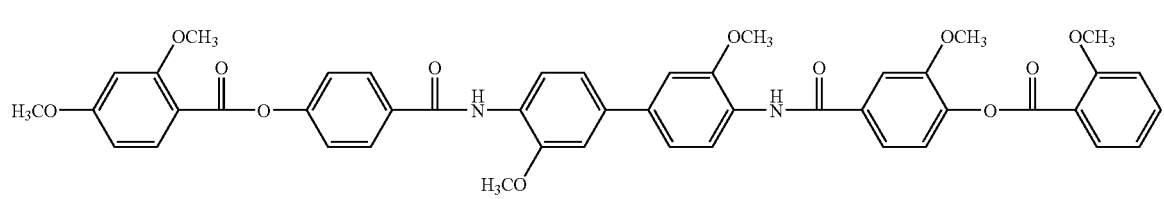
(37)

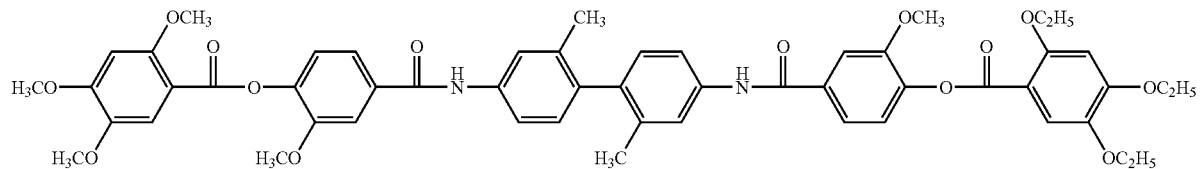

(38)

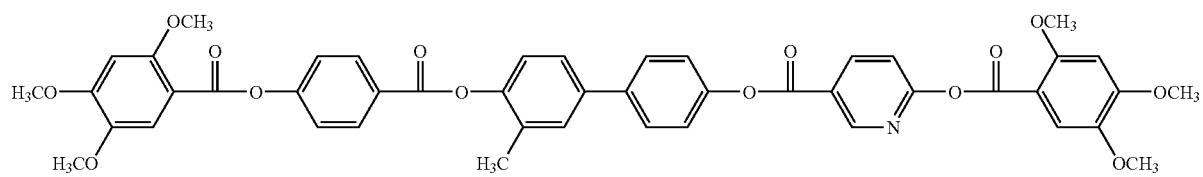

(39)

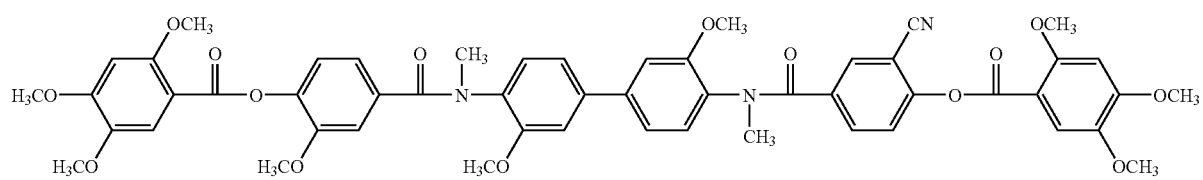

(40)

One or more different types of these compounds may be used herein either singly or as combined. These compounds have another effect of promoting the expression of optical anisotropy (retardation) in addition to their effect of reducing fine projections and depressions. However, plasticizers (e.g., phosphate compounds, phthalate compounds, glycolate compounds) and UV absorbents (e.g., benzophenone compounds, benzotriazole compounds) could not have the effect.

(c) The sulfuric acid amount in the melt is controlled to be from 0 ppm to 200 ppm, more preferably from 0 ppm to 100, even more preferably from 0 ppm to 50 ppm. Sulfuric acid is added as a catalyst in producing cellulose acylate, but when the remaining amount of sulfuric acid is too large as the formed polymer is washed insufficiently, then the acid may cut the main chain of the cellulose acylate in melt-casting film formation, thereby lowering the molecular weight of the polymer. Cellulose acylate having such a low molecular weight is sticky, and in addition, it may change the viscoelastic characteristics of the formed film. Accordingly, the factor limitation is effective for the above (1) to (5) and may exhibit a synergistic effect when combined with (a) and (b). Immediately after its production, the sulfuric acid amount in cellulose acylate may be at least 1000 ppm, but by fully stirring the polymer in hot water at 50° C. to 100° C., the acid amount may be reduced. For efficiently attaining the washing effect, it is effective that the cellulose acylate is ground into fine particles having a particle size of at most 300 meshes.

[2] Improvement of Film Formation Process:

When the layout of a die lip and a casting drum in melt-casting film formation is improved, for example, as follows, then the cellulose acylate film of the invention may be specifically produced. Combined with the above-mentioned improvements of the materials, this improvement may attain a synergistic effect.

(1) Improvement of Die Lip:

The die lip angle is controlled to be from 10 to 60°, preferably from 3° to 45°, more preferably from 5° to 30°. In general, the die lip angle is 90°; however, when it is an acute angle as in FIG. 2, then melt sticking to the die lip may be prevented. When the angle is an acute angle, then a melt hardly sticks to the die lip even though it has swollen (die swelling).

The acute-angled die lip is readily damaged, and therefore its surface is preferably covered with a hard metal. The hard metal includes hard chromium, tungsten, titanium, tungsten carbide, and is more preferably tungsten carbide (WC).

(2) Layout of Die Lip and Casting Drum (CD) (see FIG. 3):

The ratio of the distance (L) between CD and die lip to the radius (R) of CD (L/R) in FIG. 3 is set to fall between 0.7 and 1.3, more preferably between 0.8 and 1.2, even more preferably between 0.9 and 1.1. With that, the melt may be taken straightly by CD from the die lip. Accordingly, the melt is hardly brought into contact with the die lip, and the formation of fine projections and depressions by melt sticking may be prevented. In general, the die lip is usually set just above the center of CD (0 times of the radius).

However, having the layout as above, the distance between the die lip and CD may be broadened, and therefore the melt may neck in between them and it may also neck in on CD, thereby reducing the melt width. Therefore, for reducing the melt necking in on CD, preferably used is an electrostatic charge application method. In the electrostatic charge application method, the overall width or a part of the width may be charged, but preferably only both edges are charged as it is efficient. Preferably, the electrostatic charge application width is from 1 cm to 30 cm at each edge, more preferably from 2 cm to 20 cm, even more preferably from 3 cm to 15 cm. An ordinary method may be employed for electrostatic charge application. Preferably, the voltage is from 1 kV to 50 kV, more preferably from 2 kV to 30 kV, even more preferably from 3 kV to 20 kV. The electrode may be acicular or wiry, and is preferably installed at from 0.5 cm to 20 cm from the site at which the melt is grounded on CD, more preferably at from 1 cm to 10 cm.

(3) Film Formation with Touch Roll:

In the invention, it is desirable that a resin melt is extruded out through a die and then formed into a film on a casting drum, using a touch roll (FIG. 4). In this method, the melt from a die is cooled and solidified, as sandwiched between a casting drum and a touch roll. According to the method, fine projections and depressions formed on the formed film may be smoothed, and blurry displays in liquid-crystal display devices may be thereby reduced.

Preferably, the touch roll is elastic in order that it may reduce the residual strain that may occur while the melt from a die is sandwiched between the rolls. In order that the roll may be elastic, the outer jacket of the roll must be thinner than those of ordinary rolls, and the thickness Z of the outer jacket is preferably from 0.05 mm to 7.0 mm, more preferably from 0.2 mm to 5.0 mm, even more preferably from 0.3 mm to 2.0 mm. For example, the touch roll of the type includes those that are made elastic by reducing their outer jacket thickness, and those constructed by providing an elastic layer around a metal shaft, then covering it with a outer jacket and filling a liquid medium layer between the elastic layer and the outer jacket, thereby producing a touch roll having an ultra-thin outer jacket for touch roll film formation. Preferably, the casting roll and the touch roll have a mirror-finished surface, which has an arithmetical mean height Ra of at most 100 nm, preferably at most 50 nm, more preferably at most 25 nm. Concretely, for example, herein employable are those described in JP-A-11-314263, 2002-36332, 11-235747, 2004-216717, 2003-145609, and WO97/28950.

To that effect, since the touch roll is filled with a fluid inside its thin outer jacket, it may be elastically deformed as depressed by the pressure applied thereto when kept in contact with a casting roll. Accordingly, since the touch roll and the casting roll are in face-to-face contact with each other, their pressure is dispersed and they may attain a low surface pressure. Therefore, no residual strain remains in the film sandwiched between them, and the fine projections and depressions in the film surface may be therefore corrected. Preferably, the linear pressure of the touch roll is from 3 kg/cm to 100 kg/cm, more preferably from 5 kg/cm to 80 kg/cm, even more preferably from 7 kg/cm to 60 kg/cm. The linear pressure as referred to herein means a value to be obtained by dividing the power given to the touch roll by the width of die orifice. When the linear pressure thereof is at least 3 kg/cm, then the touch roll may readily exhibit its pressure effect of reducing the fine projections and depressions of the film. When the linear pressure thereof is at most 100 kg/cm, then the touch roll is hardly deformed and may readily enjoy a condition of its uniform contact with the overall area of a casting roll, and therefore it may readily reduce fine projections and depressions in the overall area of the film.

The temperature of the touch roll is preferably from 60° C. to 160° C., more preferably from 70° C. to 150° C., even more preferably from 80° C. go 140° C. The temperature control within the range may be attained by making a conditioned liquid or vapor run inside the roll.

(Materials and Film Formation)

Materials of the cellulose acylate film of the invention and a process for forming the film are described below.

(1) Materials:

<Cellulose Acylate>

The cellulose acylate of the invention is preferably a lower fatty acid ester of cellulose. The lower fatty acid means a fatty acid having at most 6 carbon atoms, and is preferably esterified with any of an acetyl group, a propionyl group, a butyrate group, a pentanoate group and a hexanoate group. More preferred are those esterified with any of an acetyl group, a propionyl group, a butyrate group and a pentanoate group; and even more preferred are those esterified with any of an acetyl group, a propionyl group and a butyrate group. These lower fatty acid esters of cellulose may comprise only one type of fatty acid or plural types of fatty acids.

Preferably, the cellulose acylate for use in the invention satisfies the following formulae (1) to (3), as it may reduce fine projections and depressions in its film. In particular, Y is preferably at least 0.3.

$$2.6 \leq X+Y \leq 3.0, \quad (1)$$

$$0 \leq X \leq 2.8, \quad (2)$$

$$0.3 \leq Y \leq 3; \quad (3)$$

wherein X represents a substitution degree for an acetyl group; Y represents a total substitution degree for a propionyl group, a butyryl group, a pentanoyl group and a hexanoyl group.

When at least ½ of Y is a propionyl group, then the polymer preferably satisfies the following formulae (4) to (6)

$$2.6 \leq X+Y \leq 2.95, \quad (4)$$

$$0.1 \leq X \leq 1.45, \quad (5)$$

$$1.5 \leq Y \leq 2.95. \quad (6)$$

When less than ½ of Y is a propionyl group, then the polymer preferably satisfies the following formulae (7) to (9):

$$2.6 \leq X+Y \leq 2.95, \quad (7)$$

$$0.5 \leq X \leq 1.8, \quad (8)$$

$$1.3 \leq Y \leq 2.7. \quad (9)$$

When at least ½ of Y is a propionyl group, then more preferably the polymer satisfies the following formulae (10) to (12):

$$2.6 \leq X+Y \leq 2.95, \quad (10)$$

$$0.1 \leq X \leq 0.95, \quad (11)$$

$$2.0 \leq Y \leq 2.95. \quad (12)$$

When less than ½ of Y is a propionyl group, then more preferably the polymer satisfies the following formulae (13) to (15):

$$2.6 \leq X+Y \leq 2.95, \quad (13)$$

$$0.5 \leq X \leq 1.8, \quad (14)$$

$$1.3 \leq Y \leq 2.5. \quad (15)$$

Even more preferred is a cellulose acylate satisfying the following condition. Specifically, when at least ½ of Y is a propionyl group, then the polymer preferably satisfies the following formulae (16) to (18):

$$2.7 \leq X+Y \leq 2.95, \quad (16)$$

$$0.2 \leq X \leq 0.75, \quad (17)$$

$$2.4 \leq Y \leq 2.9. \quad (18)$$

When less than ½ of Y is a propionyl group, then the polymer preferably satisfies the following formulae (19) to (21):

$$2.7 \leq X+Y \leq 2.95, \quad (19)$$

$$0.7 \leq X \leq 1.4, \quad (20)$$

$$1.3 \leq Y \leq 2.0. \quad (21)$$

Of such cellulose acylate, more preferred are those in which the acyl group except acetyl group is a propionyl group than those where it is a butyryl group, as they may more effectively inhibit fine projections and depressions in their films and may be more effective for preventing blurry displays when built in liquid-crystal display devices. Even more preferred are those having a substitution degree for a propionate group is at least 1.5, still more preferably at least 2.0. Further, the degree of polymerization of the polymer is preferably at most 250, more preferably at most 220, even more preferably at most 200. When such cellulose acylate is used, then the formation of fine projections and depressions in its film may be inhibited only by controlling its melt-casting condition even though the above-mentioned "low-molecular compound" is not used, and blurry displays hardly occur in liquid-crystal display devices. This effect is more remarkable in the polymer substituted with a butyryl (Bu) group and an acetyl (Ac) group (CAB), than in the polymer substituted with a propionyl (Pr) group and an acetyl (Ac) group (CAP).

A basic principle of a method for producing these cellulose acylates is described in Migita et al's Wood Chemistry, pp. 180-190 (by Kyoritsu Publishing, 1968). One typical production method is a liquid-phase acetylation method with a carboxylic acid anhydride-acetic acid-sulfuric acid catalyst. Concretely, a cellulose material such as cotton linter or wood pulp is pretreated with a suitable amount of acetic acid, then put into a previously-cooled carboxylation mixture and esterified therein to give a complete cellulose acylate (the total degree of acyl substitution at 2-, 3- and 6-positions is nearly 3.00). The carboxylation mixture generally comprises acetic acid as a solvent, a carboxylic acid anhydride as an esterifying agent and sulfuric acid as a catalyst. The amount of the carboxylic acid anhydride is generally a stoichiometric excessive amount over the total of cellulose to react with it and water existing in the system. After the acylation, an aqueous solution of a neutralizing agent (e.g., calcium, magnesium, iron, aluminium or zinc carbonate, acetate or oxide) is added to the system for the purpose of hydrolyzing the excessive carboxylic acid anhydride remaining in the system and neutralizing a part of the esterifying agent therein. Next, the obtained complete cellulose acylate is saponified and ripened as kept at 50 to 90° C. in the presence of a small amount of an acetylation catalyst (in general, the remaining acetic acid), whereby it is converted into a cellulose acylate having a desired degree of acyl substitution and a desired degree of polymerization. At the time when the desired cellulose acylate is obtained, the catalyst remaining in the system is completely neutralized with the above-mentioned neutralizing agent, or not neutralized, the cellulose acylate solution is put into water or diluted sulfuric acid (or water or diluted sulfuric acid is put into the cellulose acylate solution) to thereby separate, wash and stabilize the cellulose acylate, and collect it.

Regarding the degree of polymerization thereof, the cellulose acylate preferred for use in the invention may have a mean degree of polymerization of from 100 to 260, preferably from 120 to 250, even more preferably from 130 to 240. The mean degree of polymerization may be measured according to a Uda et al's limiting viscosity method (Kazuo Uda, Hideo Saito, the Journal of the Fiber Society of Japan, Vol. 18, No. 1, pp. 105-120, 1962). Further, it is described in detail in JP-A-9-95538.

The control of the degree of polymerization may also be attained by removing a low-molecular-weight component. When a low-molecular component is removed, then the mean degree of polymerization (degree of polymerization) may increase, but the viscosity may be lower than that of ordinary cellulose acylate, and therefore this is useful. The removal of a low-molecular component may be attained by washing cellulose acylate with a suitable organic solvent. Further, the molecular weight may also be controlled according to a polymerization method. For example, in case where a cellulose acylate having a small amount of a low-molecular component is produced, it is desirable that the amount of the sulfuric acid catalyst in acetylation is controlled to be from 0.5 to 25 parts by mass relative to 100 parts by weight of cellulose. When the amount of the sulfuric acid catalyst is controlled to fall within the above range, then a cellulose acylate preferred in point of its molecular weight distribution (that is, having a uniform molecular weight distribution) may be produced.

The cellulose ester for use in the invention preferably has a ratio of weight-average molecular weight Mw/number-average molecular weight Mn of from 1.5 to 5.5, more preferably from 2.0 to 5.0, even more preferably from 2.5 to 5.0, still more preferably from 3.0 to 5.0.

One or more such cellulose acylates may be used herein either singly or as combined. Any other polymer component than cellulose ester may be suitably mixed with the cellulose acylate. The polymer component to be mixed preferably has good compatibility with cellulose ester; more preferably, when formed into a film, it has a transmittance of at least 80%, even more preferably at least 90%, still more preferably at least 92%.

<Additives>

In addition to the above-mentioned additives, other various additives (e.g., plasticizer, UV inhibitor, antioxidant, fine particles, IR absorbent, surfactant) may be added.

As the plasticizer, those described in JP-A-2000-352620 may be used, and its amount may be from 0.1 to 25% by mass relative to cellulose acylate, more preferably from 1 to 20% by mass, even more preferably from 3 to 15% by mass.

The plasticizer includes, for example, alkylphthalylalkyl glycolates, phosphates and carboxylates.

The alkylphthalylalkyl glycolates include, for example, methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate, octylphthalylmethyl glycolate, octylphthalylethyl glycolate.

The phosphates include, for example, triphenyl phosphate, tricresyl phosphate, phenyl diphenyl phosphate. Further, the phosphate plasticizers described in JP-T-6-501040, claims 3-7 are also preferably used herein. As mentioned in the above, phosphates are effective for promoting crystallization of cellulose acylate to produce streaks, but combined with the low-molecular compound in the invention, such their effect may be prevented. Accordingly, the low-molecular compound in the invention may be combined with a phosphate.

The carboxylates include, for example, phthalates such as dimethyl phthalate, diethyl phthalate, dibutyl phthalate, dioctyl phthalate and diethylhexyl phthalate; citrates such as acetyltrimethyl citrate, acetyltriethyl citrate, acetyltributyl citrate; as well as adipates such as dimethyl adipate, dibutyl adipate, diisobutyl adipate, bis(2-ethylhexyl)adipate, diisodecyl adipate and bis(butyl diglycoladipate). In addition, also preferably, butyl oleate, methylacetyl ricinoleate, dibutyl sebacate and triacetin may be used either singly or as combined with the above.

Polyalcohol plasticizers are also preferably used herein. The polyalcohol plasticizers include glycerin-type ester compounds such as glycerin esters, diglycerin esters; polyalkylene glycols such as polyethylene glycol, polypropylene glycol; and compounds of polyalkylene glycols with an acyl group bonding to the hydroxyl group thereof, which are well compatible with cellulose fatty acid esters and which remarkably exhibit their thermo-plasticization effect. Though not comparable to the above-mentioned "low-molecular compound, in the invention, these polyalcohol plasticizers are effective for preventing the melt from sticking to a screw and for enabling a smooth flow of the melt to prevent the generation of V-shaped streaks.

Concretely, the glycerin esters include glycerin diacetate stearate, glycerin diacetate palmitate, glycerin diacetate myristate, glycerin diacetate laurate, glycerin diacetate caprate, glycerin diacetate nonanoate, glycerin diacetate octanoate, glycerin diacetate heptanoate, glycerin diacetate hexanoate, glycerin diacetate pentanoate, glycerin diacetate oleate, glycerin acetate dicaprate, glycerin acetate dinonanoate, glycerin acetate dioctanoate, glycerin acetate diheptanoate, glycerin acetate dicaproate, glycerin acetate divalerate, glycerin acetate dibutyrate, glycerin dipropionate caprate, glycerin dipropionate laurate, glycerin dipropionate myristate, glycerin dipropionate palmitate, glycerin dipropionate stearate, glycerin dipropionate oleate, glycerin tributyrate, glycerin tripentanoate, glycerin monopalmitate, glycerin monostearate, glycerin distearate, glycerin propionate laurate, glycerin oleate propionate, to which, however, the invention should not be limited. One or more of these may be used herein either singly or as combined.

Of the above, preferred are glycerin diacetate caprylate, glycerin diacetate pelargonate, glycerin diacetate caprate, glycerin diacetate laurate, glycerin diacetate myristate, glycerin diacetate palmitate, glycerin diacetate stearate, glycerin diacetate oleate.

Examples of the diglycerin esters are mixed acid esters of diglycerin and others, for example, diglycerin tetraacetate, diglycerin tetrapropionate, diglycerin tetrabutyrate, diglycerin tetravalerate, diglycerin tetrahexanoate, diglycerin tetraheptanoate, diglycerin tetracaprylate, diglycerin tetrapelargonate, diglycerin tetracaprate, diglycerin tetralaurate, diglycerin tetramyristate, diglycerin tetrapalmitate, diglycerin triacetate propionate, diglycerin triacetate butyrate, diglycerin triacetate valerate, diglycerin triacetate hexanoate, diglycerin triacetate heptanoate, diglycerin triacetate caprylate, diglycerin triacetate pelargonate, diglycerin triacetate caprate, diglycerin triacetate laurate, diglycerin triacetate myristate, diglycerin triacetate palmitate, diglycerin triacetate stearate, diglycerin triacetate oleate, diglycerin diacetate dipropionate, diglycerin diacetate dibutyrate, diglycerin diacetate divalerate, diglycerin diacetate dihexanoate, diglycerin diacetate dipentanoate, diglycerin diacetate dicaprylate, diglycerin diacetate dipelargonate, diglycerin diacetate dicaprate, diglycerin diacetate dilaurate, diglycerin diacetate dimyristate, diglycerin diacetate dipalmitate, diglycerin diacetate distearate, diglycerin diacetate dioleate, diglycerin acetate tripropionate, diglycerin acetate tributyrate, diglycerin acetate trivalerate, diglycerin acetate trihexanoate, diglycerin acetate triheptanoate, diglycerin acetate tricaprylate, diglycerin acetate tripelargonate, diglycerin acetate tricaprate, diglycerin acetate trilaurate, diglycerin acetate trimyristate, diglycerin acetate tripalmitate, diglycerin acetate tristearate, diglycerin acetate trioleate, diglycerin laurate, diglycerin stearate, diglycerin caprylate, diglycerinmyristate, diglycerinoleate, to which, however, the invention should not be limited. One or more of these may be used herein either singly or as combined.

Of the above, preferred are diglycerin tetraacetate, diglycerin tetrapropionate, diglycerin tetrabutyrate, diglycerin tetracaprylate, diglycerin tetralaurate.

Examples of the polyalkylene glycols are polyethylene glycol and polypropylene glycol having a mean molecular weight of from 200 to 1000, to which, however, the invention should not be limited. One or more of these may be used herein either singly or as combined.

Examples of the compounds of polyalkylene glycols with an acyl group bonding to the hydroxyl group thereof are polyoxyethylene acetate, polyoxyethylene propionate, polyoxyethylene butyrate, polyoxyethylene valerate, polyoxyethylene caproate, polyoxyethylene heptanoate, polyoxyethylene octanoate, polyoxyethylene nonanoate, polyoxyethylene caprate, polyoxyethylene laurate, polyoxyethylene myristate, polyoxyethylene palmitate, polyoxyethylene stearate, polyoxyethylene oleate, polyoxyethylene linolate, polyoxypropylene acetate, polyoxypropylene propionate, polyoxypropylene butyrate, polyoxypropylene valerate, polyoxypropylene caproate, polyoxypropylene heptanoate, polyoxypropylene octanoate, polyoxypropylene nonanoate, polyoxypropylene caprate, polyoxypropylene laurate, polyoxypropylene myristate, polyoxypropylene palmitate, polyoxypropylene stearate, polyoxypropylene oleate, polyoxypropylene linolate, to which, however, the invention should not be limited. One or more of these may be used herein either singly or as combined.

IR absorbent dyes, for example, as in JP-A-2001-194522 are usable herein; and UV absorbents, for example, as in JP-A-2001-151901 are usable herein. The amount thereof is preferable from 0.001 to 5% by mass of cellulose acylate. Preferably, the fine particles for use herein have a mean particle size of from 5 to 3000 nm, and they may be formed of a metal oxide or a crosslinked polymer. Their amount to be in cellulose acylate is preferably from 0.001 to 5% by mass of the polymer. The amount of the antioxidant is preferably from 0.0001 to 2% by mass of cellulose acylate.

For stabilizers for thermal degradation inhibition or discoloration inhibition, herein usable are epoxy compounds, weak organic acids, phosphates, thiophosphate compounds, phosphites (e.g., as in JP-A-51-70316, 10-306175, 57-78431, 54-157159, 55-13765), phosphite compounds (as in JP-A-2004-182979). One or more of these may be used herein either singly or as combined.

(2) Film Formation:

<Pelletization>

Preferably, cellulose acylate is pelletized; and the size of the pellets is preferably from 1 mm to 10 cm$^3$, more preferably from 5 mm$^3$ to 5 cm$^3$, even more preferably from 10 mm$^3$ to 3 cm$^3$. Preferably, the above-mentioned additives are added during the pelletization. After that, the pellets are dried so as to have a water content of at most 0.1%.

<Melt Film Formation>

(a) Predrying:

The dried pellets prepared are put into the hopper of a melt extruder. In this stage, the hopper is kept preferably at a temperature falling between (Tg−50° C.) and (Tg+30° C.), more preferably between (Tg−40° C.) and (Tg+10° C.), even more preferably between (Tg−30° C.) and Tg. In that condition, water is prevented from being re-adsorbed by the polymer in the hopper and the drying efficiency may be therefore higher.

(b) Kneading Extrusion:

Using a screw having the above-mentioned compression ratio, cellulose acylate is melt-kneaded at the above-mentioned melting temperature. In this stage, the melting temperature may be kept constant all the time, or may be varied to have a controlled temperature profile that varies in some sections. More preferably, the temperature on the upstream side (hopper side) is kept higher than the temperature on the downstream side (T-die side) by from 1° C. to 50° C., more preferably by from 2° C. to 30° C., even more preferably by from 3° C. to 20° C., since the decomposition of cellulose acylate may be more favorably prevented. Specifically, for promoting the melting, the upstream side that governs it is kept at a higher temperature, and after melted, the temperature is kept lower for the purpose of preventing the decomposition. Preferably, the kneading time is from 2 minutes to 60 minutes, more preferably from 3 minutes to 40 minutes, even more preferably from 4 minutes to 30 minutes. The mean temperature in the melt extruder ((temperature of each zone in the melt extruder)×(value obtained by dividing the residence time in each zone by the overall residence time)) is preferably from 170° C. to 230° C., more preferably from 180° C. to 220° C., even more preferably from 190° C. to 215° C. Also preferably, the inner atmosphere of the melt extruder is an inert gas (e.g., nitrogen) atmosphere.

(c) Casting:

The resin melt is introduced into a gear pump, the pulsation of the extruder is removed, and the melt is filtered through a metal mesh filter or the like, and then extruded out through the T-die fitted after the filter onto a cooling drum to form a sheet thereon. In this stage, the die temperature is so set that the melt could have the above-mentioned physical data.

The extrusion is attained through the above-mentioned die. Preferably, the die lip distance is from 1 time to 10 times the thickness of the film to be formed, more preferably from 2 times to 8 times, even more preferably from 3 times to 7 times. The thick sheet thus extruded out through the die lip is controlled to have a desired thickness by controlling the peripheral speed of CD. Preferably, the die lip temperature is from 180° C. to 250° C., more preferably from 190° C. to 240° C., even more preferably from 200° C. to 230° C.

The extrusion may be for single-layer film formation, or may be multi-layer film formation via a multi-manifold die or a feed block die.

After that, the resin is extruded out onto a casting drum (CD) in the manner as mentioned above. The temperature of CD may fall between (Tg−50° C.) and (Tg+10° C.), more preferably between (Tg−30° C.) and (Tg+5° C.), even more preferably between (Tg−20° C.) and Tg° C. (The resin Tg indicates Tg of a mixture of cellulose acylate and additives thereto.) Preferably, the number of CDs is from 1 to 10, more preferably from 2 to 5.

After the melt is solidified on the casting drum, it is peeled off, then led to nip rolls and wound up. The winding speed is preferably from 10 m/min to 100 m/min, more preferably from 15 m/min to 80 m/min, even more preferably from 20 m/min to 70 m/min.

The width of the film formed is preferably from 0.5 m to 5 m, more preferably from 0.7 m to 4 m, even more preferably from 1 m to 3 m.

Preferably, the thus-obtained film is trimmed at both edges thereof and then wound up. The trimmed scraps may be ground, then optionally granulated, depolymerized/repolymerized, and recycled as the starting material for the same type or a different type of films. Before wound up, it is also desirable that the film is laminated with an additional film on at least one surface thereof for preventing it from being scratched and damaged.

Preferably, the elastic modulus of the thus-obtained film is from 1.5 kN/mm² to 2.9 kN/mm², more preferably from 1.7 kN/mm² to 2.8 kN/mm², even more preferably from 1.8 kN/mm² to 2.6 kN/mm². Preferably, Tg (Tg of the film, or that is, this indicates Tg of the mixture of cellulose acylate and additives thereto) is from 95° C. to 145° C., more preferably from 100° C. to 140° C., even more preferably from 105° C. to 135° C.

Thus obtained, the film preferably has a thickness of from 50 μm to 250 μm, more preferably from 70 μm to 200 μm, even more preferably from 90 μm to 180 μm.

(3) Stretching:

Stretching the film is attained preferably at Tg to (Tg+50° C.), more preferably at (Tg+3° C.) to (Tg+30° C.), even more preferably at (Tg+5° C.) to (Tg+20° C.). Preferably, the draw ratio in stretching is from 10% to 300% in at least one direction, more preferably from 15% to 200%, even more preferably from 20% to 150%. The stretching may be attained in one stage or in multiple stages. The draw ratio as referred to herein may be obtained according to the following formula:

Draw Ratio (%)=100×{(length after stretching)−(length before stretching)}/(length before stretching).

The stretching may be made in the machine direction (machine-direction stretching), using at least two pairs of nip rolls of which the peripheral speed on the take-out side is kept higher; or may be made in the cross direction (the direction perpendicular to the machine direction) (cross-direction stretching), with both edges of the film held zipped. A simultaneous biaxial stretching method as in JP-A-2000-37772, 2001-113591, 2002-103445 may also be employed herein.

For freely controlling the ratio of Rth/Re in machine-direction stretching, it may be attained by controlling the value obtained by dividing the nip roll distance by the film width (aspect ratio). Specifically, when the aspect ratio is made small, then the ratio Rth/Re may be made large. In cross-direction stretching, it may be controlled by stretching the film in the machine direction in addition to stretching it in the cross direction, or may be controlled by relaxing the film. Specifically, the ratio Rth/Re may be increased by stretching the film in the machine direction, or on the contrary, the ratio Rth/Re may be decreased by relaxing the film in the machine direction. Further, combining the machine-direction stretching and the cross-direction stretching makes it possible to control Re and Rth by reducing Re (the draw ratio in stretching in the machine direction is made nearer to that in the cross direction) with increasing Rth (the a real draw ratio (machine-direction draw ratio×cross-direction draw ratio) is increased). In the invention, it is desirable that the difference between the machine-direction draw ratio and the cross-direction draw ratio is from 10% to 100%, more preferably from 20% to 80%, even more preferably from 25% to 60% so that the film may be stretched asymmetrically. In this case, it is more desirable that the draw ratio in stretching in the cross direction is larger.

The stretching speed is preferably from 10%/min to 10000%/min, more preferably from 20%/min to 1000%/min, even more preferably from 30%/min to 800%/min.

Preferably, Re and Rth of the stretched cellulose acylate film satisfy the following formulae (a) to (c):

$$Rth \geq Re, \quad (a)$$

$$200 \geq Re \geq 0, \quad (b)$$

$$500 \geq Rth \geq 30. \quad (c)$$

More preferably, Re and Rth satisfy the following formulae (d) to (f)

$$Rth \geq Re \times 1.1, \quad (d)$$

$$150 \geq Re \geq 10, \quad (e)$$

$$400 \geq Rth \geq 50. \quad (f)$$

Even more preferably, Re and Rth satisfy the following formulae (g) to (i)

$$Rth \geq Re \times 1.2, \quad (g)$$

$$100 \geq Re \geq 20, \quad (h)$$

$$350 \geq Rth \geq 80. \quad (i)$$

In this description, The retardation value Re and the retardation value Rth are computed based on the following: $Re(\lambda)$ and $Rth(\lambda)$ indicate the in-plane retardation and the thickness-direction retardation, respectively, of the film at a wavelength $\lambda$. $Re(\lambda)$ may be determined by applying light having a wavelength of $\lambda$ nm to the film in the normal direction of the film, using KOBRA 21ADH (by Oji Scientific Instruments). $Rth(\lambda)$ is determined as follows: Based on the retardation data determined in three different directions, or that is, Re (X) as above, a retardation value measured by applying light having a wavelength $\lambda$ nm to the film in the direction tilted by +40° relative to the normal direction of the film with the slow axis (judged by KOBRA 21ADH) as the tilt axis (rotation axis) thereof, and a retardation value measured by applying light having a wavelength $\lambda$ nm to the film in the direction tilted by −40° relative to the normal direction of the film with the slow axis as the tilt axis thereof, $Rth(\lambda)$ is computed by KOBRA 21ADH. In this case, the estimated value of the mean refractive index of the film and the film thickness must be inputted. nx, ny and nz are also computed by KOBRA 21ADH in addition to $Rth(\lambda)$. The mean refractive index of cellulose acylate is 1.48; and the data of some other polymer films than cellulose acetate for optical use are as follows: Cyclo-olefin polymer (1.52), polycarbonate (1.59), polymethyl methacrylate (1.49), polystyrene (1.59). For the mean refractivity data of still other already-existing polymer materials, referred to are the numerical data in Polymer Handbook (by John Wiley & and Sons, Inc.) or those in polymer film catalogues. Materials of which the mean refractive index is unknown may be analyzed with an Abbe's refractometer to determine their data. Unless otherwise specifically indicated, $\lambda$ in this description is at 550±5 nm or at 590±5 nm.

Preferably, the angle θ formed by the film-traveling direction (machine direction) and the slow axis of Re of the film is nearer to 0°, +90° or −90°. Concretely, in machine-direction stretching, the angle is preferably nearer to 0°, more preferably to 0±3°, even more preferably to 0±2°, still more preferably to 0±1°. In cross-direction stretching, the angle is preferably 90±3° or −90±3°, more preferably 90±2° or −90±2°, even more preferably 90±1° or −90±1°.

The thickness of the stretched cellulose acylate film is preferably from 15 μm to 200 μm, more preferably from 30 μm to 170 μm, even more preferably from 40 μm to 140 μm. Both stretched and unstretched, the thickness unevenness of the film is preferably from 0% to 2%, more preferably from 0% to 1.5%, even more preferably from 0% to 1% both in the machine direction and in the cross direction thereof.

The tensile modulus of the thus-obtained cellulose acylate film is preferably from 1.5 kN/mm² to 2.9 kN/mm², more preferably from 1.7 kN/mm² to 2.8 kN/mm², even more preferably from 1.8 kN/mm² to 2.6 kN/mm². Tg (this is Tg of the film, or that is, this indicates Tg of the mixture of cellulose acylate and additives thereto) is preferably from 95° C. to 145° C., more preferably from 100° C. to 140° C., even more preferably from 105° C. to 135° C. After stretched, the thickness of the film is preferably from 30 μm to 200 μm, more preferably from 40 μm to 150 μm, even more preferably from 50 μm to 100 μm.

These unstretched and stretched cellulose acylate films may be used either singly or as combined with a polarizer; or a liquid-crystal layer or a refractivity-controlling layer (low-refractivity layer) and a hard coat layer may be provided thereon.

(Surface Treatment)

The cellulose acylate film may be optionally subjected to surface treatment to thereby improve the adhesiveness between the cellulose acylate film and various functional layers (e.g., undercoat layer, back layer) adjacent thereto. The surface treatment is, for example, glow discharge treatment, UV irradiation treatment, corona treatment, flame treatment, or acid or alkali treatment. The glow discharge treatment as referred to herein is preferably low-temperature plasma treatment to be effected under a low gas pressure of from $10^{-3}$ to 20 Torr, or plasma treatment under atmospheric pressure. The plasma-exciting vapor to be used in the plasma treatment is a vapor that is excited by plasma under the condition as above. It includes, for example, argon, helium, neon, krypton, xenon, nitrogen, carbon dioxide, flons such as tetrafluoromethane, and their mixtures. Their details are described in Hatsumei Kyokai Disclosure Bulletin (No. 2001-1745, published by the Hatsumei Kyokai on Mar. 15, 2001), pp. 30-32. For the plasma treatment under atmospheric pressure that has become specifically noted recently, preferably used is irradiation energy of from 20 to 500 Kgy under 10 to 1000 Kev, more preferably from 20 to 300 Kgy under 30 to 500 Kev. Of the above, more preferred is alkali saponification, and this is extremely effective for the surface treatment of cellulose acylate films.

For the alkali saponification, the film to be processed may be dipped in a saponification solution or may be coated with it. In the dipping method, the film may be led to pass through a tank of an aqueous NaOH or KOH solution having a pH of from 10 to 14 at 20 to 80° C., taking 0.1 minutes to 10 minutes, and then neutralized, washed with water and dried.

For the coating method, employable are a dip-coating method, a curtain-coating method, an extrusion-coating method, a bar-coating method and an E-type coating method. The solvent for the alkali saponification coating solution is preferably so selected that the saponification solution comprising it may well wet a transparent support to which the solution is applied, and that the solvent does not roughen the surface of the transparent support and may keep the support having a good surface condition. Concretely, alcohol solvents are preferred, and isopropyl alcohol is more preferred. An aqueous solution of surfactant may also be used as the solvent. The alkali to be in the alkali saponification coating solution is preferably an alkali soluble in the above-mentioned solvent. More preferably, it is KOH or NaOH. The pH of the saponification coating solution is preferably at least 10, more preferably at least 12. Regarding the reaction condition in alkali saponification, the reaction time is preferably from 1 second to 5 minutes at room temperature, more preferably from 5 seconds to 5 minutes, even more preferably from 20 seconds to 3 minutes. After the alkali saponification treatment, it is desirable that the saponification solution-coated surface of the film is washed with water or with an acid and then further washed with water. If desired, the coating saponification treatment may be effected continuously with the alignment film removal treatment that will be mentioned hereinunder. In that manner, the number of the processing steps in producing the film may be decreased. Concretely, for example, the saponification method is described in JP-A-2002-82226 and WO02/46809.

Preferably, the film of the invention is provided with an undercoat layer for improving the adhesiveness thereof to the functional layers to be formed thereon. The undercoat layer may be formed on the film after the above-mentioned surface treatment, or may be directly formed thereon with no surface treatment. The details of the undercoat layer are described in Hatsumei Kyokai Disclosure Bulletin (No. 2001-1745, published on Mar. 15, 2001 by the Hatsumei Kyokai), p. 32.

The step of surface treatment and undercoat layer formation may be carried out singly or as combined with the last step in the process of film formation. Further, the step may also be carried out along with the step of forming the functional groups to be mentioned hereinunder.

(Functional Groups)

Preferably, the cellulose acylate film of the invention is combined with functional layers described in detail in Hatsumei Kyokai Disclosure Bulletin (No. 2001-1745, published on Mar. 15, 2001 by the Hatsumei Kyokai), pp. 32-45. Above all, it is desirable that the film is provided with a polarizing layer (for polarizer), an optically-compensatory layer (for optical compensatory sheet) and an antireflection layer (for antireflection film).

(1) Formation of Polarizing Layer (Construction of Polarizer):

[Materials]

At present, one general method of producing commercially-available polarizing films comprises dipping a stretched polymer in a solution containing iodine or dichroic dye in a bath to thereby infiltrate iodine or dichroic dye into the binder. As the polarizing film, a coated polarizing film such as typically that by Optiva Inc. may be utilized. Iodine and dichroic dye in the polarizing film are aligned in the binder and express the polarization property. The dichroic dye includes azo dyes, stilbene dyes, pyrazolone dyes, triphenylmethane dyes, quinoline dyes, oxazine dyes, thiazine dyes and anthraquinone dyes. Preferably, the dichroic dye is soluble in water. Also preferably, the dichroic dye has a hydrophilic substituent (e.g., sulfo, amino, hydroxyl). For example, the compounds described in Hatsumei Kyokai Disclosure Bulletin (No. 2001-1745, published on Mar. 15, 2001 by the Hatsumei Kyokai), p. 58 may be used as the dichroic dye herein.

For the binder for the polarizing film, usable are a polymer that is crosslinkable by itself, and a polymer that is crosslinkable with a crosslinking agent. These polymers may be combined for use herein. The binder includes, for example, methacrylate copolymers, styrene copolymers, polyolefins, polyvinyl alcohols, modified polyvinyl alcohols, poly(N-methylolacrylamides), polyesters, polyimides, vinyl acetate copolymers, carboxymethyl cellulose and polycarbonates, as in JP-A-8-338913, [0022]. In addition, a silane coupling agent may also be used as the polymer. Above all, water-soluble polymers (e.g., poly(N-methylolacrylamide), carboxymethyl cellulose, gelatin, polyvinyl alcohol, modified polyvinyl alcohol) are preferred; gelatin, polyvinyl alcohol and modified polyvinyl alcohol are more preferred; and polyvinyl alcohol and modified polyvinyl alcohol are most preferred. Especially preferably, two different types of polyvinyl alcohols or modified polyvinyl alcohols having a different degree of polymerization are combined for use herein. Preferably, the degree of saponification of polyvinyl alcohol for use herein is from 70% to 100%, more preferably from 80% to 100%. Also preferably, the degree of polymerization of polyvinyl alcohol is from % 100 to 5000. Modified polyvinyl alcohols are described in JP-A-8-338913, 9-152509 and 9-316127. Two or more different types of polyvinyl alcohols and modified polyvinyl alcohols may be combined for use herein.

Preferably, the lowermost limit of the thickness of the binder is 10 μm. Regarding the uppermost limit of the thickness thereof, it is preferably thinner from the viewpoint of the light leakage resistance of liquid-crystal display devices comprising it. Concretely, for example, it is desirable that the thickness of the polarizing film is not larger than the same level as that of currently commercially-available polarizers (about 30 μm), more preferably it is at most 25 μm, even more preferably at most 20 μm.

The binder of the polarizing film may be crosslinked. A polymer or a monomer having a crosslinking functional group may be incorporated into the binder, or the binder polymer may be so designed that it has a crosslinking functional group by itself. The crosslinking may be attained through exposure to light or heat or through pH change, and it gives a binder having a crosslinked structure therein. The crosslinking agent is described in U.S. Reissue Pat. No. 23,297. A boron compound (e.g., boric acid, borax) may also be used as a crosslinking agent. The amount of the crosslinking agent to be added to the binder is preferably from 0.1% to 20% by mass of the binder. Within the range, the alignment of the polarizer element and the wet heat resistance of the polarizing film are both good.

After the crosslinking reaction, it is desirable that the amount of the unreacted crosslinking agent still remaining in the polarizing film is at most 1.0% by mass, more preferably at most 0.5% by mass. Within the range, the polarizing film may have good weather resistance.

[Stretching]

Preferably, the polarizing film is stretched (according to a stretching process) or rubbed (according to a rubbing process), and then dyed with iodine or dichroic dye.

In the stretching process, the draw ratio is preferably from 2.5 to 30.0 times, more preferably from 3.0 to 10.0 times. The stretching may be attained in dry in air. Contrary to this, the stretching may also be attained in wet while the film is dipped in water. Preferably, the draw ratio in dry stretching is from 2.5 to 5.0 times, and the draw ratio in wet stretching is from 3.0 to 10.0 times. The stretching may be effected in the direction parallel to the MD direction (parallel stretching), or in the oblique direction (oblique stretching); but the former is more preferred. The stretching may be effected once, or a few times. When the stretching is effected a few times, then the film may be more uniformly stretched even at a high draw ratio.

(a) Parallel Stretching Method:

Before stretched, PVA film is swollen. The degree of swelling of the film is from 1.2 to 2.0 times (in terms of the ratio by weight of the swollen film to the unswollen film). Next, the film is continuously conveyed via guide rolls, and led into a bath of an aqueous medium or into a dyeing bath of a dichroic substance solution. In the bath, in general, the film is stretched at a bath temperature of from 15 to 50° C., preferably from 17 to 40° C. The stretching may be effected by holding the film with two pairs of nip rolls, and the conveying speed of the latter-stage nip rolls is kept higher than that of the former-stage nip rolls. In view of the above-mentioned effects and advantages, the draw ratio in stretching, ratio of length of stretched film/length of initial film (the same shall apply hereinunder) is preferably from 1.2 to 3.5 times, more preferably from 1.5 to 3.0 times. Next, the stretched film is dried at 50 to 90° C. to be a polarizing film.

(b) Oblique Stretching Method:

For this, herein employable is a stretching method that uses a tenter stretched in the oblique direction, as in JP-A-2002-86554. According to this, the film is stretched in air, and therefore it must be wetted so as to be readily stretched.

Preferably, the water content of the film is from 5% to 100%, more preferably from 10% to 100%.

The stretching temperature is preferably from 4° C. to 90° C., more preferably from 50° C. to 80° C.; and the relative humidity is preferably from 50% to 100%, more preferably from 70% to 100%, even more preferably from 80% to 100%. The traveling speed in the machine direction is preferably at least 1 m/min, more preferably at least 3 m/min.

After stretched, the film is dried at 50° C. to 100° C., more preferably at 60° C. to 90° C., for 0.5 minutes to 10 minutes, more preferably for 1 minute to 5 minutes.

Thus obtained, the absorption axis of the polarizing film is preferably from 10 degrees to 80 degrees, more preferably from 30 degrees to 60 degrees, even more preferably substantially 45 degrees (40 degrees to 50 degrees).

[Lamination]

The saponified cellulose acylate film is laminated with a polarizing layer prepared by stretching to thereby construct a polarizer. The direction in which the two are laminated is preferably so controlled that the casting axis direction of the cellulose acylate film crosses the stretching axis direction of the polarizer at an angle of 45 degrees.

Not specifically defined, the adhesive for the lamination may be an aqueous solution of a PVA resin (including modified PVA with any of acetoacetyl group, sulfonic acid group, carboxyl group and oxyalkylene group) or a boron compound. Above all, preferred are PVA resins. The thickness of the adhesive layer is preferably from 0.01 to 10 µm, more preferably from 0.05 to 5 µm, after dried.

The light transmittance of the thus-obtained polarizer is preferably higher, and the degree of polarization thereof is also preferably higher. Concretely, the transmittance of the polarizer preferably falls between 30% and 50% for the light having a wavelength of 550 nm, more preferably between 35% and 50%, most preferably between 40% and 50%. The degree of polarization of the polarizer preferably falls between 90% and 100% for the light having a wavelength of 550 nm, more preferably between 95% and 100%, most preferably between 99% and 100%.

Further, the thus-constructed polarizer may be laminated with a λ/4 plate to form a circularly-polarizing plate. In this case, the two are so laminated that the slow axis of the λ/4 plate meets the absorption axis of the polarizer at an angle of 45 degrees. In this, the λ/4 plate is not specifically defined but preferably has a wavelength dependency of such that its retardation is smaller at a lower wavelength. Further, it is also desirable to use a λ/4 plate that comprises a polarizing film of which the absorption axis is inclined by 20 to 70° relative to the machine direction and an optically-anisotropic layer of a liquid-crystalline compound.

(2) Formation of Optical Compensatory Layer (Construction of Optical Compensatory Sheet):

An optically-anisotropic layer is for compensating the liquid-crystalline compound in a liquid-crystal cell at the time of black level of display in liquid-crystal display devices, and an optical compensatory sheet may be constructed by forming an alignment film on a cellulose acylate film followed by further forming thereon an optically-anisotropic layer.

[Alignment Film]

An alignment film is provided on the cellulose acylate film that has been processed for surface treatment as above. The film has a function of defining the alignment direction of liquid-crystal molecules. However, if a liquid-crystalline compound can be aligned and then its alignment state can be fixed as such, then the alignment film is not indispensable as a constitutive element, and may be therefore omitted as not always needed. In this case, only the optically-anisotropic layer on the alignment film of which the alignment state has been fixed may be transferred onto a polarizing element to construct the polarizer of the invention.

The alignment film may be formed, for example, through rubbing treatment of an organic compound (preferably polymer), oblique vapor deposition of an inorganic compound, formation of a microgrooved layer, or accumulation of an organic compound (e.g., α-tricosanoic acid, dioctadecylmethylammonium chloride, methyl stearate) according to a Langmuir-Blodgett's method (LB film). Further, there are known other alignment films that may have an alignment function through impartation of an electric field or magnetic field thereto or through light irradiation thereto.

The alignment film is preferably formed through rubbing treatment of a polymer. In principle, the polymer to be used for the alignment film has a molecular structure that has a function of aligning liquid-crystalline molecules.

Preferably, the polymer for use in the invention has a crosslinking functional group (e.g., double bond)—having side branches bonded to the backbone chain thereof or has a crosslinking functional group having a function of aligning liquid-crystalline molecules introduced into the side branches thereof, in addition to having the function of aligning liquid-crystalline molecules.

The polymer to be used for the alignment film may be a polymer that is crosslinkable by itself or a polymer that is crosslinkable with a crosslinking agent, or may also be combinations of the two. Examples of the polymer are methacrylate copolymers, styrene copolymers, polyolefins, polyvinyl alcohols and modified polyvinyl alcohols, poly(N-methylolacrylamides), polyesters, polyimides, vinyl acetate copolymers, carboxymethyl cellulose and polycarbonates, as in JP-A-8-338913, [0022]. A silane coupling agent is also usable as the polymer. Preferably, the polymer is a water-soluble polymer (e.g., poly(N-methylolacrylamide), carboxymethyl cellulose, gelatin, polyvinyl alcohol, modified polyvinyl alcohol), more preferably gelatin, polyvinyl alcohol and modified polyvinyl alcohol, most preferably polyvinyl alcohol and modified polyvinyl alcohol. Especially preferably, two different types of polyvinyl alcohols or modified polyvinyl alcohols having a different degree of polymerization are combined for use as the polymer. Preferably, the degree of saponification of polyvinyl alcohol for use herein is from 70% to 100%, more preferably from 80% to 100%. Also preferably, the degree of polymerization of polyvinyl alcohol is from 100 to 5000.

The side branches having the function of aligning liquid-crystalline molecules generally have a hydrophobic group as the functional group. Concretely, the type of the functional group may be determined depending on the type of the liquid-crystalline molecules to be aligned and on the necessary alignment state of the molecules.

For example, the modifying group of modified polyvinyl alcohol may be introduced into the polymer through copolymerization modification, chain transfer modification or block polymerization modification. Examples of the modifying group are a hydrophilic group (e.g., carboxylic acid group, sulfonic acid group, phosphonic acid group, amino group, ammonium group, amido group, thiol group), a hydrocarbon group having from 10 to 100 carbon atoms, a fluorine atom-substituted hydrocarbon group, a thioether group, a polymerizing group (e.g., unsaturated polymerizing group, epoxy group, aziridinyl group), and an alkoxysilyl group (e.g., trialkoxy, dialkoxy, monoalkoxy). Specific examples of such modified polyvinyl alcohol compounds are described, for example, in JP-A-2000-155216, [0022] to [0145], and in JP-A-2002-62426, [0018] to [0022].

When crosslinking functional group-having side branches are bonded to the backbone chain of an alignment film polymer, or when a crosslinking functional group is introduced into the side chains of a polymer having the function of aligning liquid-crystalline molecules, then the polymer of the alignment film may be copolymerized with the polyfunctional monomer in an optically-anisotropic layer. As a result, not only between the polyfunctional monomers but also between the alignment film polymers, and even between the polyfunctional monomer and the alignment film polymer, they may be firmly bonded to each other in a mode of covalent bonding to each other. Accordingly, introducing such a crosslinking functional group into an alignment film polymer significantly improves the mechanical strength of the resulting optical compensatory sheet.

Preferably, the crosslinking functional group of the alignment film polymer contains a polymerizing group, like the polyfunctional monomer. Concretely, for example, those described in JP-A-2000-155216, [0080] to [0100] are referred to herein. Apart from the above-mentioned crosslinking functional group, the alignment film polymer may also be crosslinked with a crosslinking agent.

The crosslinking agent includes, for example, aldehydes, N-methylol compounds, dioxane derivatives, compounds capable of being active through activation of the carboxyl group thereof, active vinyl compounds, active halide compound, isoxazoles and dialdehyde starches. Two or more different types of crosslinking agents may be combined for use herein. Concretely, for example, the compounds described in JP-A-2002-62426, [0023] to [024] are employable herein. Preferred are aldehydes of high reactivity, and more preferred is glutaraldehyde.

Preferably, the amount of the crosslinking agent to be added to polymer is from 0.1% to 20% by mass of the polymer, more preferably from 0.5% to 15% by mass. Also preferably, the amount of the unreacted crosslinking agent that may remain in the alignment film is at most 1.0% by mass, more preferably at most 0.5% by mass. When the crosslinking agent in the alignment film is controlled to that effect, then the film ensures good durability with no reticulation even though it is used in liquid-crystal display devices for a long period of time and even though it is left in a high-temperature high-humidity atmosphere for a long period of time.

Basically, the alignment film may be formed by applying the alignment film-forming material of the above-mentioned polymer to a crosslinking agent-containing transparent support, then heating and drying it (for crosslinking it) and then rubbing the thus-formed film. The crosslinking reaction may be effected in any stage after the film-forming material has been applied onto the transparent support, as so mentioned hereinabove. When a water-soluble polymer such as polyvinyl alcohol is used as the alignment film-forming material, then it is desirable that the solvent for the coating solution is a mixed solvent of a defoaming organic solvent (e.g., methanol) and water. The ratio by mass of water/methanol preferably falls between 0/100 and 99/1, more preferably between 0/100 and 91/9. The mixed solvent of the type is effective for preventing the formation of bubbles in the coating solution and, as a result, the surface defects of the alignment film and even the optically-anisotropic layer are greatly reduced.

For forming the alignment film, preferably employed is a spin-coating method, a dip-coating method, a curtain-coating method, an extrusion-coating method, a rod-coating method or a roll-coating method. Especially preferred is a rod-coating method. Also preferably, the thickness of the film is from 0.1 to 10 μm, after dried. The drying under heat may be effected at 20 to 110° C. For sufficient crosslinking, the heating temperature is preferably from 60 to 100° C., more preferably from 80 to 100° C. The drying time may be from 1 minute to 36 hours, but preferably from 1 to 30 minutes. The pH of the coating solution is preferably so defined that it is the best for the crosslinking agent used. For example, when glutaraldehyde is used, the pH of the coating solution is preferably from 4.5 to 5.5, more preferably 5.

The alignment film is provided on the transparent support or on the undercoat layer. The alignment film may be formed by crosslinking the polymer layer as above, and then rubbing the surface of the layer.

For the rubbing treatment, usable is any method widely employed for liquid crystal alignment treatment for LCD. Concretely, for example, the surface of the alignment film is rubbed in a predetermined direction by the use of paper, gauze, felt, rubber, nylon, or polyester fibers, whereby the film may be aligned in the intended direction. In general, a cloth uniformly planted with fibers having the same length and the same thickness is used, and the surface of the film is rubbed a few times with the cloth.

On an industrial scale, the operation may be attained by contacting a rolling rubbing roll to a polarizing layer-having film that is traveling in the system. Preferably, the circularity, the cylindricity, and the deflection (eccentricity) of the rubbing roll are all at most 30 μm each. Also preferably, the lapping angle of the film around the rubbing roll is from 0.1 to 90°. However, the film may be lapped at an angle of 360° or more for stable rubbing treatment, as in JP-A-8-160430. Preferably, the film traveling speed is from 1 to 100 m/min. The rubbing angle may fall between 0 and 600, and it is desirable that a suitable rubbing angle is selected within the range. When the film is used in liquid-crystal display devices, the rubbing angle is preferably from 40 to 500, more preferably 45°.

The thickness of the alignment film thus obtained is preferably from 0.1 to 10 μm.

Next, the liquid-crystalline molecules of the optically-anisotropic layer are aligned on the alignment film. Afterward, if desired, the polyfunctional monomers in the alignment film polymer and the optically-anisotropic layer are reacted, or the alignment film polymer is crosslinked with a crosslinking agent.

The liquid-crystalline molecules for use in the optically-anisotropic layer include rod-shaped liquid-crystalline molecules and discotic liquid-crystalline molecules. The rod-shaped liquid-crystalline molecules and the discotic liquid-crystalline molecules may be high-molecular liquid crystals or low-molecular liquid crystals. In addition, they include crosslinked low-molecular liquid crystals that do not exhibit liquid crystallinity.

[Rod-Shaped Liquid-Crystalline Molecules]

The rod-shaped liquid-crystalline molecules are preferably azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans and alkenylcyclohexylbenzonitriles.

The rod-shaped liquid-crystalline molecules include metal complexes. Liquid-crystal polymers that contain rod-shaped liquid-crystalline molecules in the repetitive units thereof are also usable herein as the rod-shaped liquid-crystalline molecules. In other words, the rod-shaped liquid-crystalline molecules for use herein may bond to a (liquid-crystal) polymer.

Rod-shaped liquid-crystalline molecules are described in Quarterly Journal of General Chemistry, Vol. 22, Liquid Crystal Chemistry (1994), Chaps. 4, 7 and 11, edited by the Chemical Society of Japan; Liquid Crystal Devices Handbook, edited by the 142nd Committee of the Nippon Academic Promotion, Chap. 3.

The birefringence of the rod-shaped liquid-crystalline molecule preferably falls between 0.001 and 0.7.

Preferably, the rod-shaped liquid-crystalline molecules have a polymerizing group for fixing their alignment state. The polymerizing group is preferably a radical-polymerizing unsaturated group or a cationic polymerizing group. Concretely, for example, there are mentioned the polymerizing groups and the polymerizing liquid-crystal compounds described in JP-A-2002-62427, [0064] to [0086].

[Discotic Liquid-Crystalline Molecules]

The discotic liquid-crystalline molecules include, for example, benzene derivatives as in C. Destrade et al's study report, Mol. Cryst., Vol. 71, p. 111 (1981); truxene derivatives as in C. Destrade et al's study report, Mol. Cryst., Vol. 122, p. 141 (1985), Physics Lett. A., Vol. 78, p. 82 (1990); cyclohexane derivatives as in B. Kohne et al's study report, Angew. Chem., Vol. 96, p. 70 (1984); and azacrown-type or phenylacetylene-type macrocycles as in J. M. Lehn et al's study report, J. Chem. Commun., p. 1794 (1985), J. Zhang et al's study report, J. Am. Chem. Soc., Vol. 116, p. 2655 (1994).

The discotic liquid-crystalline molecules include liquid-crystalline compounds in which the molecular center nucleus is radially substituted with side branches of a linear alkyl, alkoxy or substituted benzoyloxy group. Preferably, the molecules or the molecular aggregates of the compounds are rotary-symmetrical and may undergo certain alignment. It is not always necessary that, in the optically-anisotropic layer formed of such discotic liquid-crystalline molecules, the compounds that are finally in the optically-anisotropic layer are discotic liquid-crystalline molecules. For example, low-molecular discotic liquid-crystalline molecules may have a group capable of being reactive when exposed to heat or light, and as a result, they may polymerize or crosslink through thermal or optical reaction to give high-molecular compounds with no liquid crystallinity. Preferred examples of the discotic liquid-crystalline molecules are described in JP-A-8-50206. Polymerization of discotic liquid-crystalline molecules is described in JP-A-8-27284.

For fixing the discotic liquid-crystalline molecules through polymerization, the discotic core of the discotic liquid-crystalline molecules must be substituted with a polymerizing group. Preferably, the polymerizing group bonds to the discotic core via a linking group. Accordingly, the compounds of the type may keep their alignment state even after their polymerization. For example, there are mentioned the compounds described in JP-A-2000-155216, [0151] to [0168].

In hybrid alignment, the angle between the major axis (disc plane) of the discotic liquid-crystalline molecules and the plane of the polarizing film increases or decreases with the increase in the distance from the plane of the polarizing film in the depth direction of the optically-anisotropic layer. Preferably, the angle decreases with the increase in the distance. The angle change may be in any mode of continuous increase, continuous decrease, intermittent increase, intermittent decrease, change including continuous increase and continuous decrease, or intermittent change including increase and decrease. The intermittent change includes a region in which the tilt angle does not change in the midway of the thickness direction. The angle may include a region with no angle change so far as it increases or decreases as a whole. Preferably, the angle continuously varies.

The mean direction of the major axis of the discotic liquid-crystalline molecules on the polarizing film side may be controlled generally by suitably selecting the material of the discotic liquid-crystalline molecules or that of the alignment film or by suitably selecting the rubbing treatment method. The direction of the major axis of the discotic liquid-crystalline molecules (disc plane) on the surface side (on the air side) may be controlled generally by suitably selecting the material of the discotic liquid-crystalline molecules or that of the additive to be used along with the discotic liquid-crystalline molecules. Examples of the additive that may be used along with the discotic liquid-crystalline molecules include, for example, plasticizer, surfactant, polymerizing monomer and polymer. Like in the above, the degree of the change of the major axis in the alignment direction may also be controlled by suitably selecting the liquid-crystalline molecules and the additive.

[Other Composition of Optically-Anisotropic Layer]

Along with the above-mentioned liquid-crystalline molecules, a plasticizer, a surfactant, a polymerizing monomer and others may be added to the optically-anisotropic layer for improving the uniformity of the coating film, the strength of the film and the alignment of the liquid-crystalline molecules in the film. Preferably, the additives have good compatibility with the liquid-crystalline molecules that constitute the layer and may have some influence on the tilt angle change of the liquid-crystalline molecules, not interfering with the alignment of the molecules.

The polymerizing monomer includes radical-polymerizing or cationic-polymerizing compounds. Preferred are polyfunctional radical-polymerizing monomers. Also preferred are those copolymerizable with the above-mentioned, polymerizing group-containing liquid-crystal compounds. For example, herein mentioned are the compounds described in JP-A-2002-296423, [0018] to [0020]. The amount of the compound to be added to the layer may be generally from 1% to 50% by mass of the discotic liquid-crystalline molecules in the layer, but preferably from 5% to 30% by mass.

The surfactant may be any known one, but is preferably a fluorine-containing compound. Concretely, for example, there are mentioned the compounds described in JP-A-2001-330725, [0028] to [0056].

The polymer that may be used along with the discotic liquid-crystalline molecules is preferably one capable of changing the tilt angle of the discotic liquid-crystalline molecules.

Examples of the polymer are cellulose esters. Preferred examples of cellulose esters are described in JP-A-2000-155216, [0178]. So as not to interfere with the alignment of the liquid-crystalline molecules in the layer, the amount of the polymer to be added to the layer is preferably from 0.1% to 10% by mass of the liquid-crystalline molecules, more preferably from 0.1% to 8% by mass.

Preferably, the discotic nematic liquid-crystal phase/solid phase transition temperature of the discotic liquid-crystalline molecules falls between 70 and 300° C., more preferably between 70 and 170° C.

[Formation of Optically-Anisotropic Layer]

The optically-anisotropic layer may be formed by applying a coating solution that contains liquid-crystalline molecules and optionally a polymerization initiator and other optional components mentioned below, on the alignment film.

The solvent to be used in preparing the coating solution is preferably an organic solvent. Examples of the organic solvent are amides (e.g., N,N-dimethylformamide), sulfoxides (e.g., dimethylsulfoxide), heterocyclic compounds (e.g., pyridine), hydrocarbons (e.g., benzene, hexane), alkylhalides (e.g., chloroform, dichloromethane, tetrachloroethane), esters (e.g., methyl acetate, butyl acetate), ketones (e.g., acetone, methyl ethyl ketone), ethers (e.g., tetrahydrofuran, 1,2-dimethoxyethane). Of those, preferred are alkyl halides and ketones. Two or more such organic solvents may be used as combined.

The coating solution may be applied onto the alignment film in any known method (e.g., wire bar coating method, extrusion coating method, direct gravure coating method, reverse gravure coating method, die coating method).

The thickness of the optically-anisotropic layer is preferably from 0.1 to 20 μm, more preferably from 0.5 to 15 μm, most preferably from 1 to 10 μm.

[Fixation of Alignment State of Liquid-Crystalline Molecules]

The aligned liquid-crystalline molecules may be fixed as they are in their alignment state. Preferably, the fixation is effected through polymerization. The polymerization includes thermal polymerization with a thermal polymerization initiator and optical polymerization with an optical polymerization initiator. Preferred is optical polymerization.

The optical polymerization initiator includes, for example, α-carbonyl compounds (as in U.S. Pat. Nos. 2,367,661, 2,367,670), acyloin ethers (as in U.S. Pat. No. 2,448,828), α-hydrocarbon-substituted aromatic acyloin compounds (as in U.S. Pat. No. 2,722,512), polynuclear quinone compounds (as in U.S. Pat. Nos. 3,046,127, 2,951,758), combination of triarylimidazole dimer and p-aminophenylketone (as in U.S. Pat. No. 3,549,367), acridine compounds and phenazine compounds (as in JP-A-60-105667, U.S. Pat. No. 4,239,850), and oxadiazole compounds (as in U.S. Pat. No. 4,212,970).

The amount of the optical polymerization initiator to be added is preferably from 0.01% to 20% by mass of the solid content of the coating solution, more preferably from 0.5% to 5% by mass.

Preferably, UV rays are used for light irradiation for polymerization of liquid-crystalline molecules.

Preferably, the irradiation energy falls within a range of from 20 mJ/cm$^2$ to 50 J/cm$^2$, more preferably from 20 to 5000 mJ/cm$^2$, even more preferably from 100 to 800 mJ/cm$^2$. For promoting the optical polymerization, the light irradiation may be effected under heat.

A protective layer may be provided on the optically-anisotropic layer.

Preferably, the optical compensatory film may be combined with a polarizing layer. Concretely, the above-mentioned optically-anisotropic layer-forming solution is applied onto the surface of a polarizing film to from an optically-anisotropic layer thereon. As a result, no polymer film exists between the polarizing film and the optically-anisotropic layer, and a thin polarizer is thus constructed of which the stress (strain×cross section×elasticity) to be caused by the dimensional change of the polarizing film is reduced. When the polarizer of the invention is fitted to large-size liquid-crystal display devices, then it does not produce a problem of light leakage and the devices can display high-quality images.

Preferably, the polarizing layer and the optically-compensatory layer are so stretched that the tilt angle between the two may correspond to the angle formed by the transmission axis of the two polarizers to be stuck to both sides of the liquid crystal cell to constitute LCD, and the machine direction or the transverse direction of the liquid crystal cells. In general, the tilt angle is 45°. Recently, however, some devices in which the tile angle is not always 45° have been developed for transmission-type, reflection-type or semi-transmission-type LCDs, and it is desirable that the stretching direction is varied in any desired manner depending on the plan of LCDs.

[Liquid-Crystal Display Devices]

Various types of liquid-crystal display modes to which the optically-compensatory film as above is applicable are described.

(TN-Mode Liquid-Crystal Display Device]

A TN-mode is most popularly utilized in color TFT liquid-crystal display devices, and this is described in a large number of references. The alignment state in the liquid-crystal cell at the time of black level of TN-mode display is as follows: The rod-shaped liquid-crystalline molecules stand up in the center of the cell, and they lie down at around the substrate of the cell.

(OCB-Mode Liquid-Crystal Display Device)

This is a bent-alignment mode liquid-crystal cell in which the rod-shaped liquid-crystalline molecules are aligned substantially in the opposite directions (symmetrically) between the upper part and the lower part of the liquid-crystal cell. The liquid-crystal display device that comprises such a bent-alignment mode liquid-crystal cell is disclosed in U.S. Pat. Nos. 4,583,825 and 5,410,422. In this, since the rod-shaped liquid-crystalline molecules are symmetrically aligned in the upper part and the lower part of the liquid-crystal cell, the bent-alignment mode liquid-crystal cell has a self-optically-compensatory function. Accordingly, the liquid-crystal mode of the type is referred to as an OCB (optically-compensatory bend) liquid-crystal mode.

Regarding the alignment state at the time of black level of display in the OCB-mode liquid-crystal cell, the rod-shaped liquid-crystalline molecules stand up in the center of the cell, and they lie down at around the substrate of the cell, like in the TN-mode liquid-crystal cell.

(VA-Mode Liquid-Crystal Display Device)

This is characterized in that the rod-shaped liquid-crystalline molecules therein are substantially vertically aligned in the absence of voltage application thereto. The VA-mode liquid-crystal cell includes (1) a VA-mode liquid-crystal cell in the narrow sense of the word, in which the rod-shaped liquid-crystalline molecules are substantially vertically aligned in the absence of voltage application thereto but are substantially horizontally aligned in the presence of voltage application thereto (as in JP-A-2-176625), further including in addition to it, (2) a multi-domain VA-mode (MVA-mode) liquid crystal cell for viewing angle expansion (as in SID97, Digest of Tech. Papers (preprint), 28 (1997) 845), (3) a liquid-crystal cell (n-ASM mode liquid-crystal cell) in which the rod-shaped liquid-crystalline molecules are substantially vertically aligned in the absence of voltage application thereto but are subjected to twisted multi-domain alignment in the presence of voltage application thereto (as in the preprint in the Nippon Liquid Crystal Discussion Meeting, 58-59 (1998)), and (4) a SURVIVAL-mode liquid-crystal cell (as announced in LCD International 98).

Other Liquid-Crystal Display Devices:

ECB-mode and STN-mode liquid-crystal display devices may be optically compensated in the same consideration as above.

[Formation of Antireflection Layer (for Antireflection Film)]

In general, an antireflection film is constructed by forming a low-refractivity layer that functions as a stain-preventing layer, and at least one layer having a higher refractivity than that of the low-refractivity layer (high-refractivity layer or middle-refractivity layer) on a transparent substrate.

A multi-layer film is formed by laminating transparent thin films of inorganic compounds (e.g., metal oxides) having a different refractivity, for example, in a mode of chemical vapor deposition (CVD) or physical vapor deposition (PVD); or a film of colloidal metal oxide particles is formed according to a sol-gel process with a metal compound such as a metal oxide, and then this is post-treated (e.g., UV irradiation as in JP-A-9-157855, or plasma treatment as in JP-A-2002-327310) to give a thin film.

On the other hand, various types of antireflection films of high producibility are proposed, which are formed by laminating thin films of inorganic particles dispersed in a matrix.

The antireflection films produced according to the above-mentioned coating methods may be further processed so that the surface of the outermost layer thereof is roughened to have an antiglare property.

The cellulose acylate film of the invention may be applied to any type as above. Especially preferably, the film is applied to film construction in a layers-coating system (layers-coated films).

[Layer Constitution of Layers-Coated Antireflection Film]

The antireflection film having a layer constitution of at least a middle-refractivity layer, a high-refractivity layer and a low-refractivity layer (outermost layer) formed in that order on a substrate is so planned that it satisfies the refractivity profile mentioned below.

Refractivity of high-refractivity layer>refractivity of middle-refractivity layer>refractivity of transparent support>refractivity of low-refractivity layer.

A hard coat layer may be disposed between the transparent support and the middle-refractivity layer. Further, the film may comprise a middle-refractivity hard coat layer, a high-refractivity layer and a low-refractivity layer.

For example, JP-A-8-122504, 8-110401, 10-300902, 2002-243906, 2000-111706 are referred to. The constitutive layers may have other functions. For example, there are mentioned a stain-resistant low-refractivity layer and an antistatic high-refractivity layer (for example, as in JP-A-10-206603, 2002-243906).

Preferably, the haze of the antireflection film is at most 5%, more preferably at most 3%. Also preferably, the strength of the film is at least 1H measured in the pencil hardness test according to JIS K5400, more preferably at least 2H, most preferably at least 3H.

[High-Refractivity Layer and Middle-Refractivity Layer]

The high-refractivity layer of the antireflection film is formed of a cured film that contains at least ultrafine particles of an inorganic compound of high refractivity having a mean particle size of at most 100 nm and a matrix binder.

The high-refractivity inorganic compound particles are those of an inorganic compound having a refractivity of at least 1.65, preferably at least 1.9. The inorganic compound particles are, for example, those of a metal oxide with any of Ti, Zn, Sb, Sn, Zr, Ce, Ta, La and In, and those of a composite oxide with such metal atoms.

For example, the ultrafine particles may be processed with a surface-treating agent (e.g., silane coupling agent as in JP-A-11-295503, 11-153703, 2000-9908; anionic compound or organic metal coupling agent as in JP-A-2001-310432); or they may have a core/shell structure in which the core is a high-refractivity particle (e.g., as in JP-A-2001-166104); or they may be combined with a specific dispersant (e.g., as in JP-A-11-153703, U.S. Pat. No. 6,210,858 B1, JP-A-2002-2776069).

The material to from the matrix may be any known thermoplastic resin or curable resin film.

For the material, also preferred is at least one composition selected from a polyfunctional compound-containing composition in which the compound has at least two radical-polymerizing and/or cationic-polymerizing groups, and a composition of a hydrolyzing group-containing organic metal compound or its partial condensate. For it, for example, referred to are the compounds described in JP-A-2000-47004, 2001-315242, 2001-31871, 2001-296401.

Also preferred is a curable film formed of a colloidal metal oxide obtained from a hydrolyzed condensate of a metal alkoxide, and a metal alkoxide composition. For example, it is described in JP-A-2001-293818.

The refractivity of the high-refractivity layer is generally from 1.70 to 2.20. Preferably, the thickness of the high-refractivity layer is from 5 nm to 10 µm, more preferably from 10 nm to 1 µm.

The refractivity of the middle-refractivity layer is so controlled that it may be between the refractivity of the low-refractivity layer and that of the high-refractivity layer. Preferably, the refractivity of the middle-refractivity layer is from 1.50 to 1.70.

[Low-Refractivity Layer]

The low-refractivity layer is laminated on the high-refractivity layer in order. The refractivity of the low-refractivity layer may be, for example, from 1.20 to 1.55, but preferably from 1.30 to 1.50.

Preferably, the low-refractivity layer is constructed as the outermost layer having good scratch resistance and good stain resistance. For significantly increasing the scratch resistance of the layer, it is effective to lubricate the surface of the layer. For it, for example, employable is a method of forming a thin layer that contains a conventional silicone compound or fluorine-containing compound introduced thereinto.

Preferably, the refractivity of the fluorine-containing compound is from 1.35 to 1.50, more preferably from 1.36 to 1.47. Also preferably, the fluorine-containing compound has a crosslinking or polymerizing functional group that contains a fluorine atom in an amount of from 35% to 80% by mass.

For example, herein usable are the compounds described in JP-A-9-222503, [0018] to [0026]; JP-A-11-38202, [0019] to [0030]; JP-A-2001-40284, [0027] to [0028]; JP-A-2000-284102.

Preferably, the silicone compound has a polysiloxane structure in which the polymer chain contains a curable functional group or a polymerizing functional group, and it forms a film having a crosslinked structure therein. For example, it includes reactive silicones (e.g., Silaplane by Chisso), and polysiloxanes double-terminated with a silanol group (as in JP-A-11-258403).

Preferably, the crosslinking or polymerizing group-having, fluorine-containing and/or siloxane polymer is crosslinked or polymerized simultaneously with or after the coating operation with the coating composition to form the outermost layer that contains a polymerization initiator and a sensitizer, by exposing the coating layer to light or heat.

Also preferred is a sol-gel curable film which comprises an organic metal compound such as a silane coupling agent and a specific fluorine-containing hydrocarbon group-having silane coupling agent and in which they are condensed in the presence of a catalyst to cure the film.

For example, there are mentioned a polyfluoroalkyl group-containing silane compound or its partial hydrolyzed condensate (as in JP-A-58-142958, 58-147483, 58-147484, 9-157582, 11-106704), and a silyl compound having a fluorine-containing long-chain group, poly(perfluoroalkylether) group (as in JP-A-2000-117902, 2001-48590, 2002-53804).

As other additives than the above, the low-refractivity layer may contain a filler (e.g., low-refractivity inorganic compound of which the primary particles have a mean particle size of from 1 to 150 nm, such as silicon dioxide (silica), fluorine-containing particles (magnesium fluoride, calcium fluoride, barium fluoride); organic fine particles described in JP-A-11-3820, [0020] to [0038]), a silane coupling agent, a lubricant, a surfactant, etc.

When the low-refractivity layer is positioned below an outermost layer, then it may be formed according to a vapor-phase process (e.g., vacuume vaporation, sputtering, ion plating, plasma CVD). However, a coating method is preferred as it produces the layer at low costs.

Preferably, the thickness of the low-refractivity layer is from 30 to 200 nm, more preferably from 50 to 150 nm, most preferably from 60 to 120 nm.

[Hard Coat Layer]

A hard coat layer may be disposed on the surface of a transparent support for increasing the physical strength of the antireflection film to be thereon. In particular, the layer is preferably disposed between a transparent support and the above-mentioned high-refractivity layer.

Also preferably, the hard coat layer is formed through crosslinking or polymerization of an optical and/or thermal curable compound. The curable functional group is preferably a photopolymerizing functional group, and the hydrolyzing functional group-containing organic metal compound is preferably an organic alkoxysilyl compound.

Specific examples of the compounds may be the same as those mentioned hereinabove for the high-refractivity layer. Specific examples of the constitutive composition for the hard coat layer are described in, for example, JP-A-2002-144913, 2000-9908, and WO00/46617.

The high-refractivity layer may serve also as a hard coat layer. In such a case, it is desirable that fine particles are added to and finely dispersed in the hard coat layer in the same manner as that mentioned hereinabove for the formation of the high-refractivity layer.

Containing particles having a mean particle size of from 0.2 to 10 μm, the hard coat layer may serve also as an antiglare layer (this will be mentioned hereinunder) having an antiglare function.

The thickness of the hard coat layer may be suitably determined in accordance with the use thereof. Preferably, for example, the thickness of the hard coat layer is from 0.2 to 10 μm, more preferably from 0.5 to 7 μm.

Preferably, the strength of the hard coat layer is at least 1H as measured in the pencil hardness test according to JIS K5400, more preferably at least 2H, most preferably at least 3H. Also preferably, the abrasion of the test piece of the layer before and after the taper test according to JIS K5400 is as small as possible.

[Front-Scattering Layer]

A front-scattering layer may be provided for improving the viewing angle on the upper and lower sides and on the right and left sides of liquid-crystal display devices to which the film is applied. Fine particles having a different refractivity may be dispersed in the hard coat layer, and the resulting hard coat layer may serve also as a front-scattering layer.

For it, for example, referred to are JP-A-11-38208 in which the front-scattering coefficient is specifically defined; JP-A-2000-199809 in which the relative refractivity of transparent resin and fine particles is defined to fall within a specific range; and JP-A-2002-107512 in which the haze value is defined to be at least 40%.

[Other Layers]

In addition to the above-mentioned layers, the film may further has a primer layer, an antistatic layer, an undercoat layer, a protective layer, etc.

[Coating Method]

The constitutive layers of the antireflection film may be formed in various coating methods of, for example, dip coating, air knife coating, curtain coating, roller coating, wire bar coating, gravure coating, microgravure coating or extrusion coating (as in U.S. Pat. No. 2,681,294).

[Antiglare Function]

The antireflection film may have an antiglare function of scattering external light. The film may have the antiglare function by roughening its surface. When the antireflection film has the antiglare function, then its haze is preferably from 3% to 30%, more preferably from 5% to 20%, most preferably from 7% to 20%.

For roughening the surface of the antireflection film, employable is any method in which the roughened surface profile may be kept well. For example, there are mentioned a method of adding fine particles to a low-refractivity layer so as to roughen the surface of the layer (e.g., as in JP-A-2000-271878); a method of adding a small amount (from 0.1% to 50% by mass) of relatively large particles (having a particle size of from 0.05 to 2 μm) to the lower layer (high-refractivity layer, middle-refractivity layer or hard coat layer) below a low-refractivity layer to thereby roughen the surface of the lower layer, and forming a low-refractivity layer on it while keeping the surface profile of the lower layer (e.g., as in JP-A-2000-281410, 2000-95893, 2001-100004, 2001-281407); and a method of physically transferring a roughened profile onto the surface of the outermost layer (stain-resistant layer) (for example, according to embossing treatment as in JP-A-63-278839, 11-183710, 2000-275401).

Methods for measuring the physical data in this description are described below.

(1) Fine Projections and Depressions:

Using a three-dimensional surface structure analyzing microscope (Zygo's New View 5022), a cellulose acylate film is analyzed according to the condition mentioned below.

Objective lens: 2.5 magnifications
Image zoom: 1 magnification
Field of view in measurement: transverse direction (TD) 2.8 mm, machine direction (MD) 2.1 mm Within the range, the number of the mountains (projections) having a height of from 0.1 μm to 100 μm, and the number of valleys (depressions) having a depth of from 0.1 μm to 100 μm are counted. The projections and the depressions are all those that continue in the machine direction (MD) for at least 1 mm. The number of the projections and the depressions is divided by the width in measurement (2.8 mm), and then multiplied 100 times, and the resulting value indicates the number of the projections and the depressions, respectively, per 10 cm.

Covering the overall width thereof, the sample film produced is analyzed in the manner as above at 30 points taken at regular intervals, and the data are averaged to obtain the number of the projections and the depressions per 10 cm of the width.

(2) G', G", tan δ:

Using a viscoelastometer equipped with a parallel corn (e.g., Anton Paar's modular compact rheometer, Physica MCR301), samples are analyzed as follows:

The resin is fully dried, and then measured while heated from 170° C. up to 250° C. at a heating speed of 5° C./min. The parallel corn gap is 500 μm; the frequency is 1 Hz; and the strain is 1%. From the data, obtained are G', G", tan δ at the die temperature.

(3) Elongation Length at Break and Elongation Stress at Break in Normal Line Direction:

Using a viscoelastometer equipped with a parallel corn (e.g., Anton Paar's modular compact rheometer, Physica MCR301), samples are analyzed as follows:

The resin is fully dried. The parallel corn gap is 500 μm, and the temperature is 220° C. While the parallel corn is pulled up in the vertical direction at 10 μm/sec, the force necessary for it is measured. This is divided by the area of the parallel corn to obtain the stress. A graph is formed for which the horizontal axis indicates the pulling distance of the parallel corn, and the vertical axis indicates the stress. The stress at the maximum point of the graph and the pulling distance for it indicate the elongation stress at break and the elongation length at break in the normal line direction.

(4) Substitution Degree of Cellulose Acylate:

The degree of acyl substitution of cellulose acylate is obtained through $^{13}$C-NMR, according to the method described in Carbohydr. Res. 273 (1995), 83-91 (Tezuka et al.)

(5) Degree of Polymerization of Cellulose Acylate:

About 0.2 g of absolutely-dried cellulose acylate is accurately weighed, and dissolved in 100 ml of mixed solvent of methylene chloride/ethanol=9/1 (by mass). Using an Ostwald's viscometer, this is analyzed to determine the time (second) taken for its dropping at 25° C., and the degree of polymerization of the polymer is obtained according to the following formula:

$$\eta rel = T/T0$$

$$[\eta] = (\ln \eta rel)/C$$

$$DP = [\eta]/Km$$

Km: $6 \times 10^{-4}$,

T: time (second) taken by the sample for its dropping,

T0: time (second) taken by the solvent alone for its dropping,

C: concentration (g/l).

(6) Tg:

20 mg of a sample is put into a sample pan of DSC. This is heated from 30° C. up to 250° C. at 10° C./min, and then cooled to 30° C. at −10° C./min. Next, this is again heated from 30° C. up to 250° D. The temperature at which the base line starts to shift from the low temperature side indicates Tg of the sample.

(7) Re, Rth:

A film is conditioned at 25° C. and a relative humidity of 60% for at least 3 hours. Then, using an automatic birefringence meter (KOBRA-21ADH/PR, by Oji Scientific Instruments), the retardation value is measured at 25° C. and a relative humidity of 60% and at a wavelength of 550 nm.

EXAMPLES

The characteristics of the invention are described more concretely with reference to the following Examples and Comparative Examples. In the following Examples, the material used, its amount and ratio, the details of the treatment and the treatment process may be suitably modified or changed not overstepping the sprit and the scope of the invention. Accordingly, the scope of the invention should not be limitatively interpreted by the following Examples.

Example A

1. Formation of Cellulose Acylate Film (1) Preparation of Materials:

Various cellulose acylates having a different acyl group and a different substitution degree as in Table 1 were prepared. In preparing them, a catalyst sulfuric acid (7.8 parts by weight relative to 100 parts by weight of cellulose) was added; and a carboxylic acid to be the starting material for the acyl substituent group was added for acylation at 40° C. In this stage, the type and the amount of the carboxylic acid were varied whereby the type of the acyl group and the substitution degree were varied. After the acylation, this was ripened at 40° C. The ripening time was varied, and different cellulose acylates having a different degree of polymerization were obtained, as in Table 1.

Next, the cellulose acylate was washed with hot water at 50° C. The washing time was varied, and different cellulose acylates having a different amount of remaining sulfuric acid were obtained as in Table 1. The amount of remaining sulfuric acid was determined as follows: Cellulose acylate is wet-ashed, and its S amount is determined through atomic absorptiometry, and the resulting value is converted into the amount of remaining sulfuric acid.

Any of the following compounds A to D, compounds having at least two aromatic rings, was added to the thus-obtained cellulose acylate. Its amount added is shown in Table 1. Compound A (compound having a molecular weight of from 100 to 3000 and having the following structure):

[Formula 21]

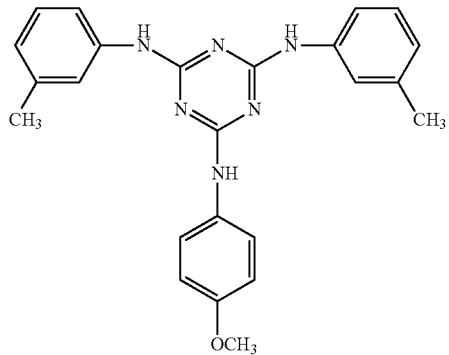

Compound B (rod-shaped compound having the following structure),

Compound C (tabular compound having the following structure):

[Formula 22]

Tabular Compound:

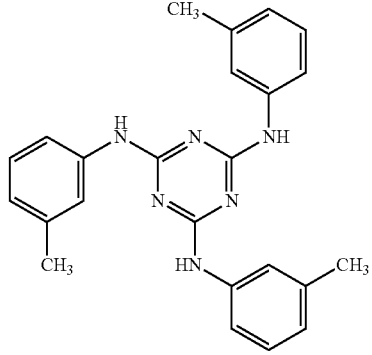

-continued

Rod-Shaped Compound:

Compound D (above-mentioned compound (I)).

Any of the following compounds X to Z, fatty acids having from 2 to 6 carbon atoms, was added to the cellulose acylate. Its amount added is shown in Table 1.
Compound A (compound having a molecular weight of from 100 to 3000 and having the following structure):
Compound X (acetic acid),
Compound Y (propionic acid),
Compound Z (butyric acid).

Further, 2% by mass of triphenyl phosphate and 0.05% by mass of silicon dioxide particles (Aerosil R972V) were added to each cellulose acylate. In Examples and Table 1, all % by mass is the weight ratio relative to cellulose acylate.
(2) Melt Film Formation:

The cellulose acylate with the above-mentioned compounds added thereto was shaped into rod pellets having a diameter of 3 mm and a length of 5 mm, and these were dried in a vacuum drier at 110° C. to make them have a water content of at most 0.1%. This was melted at 200° C., and then extruded out through a die lip set at the temperature shown in Table 1. In this stage, the devices were so positioned that the ratio obtained by dividing the distance L between the die lip and the center of the casting drum (CD), by the radius R of the casting drum (CD) (L/R in FIG. 3) could be the value as in Table 1. The distance between the melt having gone out at the tip of the die lip and the melt having reached the CD surface was 5 cm. For some samples, an electrode of 3 kV was disposed at a site spaced from the melt by 5 cm in this stage, and the melt was subjected to electrostatic charge application treatment for 5 cm at both edges thereof. The neck-in percentage in this stage was computed according to the following formula, and the result is shown in Table 1.

Neck-in Percentage (%)=100×{(die lip width)−(formed film width)}/(die lip width).

The melt was led to continuously pass through three CDs having a diameter of 40 cm and set at (Tg−5)° C., Tg and (Tg−10)° C., and was thus solidified to give a cellulose acylate film having a thickness of 125 μm. This was trimmed by 5 cm at both edges thereof, then knurled at both edges thereof to a width of 10 mm and a height of 50 μm, and this was wound up. Every sample had a width of 1.5 m and wound up for 3000 m at 30 m/min. Tg is shown in Table 1.

TABLE 1

Table 1

| | Cellulose Acylate | | | | | | | | Additives, Co-Existing Matter Compound having at least two aromatic | |
|---|---|---|---|---|---|---|---|---|---|---|
| | Substitution Degree | | | | | | | | | |
| | acetyl group (X) | propionyl group (Y1) | butyryl group (Y2) | pentanoyl group (Y3) | hexanoyl group (Y4) | Y (total of Y1 to Y4) | X + Y | Polymerization Degree | type | added amount (%) |
| Example 1 | 1 | | 1.7 | | | 1.7 | 2.7 | 240 | A | 5 |
| Example 2 | 1 | | 1.7 | | | 1.7 | 2.7 | 240 | A | 2 |
| Example 3 | 1 | | 1.7 | | | 1.7 | 2.7 | 240 | A | 0 |
| Example 4 | 1 | | 1.7 | | | 1.7 | 2.7 | 240 | A | 18 |
| Example 5 | 1 | | 1.7 | | | 1.7 | 2.7 | 240 | A | 22 |
| Example 6 | 1 | | 1.7 | | | 1.7 | 2.7 | 240 | A | 5 |
| Example 7 | 1 | | 1.7 | | | 1.7 | 2.7 | 240 | A | 5 |
| Example 8 | 1 | | 1.7 | | | 1.7 | 2.7 | 240 | A | 5 |
| Comparative Example 1 | 1 | | 1.7 | | | 1.7 | 2.7 | 240 | A | 5 |
| Example 9 | 1 | | 1.7 | | | 1.7 | 2.7 | 240 | A | 5 |
| Comparative Example 2 | 1 | | 1.7 | | | 1.7 | 2.7 | 240 | A | 5 |
| Example 10 | 1 | | 1.7 | | | 1.7 | 2.7 | 240 | A | 5 |
| Example 11 | 1 | | 1.7 | | | 1.7 | 2.7 | 240 | A | 5 |
| Comparative Example 3 | 1 | | 1.7 | | | 1.7 | 2.7 | 240 | A | 0 |
| Example 12 | 1 | | 1.7 | | | 1.7 | 2.7 | 240 | B | 4 |
| Example 13 | 1 | | 1.7 | | | 1.7 | 2.7 | 240 | C | 6 |
| Example 14 | 1 | | 1.7 | | | 1.7 | 2.7 | 240 | D | 5 |
| Example 15 | 1 | | 1.7 | | | 1.7 | 2.7 | 240 | A | 5 |
| Example 16 | 1 | | 1.7 | | | 1.7 | 2.7 | 240 | A | 5 |
| Example 17 | 1 | | 1.7 | | | 1.7 | 2.7 | 240 | A | 5 |
| Example 18 | 1 | | 1.7 | | | 1.7 | 2.7 | 240 | A | 5 |
| Example 19 | 1 | | 1.7 | | | 1.7 | 2.7 | 240 | A | 5 |
| Example 20 | 1 | | 1.7 | | | 1.7 | 2.7 | 240 | A | 5 |
| Example 21 | 1 | | 1.7 | | | 1.7 | 2.7 | 240 | A | 5 |
| Example 22 | 1 | | 1.7 | | | 1.7 | 2.7 | 240 | A | 5 |
| Example 23 | 1 | | 1.7 | | | 1.7 | 2.7 | 240 | A | 5 |
| Example 24 | 1 | | 1.7 | | | 1.7 | 2.7 | 240 | A | 5 |
| Example 25 | 1 | | 1.7 | | | 1.7 | 2.7 | 240 | A | 5 |
| Example 26 | 1 | | 1.7 | | | 1.7 | 2.7 | 240 | A | 5 |
| Example 27 | 1 | | 1.7 | | | 1.7 | 2.7 | 240 | A | 5 |
| Example 28 | 1.5 | | 1.3 | | | 1.3 | 2.8 | 220 | A | 5 |

TABLE 1-continued

Table 1

| | | | | | | | | | |
|---|---|---|---|---|---|---|---|---|---|
| Example 29 | 1.6 | | 1.2 | | | 1.2 | 2.7 | 220 | A | 5 |
| Example 30 | 0.3 | | 2.5 | | | 2.5 | 2.7 | 220 | A | 5 |
| Example 31 | 0.9 | | 1.6 | | | 1.7 | 2.5 | 220 | A | 5 |
| Example 32 | 1.1 | | 1.9 | | | 1.7 | 3 | 220 | A | 5 |
| Example 33 | 1 | | 1.7 | | | 1.7 | 2.7 | 150 | A | 5 |
| Example 33' | 1 | | 1.7 | | | 1.7 | 2.7 | 120 | A | 5 |
| Example 33" | 1 | | 1.7 | | | 1.7 | 2.7 | 100 | A | 5 |
| Example 34 | 1 | | 1.7 | | | 1.7 | 2.7 | 260 | A | 5 |
| Example 35 | 1.8 | | | 0.5 | 0.5 | 1 | 2.8 | 400 | C | 7 |
| Example 36 | 0.5 | 1.2 | 1.2 | | | 2.4 | 2.9 | 330 | C | 7 |
| Example 37 | 0.2 | 2.5 | | | | 2.5 | 2.7 | 250 | D | 4 |
| Comparative Example 4 | 0.2 | 2.5 | | | | 2.5 | 2.7 | 250 | — | 0 |
| Example 38 | 2.4 | 0.5 | | | | 0.5 | 2.9 | 220 | A | 5 |
| Example 39 | 2.2 | 0.7 | | | | 0.7 | 2.9 | 220 | A | 5 |
| Example 40 | 2.7 | 0.1 | | | | 0.1 | 2.8 | 220 | A | 5 |
| Example 41 | 1.8 | 0.9 | | | | 0.9 | 2.7 | 220 | A | 5 |

| | Additives, Co-Existing Matter | | Physical Properties of Melt | | | | |
|---|---|---|---|---|---|---|---|
| | Fatty Acid having from 2 to 6 carbon | | Physical Properties of Melt at die temperature | | | | |
| | type | added amount (ppm) | Amount of Sulfuric Acid (ppm) | $G'$ (Pa) | $G''$ (Pa) | $\tan\delta$ | Elongation Length at break in normal line direction (μm) | Elongation Stress at break in normal line direction (N/cm$^2$) |
|---|---|---|---|---|---|---|---|---|
| Example 1 | Z | 200 | 30 | 3000 | 10000 | 3.33 | 100 | 0.1 |
| Example 2 | Z | 200 | 30 | 2800 | 8500 | 3.04 | 30 | 0.012 |
| Example 3 | Z | 200 | 30 | 3200 | 12000 | 3.75 | 10 | 0.007 |
| Example 4 | Z | 200 | 30 | 3800 | 15000 | 3.95 | 380 | 0.45 |
| Example 5 | Z | 200 | 30 | 2300 | 7000 | 3.04 | 420 | 0.55 |
| Example 6 | Z | 200 | 180 | 3100 | 6000 | 1.94 | 70 | 0.05 |
| Example 7 | Z | 200 | 0 | 2800 | 8000 | 2.86 | 200 | 0.2 |
| Example 8 | Z | 10 | 0 | 26000 | 28000 | 1.08 | 120 | 0.13 |
| Comparative Example 1 | Z | 0 | 0 | 33000 | 31000 | 0.94 | 80 | 0.08 |
| Example 9 | Z | 900 | 0 | 170 | 1000 | 5.88 | 140 | 0.15 |
| Comparative Example 2 | Z | 1200 | 0 | 80 | 800 | 10 | 70 | 0.06 |
| Example 10 | Z | 200 | 180 | 4000 | 18000 | 4.5 | 150 | 0.19 |
| Example 11 | Z | 200 | 0 | 1500 | 7500 | 5 | 80 | 0.07 |
| Comparative Example 3 | Z | 0 | 250 | 40000 | 31000 | 0.78 | 8 | 0.005 |
| Example 12 | Z | 200 | 30 | 2000 | 8000 | 4 | 120 | 0.12 |
| Example 13 | Z | 200 | 30 | 3500 | 12000 | 3.43 | 140 | 0.14 |
| Example 14 | Z | 200 | 30 | 4000 | 20000 | 5 | 160 | 0.16 |
| Example 15 | Z | 200 | 30 | 3000 | 10000 | 3.33 | 100 | 0.1 |
| Example 16 | Z | 200 | 30 | 3000 | 10000 | 3.33 | 100 | 0.1 |
| Example 17 | Z | 200 | 30 | 3000 | 10000 | 3.33 | 100 | 0.1 |
| Example 18 | Z | 200 | 30 | 3000 | 10000 | 3.33 | 100 | 0.1 |
| Example 19 | Z | 200 | 30 | 3000 | 10000 | 3.33 | 100 | 0.1 |
| Example 20 | Z | 200 | 30 | 3000 | 10000 | 3.33 | 100 | 0.1 |
| Example 21 | Z | 200 | 30 | 3000 | 10000 | 3.33 | 100 | 0.1 |
| Example 22 | Z | 200 | 30 | 3000 | 10000 | 3.33 | 100 | 0.1 |
| Example 23 | Z | 200 | 30 | 3000 | 10000 | 3.33 | 100 | 0.1 |
| Example 24 | Z | 200 | 30 | 3000 | 10000 | 3.33 | 100 | 0.1 |
| Example 25 | Z | 200 | 30 | 3000 | 10000 | 3.33 | 100 | 0.1 |
| Example 26 | Z | 200 | 30 | 3000 | 10000 | 3.33 | 100 | 0.1 |
| Example 27 | Z | 200 | 30 | 3000 | 10000 | 3.33 | 100 | 0.1 |
| Example 28 | Z | 200 | 30 | 8000 | 16000 | 2 | 150 | 0.23 |
| Example 29 | Z | 200 | 30 | 10000 | 15000 | 1.5 | 320 | 0.45 |
| Example 30 | Z | 200 | 30 | 1500 | 6000 | 4 | 70 | 0.08 |
| Example 31 | Z | 200 | 30 | 5000 | 12000 | 2.4 | 150 | 0.23 |
| Example 32 | Z | 200 | 30 | 1500 | 6500 | 4.33 | 60 | 0.04 |
| Example 33 | Z | 200 | 30 | 1000 | 5000 | 5 | 50 | 0.05 |
| Example 33' | Z | 200 | 30 | 800 | 2000 | 2.5 | 30 | 0.02 |
| Example 33" | Z | 200 | 30 | 300 | 1100 | 3.67 | 25 | 0.02 |
| Example 34 | Z | 200 | 30 | 6000 | 14000 | 2.33 | 250 | 0.35 |
| Example 35 | X | 500 | 100 | 850 | 3500 | 4.12 | 70 | 0.09 |
| Example 36 | X | 500 | 100 | 3500 | 7800 | 2.23 | 120 | 0.15 |
| Example 37 | Y | 300 | 50 | 800 | 1500 | 1.88 | 150 | 0.22 |
| Comparative Example 4 | — | 0 | 250 | 80 | 1200 | 15 | 10 | 0.004 |
| Example 38 | Y | 100 | 20 | 4500 | 8000 | 1.78 | 80 | 0.11 |

TABLE 1-continued

Table 1

| | | | | | | | | |
|---|---|---|---|---|---|---|---|---|
| Example 39 | Y | 100 | 20 | 3500 | 9500 | 2.71 | 50 | 0.15 |
| Example 40 | Y | 100 | 20 | 5500 | 7500 | 1.36 | 120 | 0.3 |
| Example 41 | Y | 100 | 20 | 2000 | 6000 | 3 | 40 | 0.35 |

| | Melt Casting Condition | | | | Physical Properties of | |
|---|---|---|---|---|---|---|
| | die temperature (°C.) | tip angle of die lip (degrees) | distance between die lip and CD center | electrostatic charge application | neck-in percentage | number of fine projections and depressions (/10 cm) | Tg (°C.) |

| | die temperature (°C.) | tip angle of die lip (degrees) | distance between die lip and CD center | electrostatic charge application | neck-in percentage | number of fine projections and depressions (/10 cm) | Tg (°C.) |
|---|---|---|---|---|---|---|---|
| Example 1 | 220 | 30 | 1 | yes | 5 | 3 | 121 |
| Example 2 | 220 | 30 | 1 | yes | 4 | 4 | 125 |
| Example 3 | 220 | 30 | 1 | yes | 4 | 9 | 128 |
| Example 4 | 220 | 30 | 1 | yes | 6 | 4 | 115 |
| Example 5 | 220 | 30 | 1 | yes | 10 | 10 | 105 |
| Example 6 | 220 | 30 | 1 | yes | 4 | 5 | 121 |
| Example 7 | 220 | 30 | 1 | yes | 4 | 0 | 121 |
| Example 8 | 220 | 30 | 1 | yes | 4 | 7 | 122 |
| Comparative Example 1 | 220 | 30 | 1 | yes | 4 | 35 | 122 |
| Example 9 | 220 | 30 | 1 | yes | 6 | 8 | 120 |
| Comparative Example 2 | 220 | 30 | 1 | yes | 11 | 40 | 119 |
| Example 10 | 220 | 30 | 1 | yes | 4 | 0 | 122 |
| Example 11 | 220 | 30 | 1 | yes | 4 | 7 | 122 |
| Comparative Example 3 | 220 | 30 | 1 | yes | 4 | 65 | 130 |
| Example 12 | 220 | 30 | 1 | yes | 4 | 3 | 123 |
| Example 13 | 220 | 30 | 1 | yes | 4 | 4 | 115 |
| Example 14 | 220 | 30 | 1 | yes | 4 | 2 | 119 |
| Example 15 | 220 | 2 | 1 | yes | 5 | 0 | 121 |
| Example 16 | 220 | 55 | 1 | yes | 5 | 4 | 121 |
| Example 17 | 220 | 70 | 1 | yes | 5 | 10 | 121 |
| Example 18 | 220 | 30 | 0.75 | yes | 7 | 4 | 121 |
| Example 19 | 220 | 30 | 0.65 | yes | 11 | 10 | 121 |
| Example 20 | 220 | 30 | 1.25 | yes | 7 | 4 | 121 |
| Example 21 | 220 | 30 | 1.35 | yes | 11 | 10 | 121 |
| Example 22 | 220 | 30 | 1 | no | 25 | 5 | 121 |
| Example 23 | 220 | 30 | 1 | yes | 5 | 3 | 121 |
| Example 24 | 220 | 30 | 1 | yes | 5 | 3 | 121 |
| Example 25 | 220 | 30 | 1 | yes | 5 | 3 | 121 |
| Example 26 | 220 | 30 | 1 | yes | 5 | 3 | 121 |
| Example 27 | 220 | 30 | 1 | yes | 5 | 3 | 121 |
| Example 28 | 200 | 30 | 1 | yes | 4 | 5 | 135 |
| Example 29 | 200 | 30 | 1 | yes | 4 | 9 | 142 |
| Example 30 | 200 | 30 | 1 | yes | 6 | 5 | 115 |
| Example 31 | 200 | 30 | 1 | yes | 6 | 5 | 133 |
| Example 32 | 200 | 30 | 1 | yes | 4 | 5 | 115 |
| Example 33 | 200 | 30 | 1 | yes | 8 | 8 | 120 |
| Example 33' | 200 | 30 | 1 | yes | 9 | 9 | 118 |
| Example 33" | 200 | 30 | 1 | yes | 9 | 10 | 117 |
| Example 34 | 200 | 30 | 1 | yes | 4 | 4 | 122 |
| Example 35 | 180 | 45 | 1 | yes | 7 | 8 | 140 |
| Example 36 | 180 | 45 | 1 | yes | 4 | 5 | 112 |
| Example 37 | 240 | 25 | 1 | yes | 4 | 2 | 135 |
| Comparative Example 4 | 240 | 90 | 0 | no | 25 | 85 | 140 |
| Example 38 | 240 | 45 | 0 | yes | 4 | 3 | 135 |
| Example 39 | 240 | 45 | 0 | yes | 4 | 8 | 130 |
| Example 40 | 240 | 45 | 0 | yes | 4 | 4 | 140 |
| Example 41 | 240 | 45 | 0 | yes | 4 | 9 | 128 |

| | Stretching Condition Draw Ratio | | Physical Properties of Stretched Film | | | |
|---|---|---|---|---|---|---|
| | MD (%) | TD (%) | number of fine projections and depressions (/10 cm) | Re (nm) | Rth (nm) | Blur Width in LCD (mm) |
| Example 1 | 0 | 40 | 2 | 80 | 200 | 5 |
| Example 2 | 0 | 40 | 3 | 60 | 190 | 6 |

TABLE 1-continued

Table 1

| | | | | | | |
|---|---|---|---|---|---|---|
| Example 3 | 0 | 40 | 8 | 30 | 100 | 15 |
| Example 4 | 0 | 40 | 4 | 150 | 350 | 7 |
| Example 5 | 0 | 40 | 9 | 220 | 550 | 20 |
| Example 6 | 0 | 40 | 3 | 80 | 200 | 6 |
| Example 7 | 0 | 40 | 0 | 80 | 200 | 1 |
| Example 8 | 0 | 40 | 5 | 80 | 200 | 8 |
| Comparative Example 1 | 0 | 40 | 34 | 80 | 200 | 79 |
| Example 9 | 0 | 40 | 6 | 80 | 200 | 9 |
| Comparative Example 2 | 0 | 40 | 38 | 80 | 200 | 150 |
| Example 10 | 0 | 40 | 0 | 80 | 200 | 0 |
| Example 11 | 0 | 40 | 5 | 80 | 200 | 8 |
| Comparative Example 3 | 0 | 40 | 62 | 20 | 75 | 185 |
| Example 12 | 0 | 40 | 2 | 50 | 150 | 5 |
| Example 13 | 0 | 40 | 3 | 100 | 220 | 8 |
| Example 14 | 0 | 40 | 1 | 90 | 180 | 2 |
| Example 15 | 0 | 40 | 0 | 80 | 200 | 0 |
| Example 16 | 0 | 40 | 3 | 80 | 200 | 5 |
| Example 17 | 0 | 40 | 9 | 80 | 200 | 19 |
| Example 18 | 0 | 40 | 3 | 80 | 200 | 6 |
| Example 19 | 0 | 40 | 9 | 80 | 200 | 18 |
| Example 20 | 0 | 40 | 3 | 80 | 200 | 6 |
| Example 21 | 0 | 40 | 9 | 80 | 200 | 22 |
| Example 22 | 0 | 40 | 4 | 80 | 200 | 8 |
| Example 23 | 0 | 0 | 3 | 0 | 35 | 6 |
| Example 24 | 5 | 45 | 2 | 35 | 250 | 4 |
| Example 25 | 15 | 80 | 1 | 55 | 350 | 2 |
| Example 26 | 0 | 200 | 1 | 70 | 480 | 2 |
| Example 27 | 50 | 290 | 0 | 180 | 350 | 0 |
| Example 28 | 0 | 40 | 4 | 50 | 150 | 8 |
| Example 29 | 0 | 40 | 8 | 30 | 100 | 20 |
| Example 30 | 0 | 40 | 4 | 70 | 180 | 8 |
| Example 31 | 0 | 40 | 4 | 120 | 230 | 7 |
| Example 32 | 0 | 40 | 4 | 60 | 150 | 8 |
| Example 33 | 0 | 40 | 7 | 70 | 180 | 16 |
| Example 33' | 0 | 40 | 8 | 60 | 170 | 17 |
| Example 33" | 0 | 40 | 9 | 60 | 160 | 18 |
| Example 34 | 0 | 40 | 3 | 80 | 210 | 6 |
| Example 35 | 0 | 40 | 7 | 50 | 150 | 8 |
| Example 36 | 0 | 40 | 3 | 70 | 180 | 7 |
| Example 37 | 0 | 40 | 1 | 60 | 150 | 0 |
| Comparative Example 4 | 0 | 40 | 84 | 20 | 80 | 170 |
| Example 38 | 30 | 30 | 1 | 0 | 5 | 2 |
| Example 39 | 30 | 30 | 7 | 0 | 10 | 20 |
| Example 40 | 30 | 30 | 2 | 0 | 0 | 4 |
| Example 41 | 30 | 30 | 8 | 5 | 15 | 30 |

The samples produced according to the invention all had good properties. When the compound having at least two aromatic rings, the fatty acid having from 2 to 6 carbon atoms and the sulfuric acid amount were controlled, then the samples produced had the intended G', G", tan δ, and the elongation length at break and the elongation stress at break in the normal direction that fall within the scope of the invention, and the samples reduced the blur on LCD (Examples 1 to 14). Further, when the die lip was controlled, the same effect was also obtained (Examples 15 to 22). Further, when the draw ratio in stretching was controlled, the same effect was also obtained (Examples 23 to 27). The same test was carried out with cellulose acetate propionate (substitution degree in Example 37), and the same effect was also obtained. When the thickness of the unstretched film was 50 μm or 100 μm, the same effect was also obtained. When the compound A in Examples 1 and 28 was replaced by the compound (I) of the invention and A'-1 to produce cellulose acylate films, then the same effect as in Examples 1 and 28 was also obtained.

On the other hand, the properties of Comparative Examples were extremely bad; and especially, Comparative Example 4 in Table 1, which corresponds to the sample No. 6 in Examples in JP-A-2000-3526620, was much worse than Example 37 of the invention that is near to it.

2. Formation of Stretched Cellulose Acylate

The above-mentioned cellulose acylate was stretched in the machine direction and/or the transverse direction at the draw ratio in Tg+15° C., as shown in Table 1. The stretching was carried out by 300%/min. Re and Rth of the obtained films are shown in Table 1.

3. Construction of Polarizer (1) Saponification of Cellulose Acylate Film:

The unstretched cellulose acylate film and the stretched cellulose acylate film were processed for surface hydrophilication according to the following dipping saponification method. In addition, the following coating saponification made on the films gave the same results as in the dipping saponification.

i) Dipping Saponification:

An aqueous NaOH (1.5 mol/L) solution was prepared as a saponification solution, and conditioned at 60° C. The cellulose acylate film was dipped in the solution for 2 minutes. Next, this was dipped in an aqueous sulfuric acid (0.05 mol/L) solution for 30 seconds, and then led to pass through a water-washing bath.

ii) Coating Saponification:

20 parts by weight of water was added to 80 parts by weight of iso-propanol, and KOH was dissolved therein to have a concentration of 1.5 normalities. This was conditioned at 60° C. and used as a saponification solution. This was applied to the cellulose acylate film at 60° C. in an amount of 10 g/m², and the film was thus saponified for 1 minute. Next, this was washed by spraying thereon hot water at 50° C. in a degree of 10 L/m²-min for 1 minute.

(2) Formation of Polarizing Layer:

According to Example 1 in JP-A-2001-141926, a film was stretched in the machine direction, between two pairs of nip rolls having a different peripheral speed to prepare a polarizing layer.

(3) Lamination:

Thus obtained, the polarizing layer was laminated with any of the saponified, unstretched or stretched cellulose acylate film, using an aqueous 3% PVA (Kuraray's PVA-117H) solution as an adhesive, in such a manner that the polarization axis could cross the machine direction of the cellulose acylate film at 45 degrees. Of those, the laminate with the unstretched cellulose acylate film was fitted to a 20-inch VA-mode liquid-crystal display device (LCD) of FIGS. 2 to 9 in JP-A-2000-154261, and assessed. Briefly, lines having a width of 10 mm were displayed on the panel, and the width of the blurred line was measured with a loupe, and it is shown in Table 1 (in Table 1, this is "blur width"). The samples produced according to the invention had good properties.

4. Construction of Optical Compensatory Film (1) Unstretched Film:

When the unstretched cellulose acylate film of the invention was used in the first transparent support in Example 1 in JP-A-11-316378, then good optical compensatory films with no blur were produced.

(2) Stretched Cellulose Acylate Film:

When the stretched cellulose acylate film of the invention was used in place of the liquid-crystal layer-coated cellulose acetate film in Example 1 in JP-A-11-316378, then good optical compensatory films were produced.

When the stretched cellulose acylate film of the invention was used in place of the liquid-crystal layer-coated cellulose acetate film in Example 1 in JP-A-7-333433, then good optical compensatory filter films with no blur were produced.

5. Construction of Low-Refractivity Film

According to Example 47 in Hatsumei Kyokai Disclosure Bulletin (No. 2001-1745), the stretched or unstretched cellulose acylate film of the invention was used in construction of low-refractivity films, and the films had good optical properties with no blur.

6. Construction of Liquid-Crystal Display Device

The above polarizer of the invention was used in the liquid-crystal display device described in Example 1 in JP-A-10-48420; the discotic liquid-crystalline molecules-containing optically-anisotropic layer and the polyvinyl alcohol-coated alignment film described in Example 1 in JP-A-9-26572; the 20-inch VA-mode liquid-crystal display device of FIGS. 2 to 9 in JP-A-2000-154261; and the 20-inch OCB-mode liquid-crystal display device of FIGS. 10 to 15 in JP-A-2000-154261. The low-refractivity film of the invention was stuck to the outermost surface layer of these liquid-crystal display devices, and evaluated. These exhibited good visibility with no blur. The same test was carried out with cellulose acetate propionate (substitution degree in Example 37), and the same effect was also obtained. When the thickness of the unstretched film was 50 μm or 100 μm, the same effect was also obtained.

Example B

1. Formation of Cellulose Acylate Film (1) Preparation of Materials:

In the same manner as in Example A, various cellulose acylates having a different acyl group and a different substitution degree as in Table 2 were prepared.

The above-mentioned compound (36), a compound having at least two aromatic rings, was added to the thus-obtained cellulose acylate. Its amount added is shown in Table 2.

Any of the following compounds X to Z, fatty acids having from 2 to 6 carbon atoms, was added to the cellulose acylate. Its amount added is shown in Table 2.

Compound X (acetic acid),
Compound Y (propionic acid),
Compound Z (butyric acid).

Further, the following plasticizer was added to the cellulose acylate. Its amount added is shown in Table 2.

Plasticizer A: polyethylene glycol (molecular weight 600)
Plasticizer B: glycerin diacetate oleate
Plasticizer C: glycerin tetracaprylate
Plasticizer D: glycerin diacetate laurate To all samples, added were 0.05% by mass of silicon dioxide particles (Aerosil R972V) and 0.1% by mass of a stabilizer (bis-2,6-dibutyl-4-methylphenyl)pentaerythritol diphosphite). In Examples and Table 2, all % by mass is the weight ratio relative to cellulose acylate.

(2) Melt Film Formation:

In the same manner as in Example A, the polymer was pelletized and dried, melted at 215° C., and extruded out through a die lip set at the temperature shown in Table 2. In this stage, the devices were so positioned that the ratio obtained by dividing the distance L between the die lip and the center of the casting drum (CD), by the radius R of the CD (L/R) could be the value as in Table 2. The distance between the melt having gone out at the tip of the die lip and the melt having reached the CD surface was 5 cm. For some samples, an electrode of 3 kV was disposed at a site spaced from the melt by 5 cm in this stage, and the melt was subjected to electrostatic charge application treatment for 5 cm at both edges thereof. The neck-in percentage in this stage was computed according to the following formula, and the result is shown in Table 2.

Neck-in Percentage (%)=100×{(die lip width)−(formed film width)}/(die lip width).

The melt was led to continuously pass through three CDs having a diameter of 40 cm and set at (Tg−5)° C., Tg and (Tg−10)° C., and was thus solidified to give a cellulose acylate film having a thickness of 80 μm. This was trimmed by 5 cm at both edges thereof, then knurled at both edges thereof to a width of 10 mm and a height of 50 μm, and this was wound up. Every sample had a width of 1.5 m and wound up for 3000 m at 30 m/min. Tg is shown in Table 2.

TABLE 2

| | Cellulose Acylate | | | | | Additives, Co-Existing Matter | | |
|---|---|---|---|---|---|---|---|---|
| | Substitution Degree | | | | | Addition of Compound having at least two aromatic rings (% by mass) | Fatty Acid having from 2 to 6 carbon atoms | |
| | acetyl group (X) | propionyl group (Y1) | butyryl group (Y2) | Y (total of Y1 and Y2) | X + Y | Polymerization Degree | | type | added amount (ppm) |
| Example a | 0.2 | 2.5 | | 2.5 | 2.7 | 170 | 0 | Y | 200 |
| Example b | 0.2 | 2.5 | | 2.5 | 2.7 | 170 | 2 | Y | 200 |
| Example c | 0.2 | 2.5 | | 2.5 | 2.7 | 170 | 18 | Y | 200 |
| Example d | 0.2 | 2.5 | | 2.5 | 2.7 | 170 | 0 | Y | 200 |
| Example e | 0.2 | 2.5 | | 2.5 | 2.7 | 170 | 0 | Y | 200 |
| Example f | 0.2 | 2.5 | | 2.5 | 2.7 | 170 | 0 | Y | 10 |
| Comparative Example g | 0.2 | 2.5 | | 2.5 | 2.7 | 170 | 0 | Y | 0 |
| Example g | 0.2 | 2.5 | | 2.5 | 2.7 | 170 | 0 | Y | 900 |
| Comparative Example b | 0.2 | 2.5 | | 2.5 | 2.7 | 170 | 0 | Y | 1200 |
| Example h | 0.2 | 2.5 | | 2.5 | 2.7 | 170 | 0 | Y | 200 |
| Example i | 0.2 | 2.5 | | 2.5 | 2.7 | 170 | 0 | Y | 200 |
| Example j | 0.2 | 2.5 | | 2.5 | 2.7 | 170 | 0 | Y | 200 |
| Example k | 0.2 | 2.5 | | 2.5 | 2.7 | 170 | 0 | Y | 200 |
| Example l | 0.2 | 2.5 | | 2.5 | 2.7 | 170 | 0 | Y | 200 |
| Example m | 0.2 | 2.5 | | 2.5 | 2.7 | 170 | 0 | Y | 200 |
| Example n | 0.2 | 2.5 | | 2.5 | 2.7 | 170 | 0 | Y | 200 |
| Example o | 0.2 | 2.5 | | 2.5 | 2.7 | 170 | 0 | Y | 200 |
| Example p | 1.1 | 1.5 | | 1.5 | 2.6 | 150 | 0 | X | 200 |
| Example q | 0.9 | 1.8 | | 1.8 | 2.7 | 150 | 0 | X | 200 |
| Example r | 0.7 | 2.1 | | 2.1 | 2.8 | 150 | 0 | X | 200 |
| Example s | 0.25 | 2.7 | | 2.7 | 2.95 | 150 | 0 | X | 200 |
| Example S' | 0.25 | 2.7 | | 2.7 | 2.95 | 130 | 0 | X | 200 |
| Example S" | 0.25 | 2.7 | | 2.7 | 2.95 | 100 | 0 | X | 200 |
| Example t | 0.7 | 2.1 | | 2.1 | 2.8 | 210 | 0 | X | 200 |
| Example t' | 0.7 | 2.1 | | 2.1 | 2.8 | 230 | 0 | X | 200 |
| Example u | 1.1 | | 1.5 | 1.5 | 2.6 | 150 | 0 | X | 200 |
| Example v | 0.9 | | 1.8 | 1.8 | 2.7 | 150 | 0 | Z | 200 |
| Example w | 0.2 | 2.5 | | 2.5 | 2.7 | 170 | 0 | Y | 200 |
| Example x | 0.2 | 2.5 | | 2.5 | 2.7 | 170 | 0 | Y | 200 |
| Example y | 0.2 | 2.5 | | 2.5 | 2.7 | 170 | 0 | Y | 200 |
| Example z | 0.2 | 2.5 | | 2.5 | 2.7 | 170 | 0 | Y | 200 |

| | Additives, Co-Existing Matter | | | Physical Properties of Melt at die temperature | | | Elongation Length at break in normal line direction (μm) | Elongation Stress at break in normal line direction (N/cm$^2$) |
|---|---|---|---|---|---|---|---|---|
| | Sulfuric Acid Amount (ppm) | Type of Plasticizer | Added (% by mass) | G' (Pa) | G (Pa) | tanδ | | |
| Example a | 30 | — | 0 | 2000 | 4000 | 2 | 60 | 0.07 |
| Example b | 30 | — | 0 | 1500 | 5000 | 3.33 | 80 | 0.15 |
| Example c | 30 | — | 0 | 1000 | 4000 | 4 | 300 | |
| Example d | 180 | — | 0 | 2200 | 3000 | 1.36 | 40 | 0.05 |
| Example e | 0 | — | 0 | 1900 | 3500 | 1.84 | 150 | 0.11 |
| Example f | 30 | — | 0 | 24000 | 26000 | 1.08 | 100 | 0.09 |
| Comparative Example g | 30 | — | 0 | 32000 | 31000 | 0.97 | 70 | 0.06 |
| Example g | 30 | — | 0 | 200 | 1100 | 5.5 | 120 | 0.11 |
| Comparative Example b | 30 | — | 0 | 60 | 500 | 8.33 | 50 | 0.04 |
| Example h | 30 | — | 0 | 2000 | 4000 | 2 | 60 | 0.07 |
| Example i | 30 | — | 0 | 2000 | 4000 | 2 | 60 | 0.07 |
| Example j | 30 | — | 0 | 2000 | 4000 | 2 | 60 | 0.07 |
| Example k | 30 | — | 0 | 2000 | 4000 | 2 | 60 | 0.07 |
| Example l | 30 | — | 0 | 2000 | 4000 | 2 | 60 | 0.07 |
| Example m | 30 | — | 0 | 2000 | 4000 | 2 | 60 | 0.07 |
| Example n | 30 | — | 0 | 2000 | 4000 | 2 | 60 | 0.07 |
| Example o | 30 | — | 0 | 2000 | 4000 | 2 | 60 | 0.07 |
| Example p | 30 | — | 0 | 7000 | 9000 | 1.29 | 120 | 0.18 |
| Example q | 30 | — | 0 | 6000 | 8000 | 1.33 | 100 | 0.14 |
| Example r | 30 | — | 0 | 5000 | 8000 | 1.6 | 80 | 0.1 |

TABLE 2-continued

Table 2

| | | | | | | | | |
|---|---|---|---|---|---|---|---|---|
| Example s | 30 | — | 0 | 1500 | 5000 | 3.33 | 50 | 0.05 |
| Example S' | 30 | — | 0 | 1000 | 2500 | 2.5 | 40 | 0.03 |
| Example S" | 30 | — | 0 | 500 | 1500 | 3 | 30 | 0.02 |
| Example t | 30 | — | 0 | 4000 | 6500 | 1.63 | 90 | 0.12 |
| Example t' | 30 | — | 0 | 3500 | 7000 | 2 | 120 | 0.15 |
| Example u | 30 | — | 0 | 6000 | 7000 | 1.17 | 170 | 0.19 |
| Example v | 30 | — | 0 | 5000 | 5500 | 1.1 | 150 | 0.14 |
| Example w | 30 | A | 3 | 1600 | 3500 | 2.19 | 70 | 0.08 |
| Example x | 30 | B | 8 | 1300 | 3000 | 2.31 | 90 | 0.11 |
| Example y | 30 | C | 12 | 1000 | 2500 | 2.5 | 320 | 0.22 |
| Example z | 30 | D | 18 | 700 | 2000 | 2.86 | 340 | 0.29 |

| | Melt Casting Condition | | | | | Physical Properties of Formed Film | |
|---|---|---|---|---|---|---|---|
| | die temperature (°C.) | tip angle of die lip (degrees) | distance CD center between die lip and (L/R) | electrostatic charge application | neck-in percentage (%) | number of fine projections and depressions (/10 cm) | Tg (°C.) |
| Example a | 220 | 30 | 1 | yes | 6 | 4 | 138 |
| Example b | 220 | 30 | 1 | yes | 7 | 2 | 135 |
| Example c | 220 | 30 | 1 | yes | 10 | 0 | 110 |
| Example d | 220 | 30 | 1 | yes | 5 | 6 | 138 |
| Example e | 220 | 30 | 1 | yes | 5 | 1 | 138 |
| Example f | 220 | 30 | 1 | yes | 5 | 8 | 138 |
| Comparative Example a | 220 | 30 | 1 | yes | 5 | 41 | 138 |
| Example g | 220 | 30 | 1 | yes | 7 | 9 | 138 |
| Comparative Example b | 220 | 30 | 1 | yes | 12 | 45 | 137 |
| Example h | 220 | 2 | 1 | yes | 6 | 1 | 138 |
| Example i | 220 | 55 | 1 | yes | 6 | 6 | 138 |
| Example j | 220 | 70 | 1 | yes | 6 | 12 | 138 |
| Example k | 220 | 30 | 0.75 | yes | 8 | 5 | 138 |
| Example l | 220 | 30 | 0.65 | yes | 12 | 12 | 138 |
| Example m | 220 | 30 | 1.25 | yes | 8 | 5 | 138 |
| Example n | 220 | 30 | 1.35 | yes | 12 | 12 | 138 |
| Example o | 220 | 30 | 1 | no | 28 | 6 | 138 |
| Example p | 230 | 30 | 1 | yes | 4 | 5 | 145 |
| Example q | 230 | 30 | 1 | yes | 5 | 4 | 143 |
| Example r | 230 | 30 | 1 | yes | 5 | 4 | 141 |
| Example s | 230 | 30 | 1 | yes | 6 | 5 | 135 |
| Example S' | 230 | 30 | 1 | yes | 7 | 6 | 133 |
| Example S" | 230 | 30 | 1 | yes | 7 | 7 | 133 |
| Example t | 230 | 30 | 1 | yes | 5 | 4 | 141 |
| Example t' | 230 | 30 | 1 | yes | 4 | 8 | 141 |
| Example u | 230 | 30 | 1 | yes | 5 | 8 | 138 |
| Example v | 230 | 30 | 1 | yes | 5 | 6 | 135 |
| Example w | 210 | 30 | 1 | yes | 7 | 4 | 136 |
| Example x | 210 | 30 | 1 | yes | 8 | 3 | 133 |
| Example y | 210 | 30 | 1 | yes | 12 | 3 | 125 |
| Example z | 210 | 30 | 1 | yes | 15 | 3 | 115 |

| | Stretching Condition Draw Ratio | | Physical Properties of Stretched Film | | | | |
|---|---|---|---|---|---|---|---|
| | MD (%) | TD (%) | number of fine projections and depressions (/10 cm) | Re (nm) | Rth (nm) | Constitution or Polarizer | Blur Width in LCD (μm) |
| Example a | 5 | 55 | 3 | 50 | 180 | A | 6 |
| Example b | 5 | 55 | 2 | 60 | 200 | A | 7 |
| Example c | 5 | 55 | 0 | 130 | 330 | A | 1 |
| Example d | 70 | 5 | 5 | 70 | 230 | B | 7 |
| Example e | 70 | 5 | 0 | 70 | 230 | B | 1 |
| Example f | 80 | 80 | 7 | 5 | 350 | C | 9 |
| Comparative Example a | 80 | 80 | 36 | 5 | 350 | C | 89 |
| Example g | 80 | 80 | 5 | 5 | 350 | C | 9 |
| Comparative Example b | 80 | 80 | 35 | 5 | 350 | C | 165 |

TABLE 2-continued

Table 2

| | | | | | | | |
|---|---|---|---|---|---|---|---|
| Example h | 10 | 90 | 0 | 90 | 270 | D | 0 |
| Example i | 10 | 90 | 4 | 90 | 270 | D | 6 |
| Example j | 10 | 90 | 9 | 90 | 270 | D | 20 |
| Example k | 10 | 90 | 4 | 90 | 270 | D | 7 |
| Example l | 10 | 90 | 9 | 90 | 270 | D | 20 |
| Example m | 10 | 90 | 4 | 90 | 270 | D | 8 |
| Example n | 10 | 90 | 9 | 90 | 270 | D | 25 |
| Example o | 10 | 90 | 5 | 90 | 270 | D | 10 |
| Example p | 0 | 40 | 5 | 50 | 150 | A | 15 |
| Example q | 0 | 40 | 2 | 40 | 140 | A | 9 |
| Example r | 0 | 40 | 3 | 35 | 130 | A | 8 |
| Example s | 0 | 40 | 4 | 30 | 120 | A | 8 |
| Example S' | 0 | 40 | 4 | 30 | 110 | A | 9 |
| Example S" | 0 | 40 | 4 | 30 | 100 | A | 10 |
| Example t | 0 | 40 | 3 | 35 | 135 | A | 9 |
| Example t' | 0 | 40 | 8 | 35 | 135 | A | 20 |
| Example u | 0 | 40 | 8 | 60 | 170 | A | 25 |
| Example v | 0 | 40 | 5 | 50 | 150 | A | 21 |
| Example w | 5 | 270 | 4 | 180 | 400 | E | 6 |
| Example x | 5 | 270 | 3 | 180 | 420 | E | 6 |
| Example y | 5 | 270 | 3 | 185 | 430 | E | 3 |
| Example z | 5 | 270 | 3 | 190 | 160 | E | 3 |

The samples produced according to the invention all had good properties. As compared with those substituted with butyryl (Bu) group and acetyl (Ac) group (CAB), the samples substituted with propionyl (Pr) group and acetyl (Ac) group (CAP) had fewer "fine projections and depressions" and had fewer blurs in LCD, they do not contain "a compound having at least two aromatic rings" (p and u, and q and v of the invention). Further, the effect was especially remarkable when the degree of polymerization is lower than 240 (t and t' of the invention).

2. Formation of Stretched Cellulose Acylate

The above-mentioned cellulose acylate was stretched under the same condition as in Example A, at the draw ratio shown in Table 2. Re and Rth of the obtained films are shown in Table 2.

3. Construction of Polarizer (1) Saponification:
The cellulose acylate film was dip-saponified in the same manner as in Example A. Fujitac was also dip-saponified.
(2) Formation of Polarizing Layer:
A polarizing layer was formed in the same manner as in Example A.
(3) Lamination:
Thus obtained, the polarizing layer was laminated with any of the saponified, unstretched or stretched cellulose acylate film according to the layer constitution mentioned below (shown in Table 2), in the same manner as in Example A.
Polarizer A: unstretched cellulose acylate film/polarizing film/Fujitac (Fuji Photo Film's TD80U),
Polarizer B: unstretched cellulose acylate film/polarizing film/unstretched cellulose acylate film,
Polarizer C: stretched cellulose acylate film/polarizing film/Fujitac (Fuji Photo Film's TD80U),
Polarizer D: stretched cellulose acylate film/polarizing film/unstretched cellulose acylate film,
Polarizer E: stretched cellulose acylate film/polarizing film/stretched cellulose acylate film.
The polarizer was fitted to a 20-inch VA-mode liquid-crystal display device (LCD) of FIGS. 2 to 9 in JP-A-2000-154261 in place of the polarizer originally fitted thereto, and assessed. Briefly, the polarizers A and B were used in place of the original polarizer in LCD; and the polarizers C to E were used in place of the original polarizer and retarder therein. In the same manner as in Example A, the "blur width" was measured, and the result is shown in Table 2. The samples produced according to the invention had good properties.

In place of the liquid crystal layer-coated cellulose acetate film in Example 1 in JP-A-11-316378, the unstretched cellulose acylate film of the invention was used, and good optical compensatory films were produced.

4. Low-Refractivity Film

In the same manner as in Example A and using the cellulose acylate film of the invention, low-refractivity films were produced, and they had good optical properties. Thus obtained, the low-refractivity film of the invention was stuck to the outermost layer of VA, OCB and IPS-mode liquid-crystal display devices and assessed in the same manner as in Example A, and good liquid-crystal display devices were obtained.

5. Construction of Liquid-Crystal Display Device

In the same manner as in Example A, the above-mentioned polarizer of the invention was used in the discotic liquid-crystalline molecules-containing optically-anisotropic layer and the polyvinyl alcohol-coated alignment film; the VA-mode liquid-crystal display device; and the OCB-mode liquid-crystal display device. These exhibited good properties. When the low-refractivity film of the invention was stuck to the outermost layer of liquid-crystal display devices, then the devices had good visibility with no blur.

Example C

The samples a, and p to v of the invention in Example 2 were formed into films, using the touch roll described in Example 1 in JP-A-11-235747 (this is the double-pressure roll in the publication) (however, the thickness of the thin metal jacket was changed to 3 mm), according to a touch roll film formation method under the condition shown in Table 3.

All the other conditions were the same as in Example 2, except that the touch roll was used herein for film formation. As is obvious from Table 3, the touch roll film formation gave better films, as it reduced the fine projections and depressions in the formed films and reduced the blur width in liquid-crystal display devices.

On the other hand, using the same touch roll as in Example 1 in WO97/28950 (this is the sheet-forming roll in the publication) (however, the cooling water running through the metal jacket was changed to oil at a temperature of from 18° C. to 120° C.), the samples were formed into films according to a touch roll film formation method under the condition shown in Table 3. As a result, the same results as in Table 3 were obtained.

| Description of Reference Numerals | |
|---|---|
| 1, 1' | Die Lip |
| 2 | Melt |
| 3 | Casting Drum |
| 4 | Extruder |
| 5 | Die Lip |
| 6 | Touch roll |

The invention claimed is:

1. A method of producing a cellulose acylate film comprising a step of melt-casting film formation from a melt of a cellulose acylate composition that contains a fatty acid having

TABLE 3

| | Condition for Touch Roll Film Formation | | Number of Fine Projections and Depressions in Formed Film (/10 cm) | Physical Properties of Stretched Film | | | | Remarks |
|---|---|---|---|---|---|---|---|---|
| | touch roll linear pressure (kg/cm) | touch roll temperature (° C.) | | Number of Fine Projections and Depressions (/10 cm) | Re (nm) | Rth (nm) | Blur Width in LCD (μm) | |
| a of the invention | touch roll not used | | 4 | 3 | 50 | 180 | 6 | same as a of the invention in Table 2 |
| a-1 of the invention | 3 | 120 | 4 | 3 | 50 | 180 | 5 | |
| a-2 of the invention | 10 | | 0 | 0 | 50 | 180 | 0 | |
| a-3 of the invention | 50 | | 0 | 0 | 50 | 180 | 0 | |
| a-4 of the invention | 95 | | 0 | 0 | 50 | 185 | 0 | |
| a-5 of the invention | 105 | | 3 | 2 | 50 | 190 | 5 | |
| a-6 of the invention | 20 | 55 | 2 | 2 | 50 | 180 | 3 | |
| a-7 of the invention | | 65 | 0 | 0 | 50 | 180 | 0 | |
| a-8 of the invention | | 100 | 0 | 0 | 50 | 180 | 0 | |
| a-9 of the invention | | 150 | 0 | 0 | 50 | 190 | 0 | |
| a-10 of the invention | | 170 | 2 | 2 | 50 | 200 | 3 | |
| p of the invention | touch roll not used | | 5 | 5 | 50 | 150 | 15 | same as p of the invention in Table 2 |
| p-1 of the invention | 20 | 130 | 0 | 0 | 50 | 150 | 5 | |
| q of the invention | touch roll not used | | 4 | 2 | 40 | 140 | 9 | same as q of the invention in Table 2 |
| q-1 of the invention | 8 | 125 | 0 | 0 | 40 | 140 | 3 | |
| r of the invention | touch roll not used | | 4 | 3 | 35 | 130 | 8 | same as r of the invention in Table 2 |
| r-1 of the invention | 15 | 115 | 0 | 0 | 35 | 130 | 2 | |
| s of the invention | touch roll not used | | 5 | 4 | 30 | 120 | 8 | same as s of the invention in Table 2 |
| s-1 of the invention | 25 | 110 | 0 | 0 | 30 | 120 | 3 | |
| t of the invention | touch roll not used | | 4 | 3 | 35 | 135 | 9 | same as t of the invention in Table 2 |
| t-1 of the invention | 10 | 135 | 0 | 0 | 35 | 135 | 3 | |
| t' of the invention | touch roll not used | | 8 | 8 | 35 | 135 | 20 | same as t' of the invention in Table 2 |
| t'-1 of the invention | 30 | 130 | 2 | 2 | 35 | 135 | 8 | |
| u of the invention | touch roll not used | | 8 | 8 | 60 | 170 | 25 | same as u of the invention in Table 2 |
| u-1 of the invention | 8 | 115 | 2 | 2 | 60 | 170 | 6 | |
| v of the invention | touch roll not used | | 6 | 5 | 50 | 150 | 21 | same as v of the invention in Table 2 |
| v-1 of the invention | 20 | 120 | 1 | 0 | 50 | 150 | 7 | |

INDUSTRIAL APPLICABILITY

When built in a liquid-crystal display device, the cellulose acylate film of the invention significantly solves the problem of display failure (blur) that may occur in the device. Accordingly, the industrial applicability of the invention is extremely high.

Figure 1:
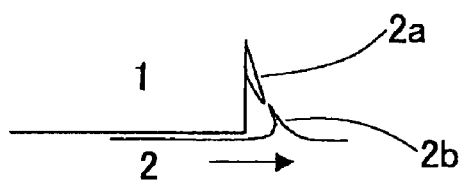
FIG. 1 It is to explain the generation mechanism of fine projections and depressions.
Figure 1:
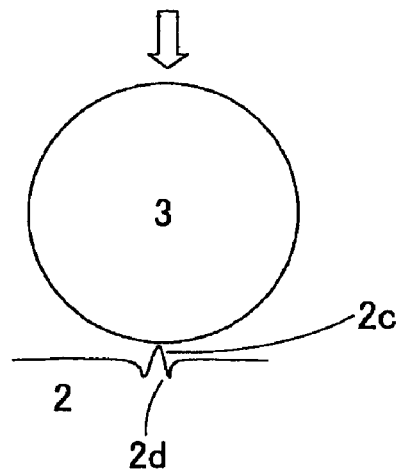
Figure 2:
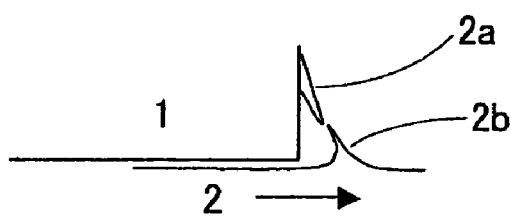
FIG. 2 It is to explain the relationship between the shape of a die lip and the stickiness of a melt.
Figure 2:
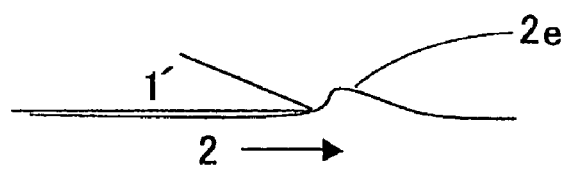
Figure 3:
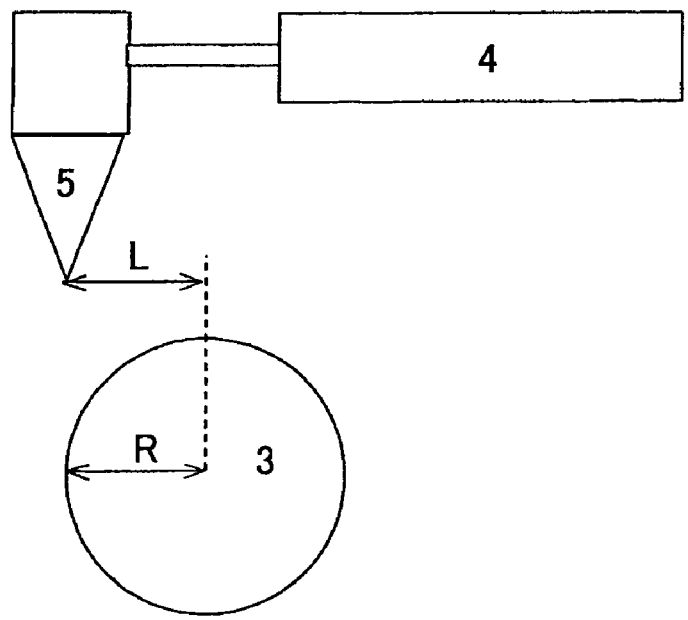
FIG. 3 It is to explain the positional relationship between a die lip and a casting drum.
Figure 4:
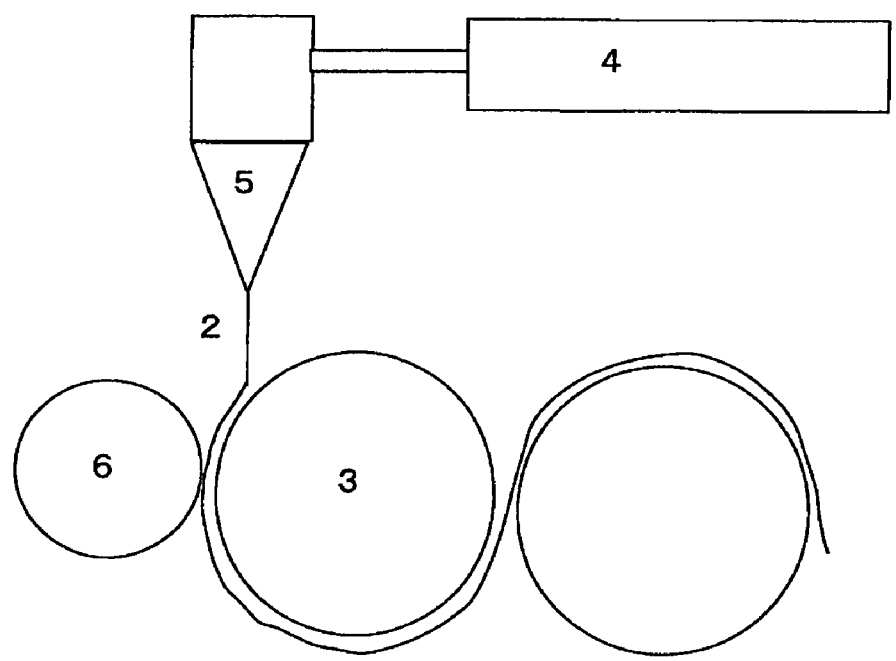
FIG. 4 It is to explain melt casting film formation using a touch roll.

from 2 to 6 carbon atoms and has a sulfuric acid amount of from 0 ppm to 200 ppm, wherein the cellulose acylate satisfies formula (4):

$$2.6 \leq X+Y \leq 2.95, \tag{4}$$

where X represents a substitution degree for an acetyl group; Y represents a total substitution degree for a propionyl group, a butyryl group, a pentanoyl group and a hexanoyl gram;

wherein when at least ½ of Y is a propionyl group, the cellulose acylate further satisfies formula (5):

$$0.1 \leq X \leq 1.45, \text{ and} \tag{5}$$

when less than ½ of Y is a propionyl group, the cellulose acylate further satisfies formula (8):

$$0.5 \leq X \leq 1.8; \tag{8}$$

wherein the melt has a storage elastic modulus G' at 180° C. to 240° C. of from 100 Pa to 30000 Pa, a loss elastic modulus G" at 180° C. to 240° C. of from 1000 Pa to 30000 Pa and a tan δ at 180° C. to 240° C. of from 1 to 6 where tan δ is computed as G"/G', and wherein prior to any stretching step, on the surface of the film, the total of: the number of projections having a height of from 0.1 μm to 100 μm and a length of at least 1 mm, and the number of depressions having a depth of from 0.1 μm to 100 μm and a length of at least 1 mm, is at most 10 per 10 cm of the width of the film.

2. The method of producing a cellulose acylate film according to claim 1, wherein the amount of a remaining solvent is 0.

3. The method of producing a cellulose acylate film according to claim 1, the melt having an elongation strength at break in the normal line direction at 180° C. to 240° C. of from 20 μm to 400 μm and an elongation stress at break in the normal line direction at 180° C. to 240° C. of from 0.01 N/cm$^2$ to 0.5 N/cm$^2$.

4. The method of producing a cellulose acylate film according to claim 1, wherein a touch roll is employed during the melt-casting step.

5. The method of producing a cellulose acylate film, further comprising a step of stretching the cellulose acylate film of claim 1, by from 1% to 300% at least in one direction.

6. The method of producing a cellulose acylate film according to claim 1, wherein the polymerization degree of the cellulose acylate is from 100 to 270.

7. The method of producing a cellulose acylate film according to claim 1, wherein the melt contains a compound having at least two aromatic rings and having a molecular weight of from 100 to 3000 in an amount of from 1% to 20% by mass.

8. The method of producing a cellulose acylate film according to claim 1, wherein the melt contains a fatty acid having from 2 to 6 carbon atoms in an amount of from 1 ppm to 1000 ppm.

9. The method of producing a cellulose acylate film according to claim 1, wherein the step of melt-casting film formation is through a die lip having a tip angle of from 1° to 60°.

10. The method of producing a cellulose acylate film according to claim 1, wherein the step of melt-casting film formation is through a die lip set shifted from the center of a casting drum within a range of from 0.7 times to 1.3 times of the radius of the casting drum.

11. The method of producing a cellulose acylate film according to claim 1, wherein the cellulose acylate film satisfies Formulae (4) to (6):

$$Rth \geq Re, \quad (4)$$

$$200 \geq Re \geq 0, \quad (5)$$

$$500 \geq Rth \geq 0, \quad (6)$$

wherein in Formulae (4) to (6), Rth and Re are in nm.

12. A method of producing a polarizer comprising the method of producing a cellulose acylate film of claim 1, the polarizer having at least one layer of the cellulose acylate film laminated on a polarizing layer.

13. A method of producing an optically-compensatory film for liquid-crystal display plates comprising the method of producing a cellulose acylate film of claim 1, wherein the cellulose acylate film is used as a substrate thereof.

14. A method of producing an antireflection film comprising the method of producing a cellulose acylate film of claim 1, wherein the cellulose acylate film is used as a substrate thereof.

15. A method of producing a liquid-crystal display device comprising the method of producing a cellulose acylate film of claim 1.

16. A method of producing a cellulose acylate film comprising a step of melt-casting film formation from a melt of a cellulose acylate that contains a fatty acid having from 2 to 6 carbon atoms and has a sulfuric acid amount of from 0 ppm to 200 ppm, wherein the cellulose acylate satisfies formula (4):

$$2.6 \leq X+Y \leq 2.95, \quad (4)$$

where X represents a substitution degree for an acetyl group; Y represents a total substitution degree for a propionyl group, a butyryl group, a pentanoyl group and a hexanoyl grow;

wherein when at least ½ of Y is a propionyl group, the cellulose acylate further satisfies formula (5):

$$0.1 \leq X \leq 1.45, \text{ and} \quad (5)$$

when less than ½ of Y is a propionyl group, the cellulose acylate further satisfies formula (8):

$$0.5 \leq X \leq 1.8; \text{ and} \quad (8)$$

wherein prior to any stretching step, on the surface of the film, the total of: the number of projections having a height of from 0.1 μm to 100 μm and a length of at least 1 mm, and the number of depressions having a depth of from 0.1 μm to 100 μm and a length of at least 1 mm, is at most 10 per 10 cm of the width of the film, and the amount of a remaining solvent is at most 0.01% by mass.

17. A method of producing a cellulose acylate film comprising a step of melt-casting film formation from a melt of a cellulose acylate composition that contains a fatty acid having from 2 to 6 carbon atoms in an amount of from 1 ppm to 1000 μm, and has a sulfuric acid amount of from 0 ppm to 200 ppm, wherein the cellulose acylate satisfies formula (4):

$$2.6 \leq X+Y \leq 2.95, \quad (4)$$

where X represents a substitution degree for an acetyl group; Y represents a total substitution degree for a propionyl group, a butyryl group, a pentanoyl group and a hexanoyl group;

wherein when at least ½ of Y is a propionyl group, the cellulose acylate further satisfies formula (5):

$$0.1 \leq X \leq 1.45, \text{ and} \quad (5)$$

when less than ½ of Y is a propionyl group, the cellulose acylate further satisfies formula (8):

$$0.5 \leq X \leq 1.8; \quad (8)$$

wherein the melt has a storage elastic modulus G' at 180° C. to 240° C. of from 100 Pa to 30000 Pa, a loss elastic modulus G" at 180° C. to 240° C. of from 1000 Pa to 30000 Pa and a tan δ at 180° C. to 240° C. of from 1 to 6 where tan δ is computed as G"/G', and wherein prior to any stretching step, on the surface of the film, the total of: the number of projections having a height of from 0.1 μm to 100 μm and a length of at least 1 mm, and the number of depressions having a depth of from 0.1 μm to 100 μm and a length of at least 1 mm, is at most 10 per 10 cm of the width of the film.

* * * * *